United States Patent
Yanagimoto et al.

(10) Patent No.: US 9,771,448 B2
(45) Date of Patent: Sep. 26, 2017

(54) OLEFIN-BASED RESIN, METHOD FOR PRODUCING SAME AND PROPYLENE-BASED RESIN COMPOSITION

(71) Applicant: MITSUI CHEMICALS, INC., Tokyo (JP)

(72) Inventors: Yasushi Yanagimoto, Ichihara (JP); Tomoaki Matsugi, Kisarazu (JP); Akihiko Iwashita, Tokyo (JP); Tatsuya Nakamura, Ichihara (JP); Keita Itakura, Ichihara (JP); Ryoichi Tsunori, Takaishi (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 15/128,012

(22) PCT Filed: Mar. 26, 2015

(86) PCT No.: PCT/JP2015/059426
§ 371 (c)(1),
(2) Date: Sep. 21, 2016

(87) PCT Pub. No.: WO2015/147187
PCT Pub. Date: Oct. 1, 2015

(65) Prior Publication Data
US 2017/0096514 A1 Apr. 6, 2017

(30) Foreign Application Priority Data
Mar. 28, 2014 (JP) ................................ 2014-068306

(51) Int. Cl.
*C08F 290/04* (2006.01)
*C08F 293/00* (2006.01)

(52) U.S. Cl.
CPC ........ *C08F 290/042* (2013.01); *C08F 293/00* (2013.01); *C08F 2420/01* (2013.01)

(58) Field of Classification Search
CPC .. C08F 255/02; C08F 290/04; C08F 4/65908; C08F 4/65912; C08F 4/65927; C08L 51/06; C08L 55/00
See application file for complete search history.

(56) References Cited

U.S. PATENT DOCUMENTS

| | | | |
|---|---|---|---|
| 5,155,080 A | 10/1992 | Elder et al. | |
| 5,278,119 A | 1/1994 | Turner et al. | |
| 5,321,106 A | 6/1994 | LaPointe | |
| 5,387,568 A | 2/1995 | Ewen et al. | |
| 5,407,884 A | 4/1995 | Turner et al. | |
| 5,483,014 A | 1/1996 | Turner et al. | |
| 5,519,100 A | 5/1996 | Ewen et al. | |
| 5,614,457 A | 3/1997 | Ewen et al. | |
| 5,663,249 A | 9/1997 | Ewen et al. | |
| 5,786,432 A | 7/1998 | Küber et al. | |
| 5,840,644 A | 11/1998 | Küber et al. | |
| 5,883,202 A | 3/1999 | Ewen et al. | |
| 6,051,727 A | 4/2000 | Küber et al. | |
| 6,117,962 A | 9/2000 | Weng et al. | |
| 6,147,180 A * | 11/2000 | Markel ..................... C08F 2/08 526/348 |
| 6,197,910 B1 | 3/2001 | Weng et al. | |
| 6,242,544 B1 | 6/2001 | Küber et al. | |
| 6,255,506 B1 | 7/2001 | Küber et al. | |
| 6,342,574 B1 | 1/2002 | Weng et al. | |
| 2004/0214953 A1 | 10/2004 | Yamada et al. | |
| 2004/0220346 A1 | 11/2004 | Kaneko et al. | |
| 2006/0106169 A1 | 5/2006 | Fukuii | |
| 2006/0149008 A1 | 7/2006 | Razavi | |
| 2010/0168323 A1 | 7/2010 | Ito et al. | |
| 2010/0280153 A1 | 11/2010 | Itakura et al. | |
| 2011/0313106 A1 | 12/2011 | Shan et al. | |
| 2011/0313107 A1 | 12/2011 | Shan et al. | |
| 2011/0313108 A1 | 12/2011 | Shan et al. | |

(Continued)

FOREIGN PATENT DOCUMENTS

| | | |
|---|---|---|
| JP | H01-501950 A | 7/1989 |
| JP | H01-502036 A | 7/1989 |

(Continued)

OTHER PUBLICATIONS

"Communications to the Editor," Macromolecules 8(5):687-689 (Sep.-Oct. 1975).
Resconi et al., "Olefin Polymerization at Bis(pentamethylcyclopentadienyl)zirconium and -hafnium Centers: Chain-Transfer Mechanisms," J. Am. Chem. Soc. 114(3):1025-1032 (1992).
Weng et al., "Synthesis of vinyl-terminated isotactic poly(propylene)," Macromol. Rapid Commun. 21(16):1103-1107 (2000).

(Continued)

*Primary Examiner* — Irina S Zemel
*Assistant Examiner* — Jeffrey Lenihan
(74) *Attorney, Agent, or Firm* — Foley & Lardner, LLP; Michael D. Kaminski

(57) ABSTRACT

An olefin resin having requirements (I) to (VI) is provided: (I) a grafted olefin polymer containing a main chain with an ethylene/α-olefin copolymer and a side chain with a propylene polymer; (II) the ratio P wt % of propylene polymer is from 5 to 60 wt %; (III) when the ratio of the amount of a component(s) having a peak temperature of a differential elution curve as measured by CFC using o-dichlorobenzene of less that 65° C., to the amount of (β) taken as E wt %, the value a represented by an equation (Eq-1), is 1.4 or more; (IV) the melting point (Tm) is 120 to 165° C. and the glass transition temperature (Tg) is −80 to −30° C., as measured by DSC; (V) the hot xylene-insoluble content is less than 3 wt %; and, (VI) the limiting viscosity as measured in decalin at 135° C. is 0.5 to 5.0 dl/g.

12 Claims, 2 Drawing Sheets

(56) References Cited

U.S. PATENT DOCUMENTS

2014/0031459 A1    1/2014   Itakura et al.
2015/0057415 A1    2/2015   Ohtaki et al.

FOREIGN PATENT DOCUMENTS

| | | |
|---|---|---|
| JP | H03-179005 A | 8/1991 |
| JP | H03-179006 A | 8/1991 |
| JP | H03-207703 A | 9/1991 |
| JP | H03-207704 A | 9/1991 |
| JP | H06-100579 A | 4/1994 |
| JP | H11-130807 A | 5/1999 |
| JP | 2001-525460 A | 12/2001 |
| JP | 2001-525461 A | 12/2001 |
| JP | 2001-527589 A | 12/2001 |
| JP | 2003-327758 A | 11/2003 |
| JP | 2004-175953 A | 6/2004 |
| JP | 2004-300412 A | 10/2004 |
| JP | 2004-346304 A | 12/2004 |
| JP | 2004-359861 A | 12/2004 |
| JP | 2005-336091 A | 12/2005 |
| JP | 2006-506495 A | 2/2006 |
| JP | 2006-083283 A | 3/2006 |
| JP | 2007-211189 A | 8/2007 |
| JP | 2008-144152 A | 6/2008 |
| JP | 2008-285443 A | 11/2008 |
| JP | 2009-102598 A | 5/2009 |
| JP | 2009-114404 A | 5/2009 |
| JP | 2009-227898 A | 10/2009 |
| JP | 2009-263594 A | 11/2009 |
| JP | 2009-299046 A | 12/2009 |
| JP | 2013-529705 A | 7/2013 |
| WO | WO-88/05793 A1 | 8/1988 |
| WO | WO-98/34970 A1 | 8/1998 |
| WO | WO-2009/088033 A1 | 7/2009 |
| WO | WO-2013/061974 A1 | 5/2013 |

OTHER PUBLICATIONS

International Search Report issued in International Patent Application No. PCT/JP2015/059426 dated Jun. 16, 2015.
Office Action issued in Japanese Patent Application No. 2016-502543 dated Jun. 14, 2016.ab.

* cited by examiner

[Fig. 1]
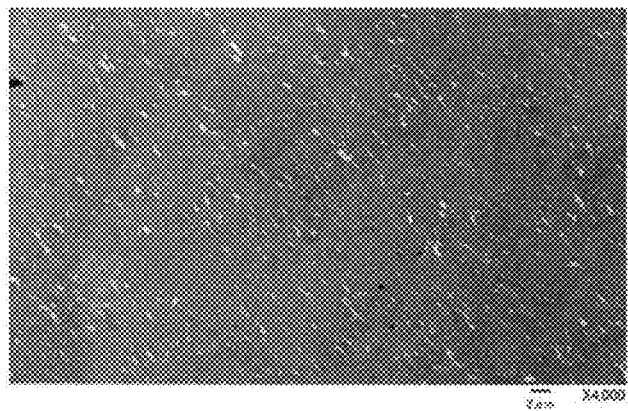
[Fig. 2]
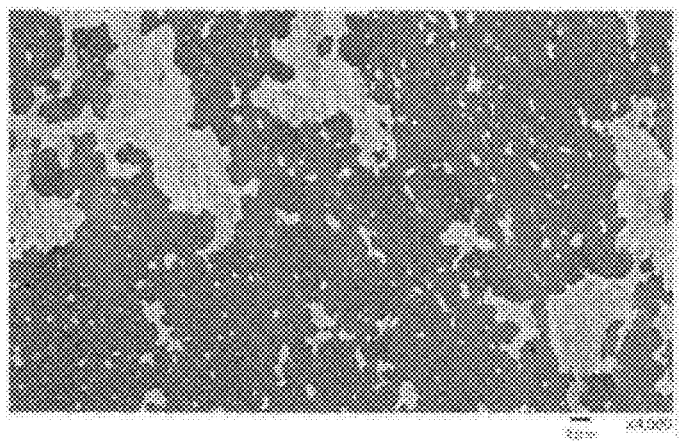
[Fig. 3]
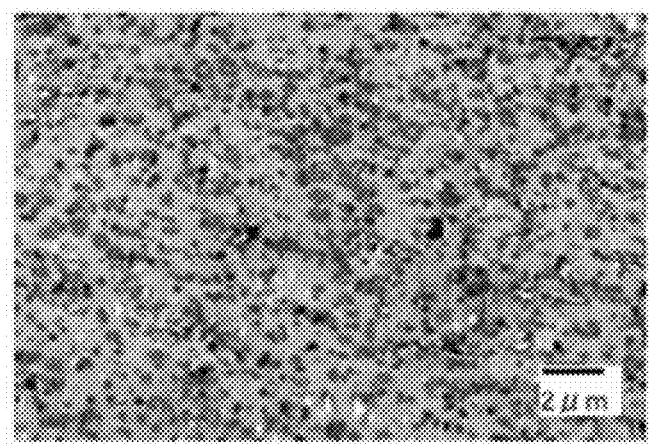

[Fig. 4]
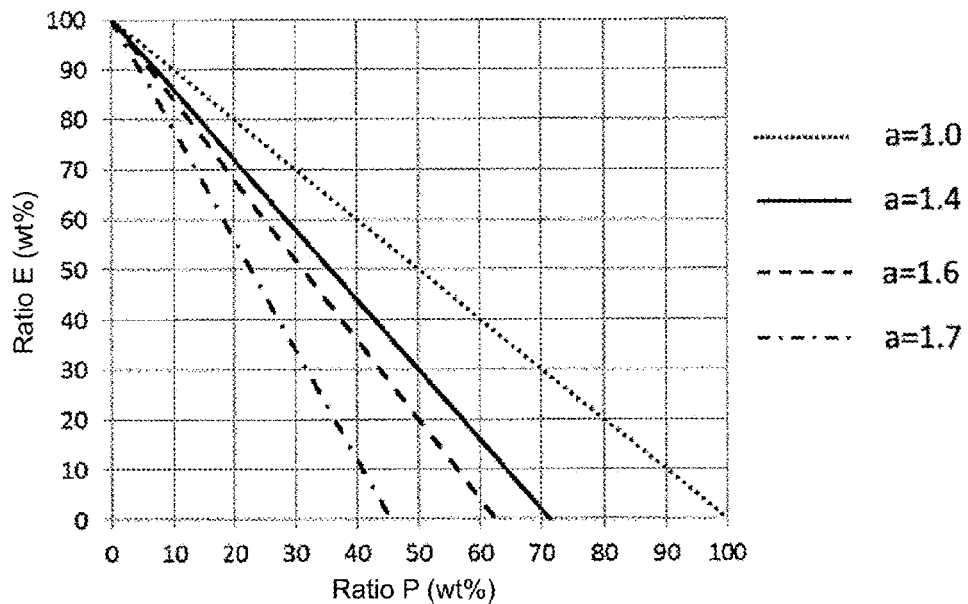
[Fig. 5]
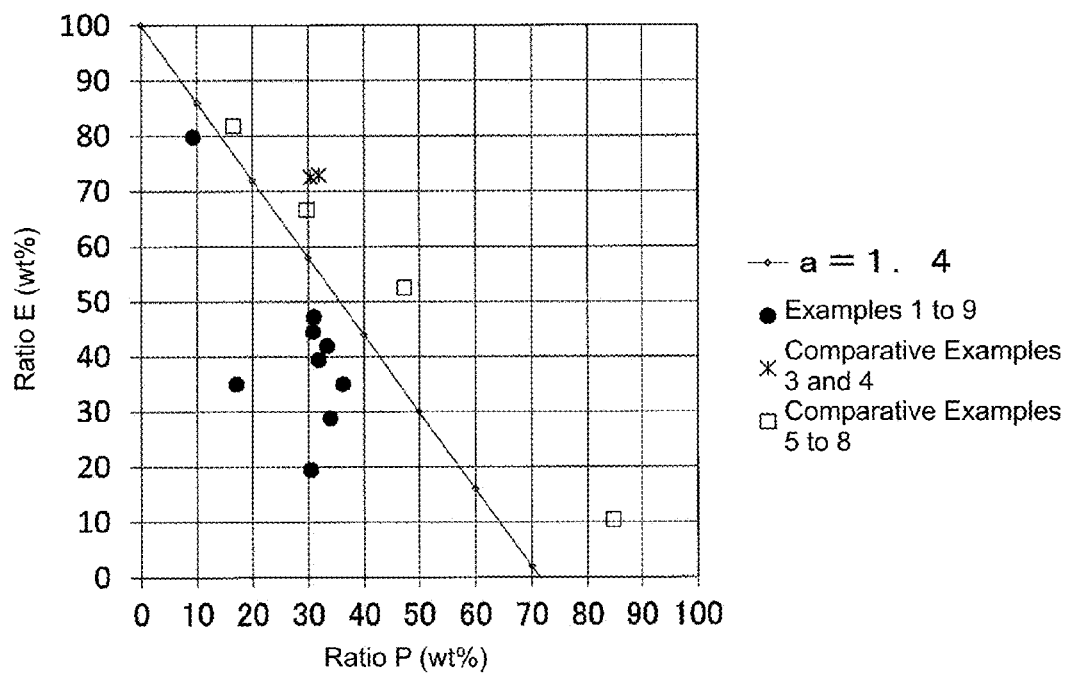

pinion

OLEFIN-BASED RESIN, METHOD FOR PRODUCING SAME AND PROPYLENE-BASED RESIN COMPOSITION

CROSS-REFERENCE TO RELATED APPLICATIONS

The present application is a U.S. national stage application of International Patent Application No. PCT/JP2015/059426, filed March 26, 2015, which claims the benefit of priority to Japanese Patent Application No. 2014-068306, filed March 28, 2014, the entireties of which are hereby incorporated by reference.

TECHNICAL FIELD

The present invention relates to an olefin resin and a method for producing the same, a propylene resin composition including the olefin resin, and a molded article made of the propylene resin composition. More specifically, the present invention relates to a propylene resin composition capable of producing a molded article having an excellent balance between rigidity and impact resistance, and an olefin resin capable of producing the propylene resin composition.

BACKGROUND ART

Propylene resins, among olefin resins, are used in a variety of fields, such as daily goods, kitchen utensils, packaging films, consumer electronics, mechanical parts, electric components, and automobile parts, and propylene resin compositions including various types of additives are used, depending on required performances. In recent years, efforts for producing light weight, thin-walled molded articles have been made in various industrial fields, as an attempt to realize 3R (Reduce, Reuse, and Recycle) in order to achieve a recycling-oriented society. At the same time, improvements in the propylene resin compositions have been made, so that sufficient rigidity and impact resistance can be obtained even in the light weight, thin-walled molded articles.

As a polypropylene having an improved impact resistance, a polypropylene block copolymer has been produced industrially, and widely used in the above mentioned applications. This block copolymer is also referred to as an impact copolymer, or a heterophasic copolymer. Specifically, in a multistage polymerization process for producing the block copolymer, the polymerization of a homopolymer is carried out first, and then ethylene is copolymerized in a subsequent reaction tank, to produce a composition including an ethylene-propylene polymer. Since the thus produced block copolymer has a structure (sea-island structure) in which "islands" of the ethylene-propylene polymer float in the "sea" of the homopolymer, it has a better impact strength as compared to the propylene homopolymer. Note, however, that the term "block" in the "polypropylene block copolymer" does not mean it is a "block copolymer". In other words, the polypropylene block copolymer is not composed of a homo-polypropylene chain and an ethylene-propylene copolymer chain, chemically bound to each other, but is a composition obtained by a two-stage polymerization.

For example, Patent Document 1 discloses a propylene resin composition composed of: a metallocene catalyst-based propylene block copolymer composition, in which the rubber moiety of the ethylene-propylene copolymer is constituted by two components having a low ethylene content and a high ethylene content; an elastomer; and an inorganic filler. Further, Patent Document 2 discloses a propylene block copolymer-based resin composition containing a high molecular weight propylene/ethylene copolymer rubber. Although the propylene resin composition disclosed in Patent Document 1 or Patent Document 2 has an improved impact resistance, the improvement to meet a demand for further rigidity has been insufficient.

In contrast, Patent Document 3 discloses a technique to carryout a multistage polymerization using a catalyst containing a bridged bisindenyl zirconocene capable of producing a polypropylene having a vinyl group at its terminal. In the technique disclosed in Patent Document 3, propylene is polymerized in the first stage, and the polypropylene is copolymerized with a small amount of comonomer(s) in the latter stage, so that a portion of the polypropylene having a vinyl structure at its terminal, produced in the first stage, is introduced into the main chain in the latter stage polymerization. As a result, a composition including a branched propylene copolymer composed of a grafted polypropylene can be obtained. Further, Patent Document 4 and Patent Document 5 disclose techniques to obtain a branched polymer in which the molecular weight of the side chain polypropylene is increased, by using a catalyst system carrying a bridged bisindenyl hafnocene complex. Not like the above mentioned block copolymer, the polymer produced by any of the techniques disclosed in Patent Documents 3 to 5 partially includes a branched polymer. The presence of the branched polymer improves the compatibility between the polypropylene moiety and the rubber moiety, and thus a polypropylene composition characterized by having excellent transparency and a high fusibility can be obtained. However, in the polymer produced by any of the techniques disclosed in Patent Documents 3 to 5, the melting point of the polypropylene moiety is not sufficiently high as compared to the above mentioned polypropylene block copolymer obtained using a general purpose Ziegler-Natta catalyst system, and there are limitations on the comonomer compositions of the rubber moiety and on the molecular weight. Therefore, obtaining a polypropylene resin composition which sufficiently satisfies both the rigidity and impact resistance has not yet been successful.

In view of the above, techniques have been developed to produce a block polymer (including a straight chain or a branched polymer), in which an ethylene copolymer is bound with polypropylene, and which has an excellent capability to modify a polypropylene resin.

Patent Document 6 and Patent Document 7 disclose methods in which a reactive functional group such as maleic acid, a halogen, or a leaving metal is introduced into a polyolefin, and then a coupling reaction of an ethylene/α-olefin copolymer chain with a crystalline propylene polymer chain is allowed to proceed, to produce a composition having a high target polymer content. However, in the methods disclosed therein, there is a potential risk that problems in terms of product quality could occur, such as: poor productivity due to complex reaction processes including a step of introducing the functional group into the polymer and a coupling step; coloration or foul odor due to byproducts or residual substrates produced during respective reaction steps; and contamination due to eluted components.

Patent Document 8 discloses a method for producing a straight-chain block copolymer composed of an ethylene/α-olefin copolymer chain and a crystalline polypropylene chain, using a reversible chain transfer technique. However, since this method requires a reversible chain transfer agent, it has a poor economic efficiency and its application is thereby limited. On the other hand, methods have also been disclosed in which a branched copolymer of an ethylene copolymer and polypropylene is obtained in a cost-efficient manner, utilizing a polymerization catalyst technique. For example, Patent Document 9 and Patent Document describe that a branched olefin polymer composition including a main chain soft segment constituted by an ethylene copolymer and a side chain hard segment constituted by polypropylene is useful as a polypropylene resin modifier. Patent Document 9 discloses a composition including a grafted olefin polymer having side chains composed of an ethylene polymer. Patent Document 10 discloses a composition including a grafted olefin polymer, obtained by using a specific polymerization catalyst, characterized by having excellent physical properties as a thermoplastic elastomer, such as elastic recovery, and having side chains composed of a crystalline propylene polymer.

However, although the composition disclosed in Patent Document 9 or Patent Document 10 includes a branched olefin polymer having side chains composed of a crystalline propylene polymer, it has been found that the disclosed technique has a low efficiency in producing the grafted olefin polymer, and, when the polymer is blended with a polypropylene resin to form a mixed composition, the improvement in the balance between the physical properties is insufficient. In order to obtain a branched copolymer having a high content of polypropylene side chains and an excellent modification ability, a catalyst having a good copolymerizability is required, which is capable of efficiently copolymerizing a vinyl terminated polypropylene macromonomer produced in the first stage polymerization and increasing its molecular weight in the latter stage polymerization vessel, at a high temperature (90° C. or more) at which the macromonomer is able to melt in a favorable manner.

PRIOR ART DOCUMENTS

Patent Documents

Patent Document 1: JP 2007-211189 A
Patent Document 2: JP 2003-327758 A
Patent Document 3: JP 2001-525460 A
Patent Document 4: JP 2008-144152 A
Patent Document 5: JP 2009-114404 A
Patent Document 6: JP 2009-102598 A
Patent Document 7: JP 2009-227898 A
Patent Document 8: JP 2013-529705 A
Patent Document 9: JP 2001-527589 A
Patent Document 10: WO 2013/061974 A

SUMMARY OF THE INVENTION

Problems to be Solved by the Invention

An object of the present invention is to provide an olefin resin having a low content of byproducts or residual substrates which causes quality problems, and a high content of a polymer composed of an ethylene/α-olefin copolymer chain and a crystalline propylene polymer chain, chemically bound to each other, wherein a propylene resin composition obtained from the olefin resin and polypropylene has an excellent balance between rigidity and impact resistance; and to provide a method for producing the olefin resin, and the propylene resin composition.

Means for Solving the Problems

The present inventors have found out, as a result of intensive studies, that the above mentioned problems can be solved by: an olefin resin including a grafted olefin polymer having a main chain composed of an ethylene/α-olefin copolymer and a side chain(s) composed of a propylene polymer, and satisfying specific requirements; a specific method for producing the olefin resin; and a propylene resin composition including the olefin resin.

In other words, the present invention relates to the following [1] to [12].

[1] An olefin resin (β) satisfying the following requirements (I) to (VI):

(I) the olefin resin (β) comprises a grafted olefin polymer [R1] comprising a main chain composed of an ethylene/α-olefin copolymer and a side chain composed of a propylene polymer;

(II) when the ratio of the amount of the propylene polymer contained in the olefin resin (β) is taken as P wt %, the value P is within the range of from 5 to 60;

(III) when the ratio of the amount of a component(s) having a peak temperature of a differential elution curve as measured by cross-fractionation chromatography (CFC) using o-dichlorobenzene as a solvent of less than 65° C., to the amount of the olefin resin (β) is taken as E wt %, the value a represented by the following equation (Eq-1) is 1.4 or more;

$$a=(100-E)/P \qquad \text{(Eq-1)}$$

(IV) the melting point (Tm) and the glass transition temperature (Tg), as measured by differential scanning calorimetry (DSC), are within the range of from 120 to 165° C. and within the range of from −80 to −30° C., respectively;

(V) the hot xylene-insoluble content is less than 3 wt %; and (VI) the limiting viscosity [η] as measured in decalin at 135° C. is within the range of from 0.5 to 5.0 dl/g.

[2] The olefin resin (β) according to the item [1], wherein the ratio of repeating units derived from ethylene with respect to the total repeating units is within the range of from 20 to 80 mol %.

[3] The olefin resin (β) according to the item [1] or [2], wherein the propylene polymer constituting the side chain(s) of the grafted olefin polymer [R1] has an isotactic pentad fraction (mmmm) of 93% or more.

[4] The olefin resin (β) according to any one of the items [1] to [3], wherein the propylene polymer constituting the side chain(s) of the grafted olefin polymer [R1] has a weight average molecular weight within the range of from 5,000 to 100,000.

[5] The olefin resin (β) according to any one of the items [1] to [4], wherein the ethylene/α-olefin copolymer constituting the main chain of the grafted olefin polymer [R1] has a weight average molecular weight within the range of from 50,000 to 200,000.

[6] The olefin resin (β) according to any one of the items [1] to [5], wherein the olefin resin (β) has a phase-separated structure composed of a sea phase constituted by a non-crystalline component and an island phase constituted by a crystalline component, and wherein the particles of the island phase have an average diameter as observed in a transmission electron microscope image within the range of from 50 nm to 500 nm.

[7] A method for producing the olefin resin (β) according to any one of the items [1] to [6], the method comprising the following steps (A) and (B):

(A) polymerizing propylene in the presence of an olefin polymerization catalyst comprising a transition metal compound [A] of a transition metal of Group 4 in the periodic table, the compound comprising a ligand having a dimethylsilylbisindenyl skeleton, to produce a polypropylene having terminal unsaturation; and (B) copolymerizing the polypropylene having terminal unsaturation produced in the step (A), ethylene, and at least one α-olefin selected from α-olefins having from 3 to 20 carbon atoms, in the presence of an olefin polymerization catalyst comprising a bridged metallocene compound represented by the following general formula [B]:

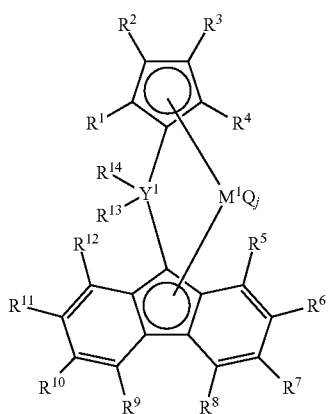

[B]

(wherein in the formula [B], $R^1$, $R^2$, $R^3$, $R^4$, $R^5$, $R^8$, $R^9$ and $R^{12}$ each independently represents a hydrogen atom, a hydrocarbon group, a silicon-containing group, or a hetero atom-containing group other than silicon-containing groups, and two mutually adjacent groups of the groups represented by $R^1$ to $R^4$ are optionally bound together to form a ring;

$R^6$ and $R^{11}$ are the same atom or the same group selected from hydrogen atom, hydrocarbon groups, silicon-containing groups, and hetero atom-containing groups other than the silicon-containing groups; $R^7$ and $R^{10}$ are the same atom or the same group selected from hydrogen atom, hydrocarbon groups, silicon-containing groups, and hetero atom-containing groups other than the silicon-containing groups; $R^6$ and $R^7$ are optionally bound together to forma ring; and $R^{10}$ and $R^{11}$ are optionally bound together to form a ring; with the proviso that all of $R^6$, $R^7$, $R^{10}$ and $R^{11}$ are not hydrogen atoms;

$R^{13}$ and $R^{14}$ each independently represents an aryl group;

$M^1$ represents a zirconium atom or a hafnium atom;

$Y^1$ represents a carbon atom or a silicon atom;

Q represents a halogen atom, a hydrocarbon group, a halogenated hydrocarbon group, a neutral conjugated or non-conjugated diene having from 4 to 10 carbon atoms, an anionic ligand, or a neutral ligand capable of being coordinated with a lone pair of electrons;

j represents an integer of from 1 to 4; and in cases where j is an integer of two or more, a plurality of Qs may be the same as or different from each other).

[8] The method for producing the olefin resin (β), according to the item [7], wherein the step (B) is a solution polymerization process carried out at a polymerization temperature of 90° C. or more.

[9] A propylene resin composition comprising a propylene resin (α) and the olefin resin (β) according to any one of the items [1] to [6].

[10] The propylene resin composition according to the item [9], comprising 50 to 98 parts by weight of the propylene resin (α) and 2 to 50 parts by weight of the olefin resin (β) (wherein the total amount of the propylene resin (α) and olefin resin (β) is 100 parts by weight).

[11] The propylene resin composition according to the item [9] or [10], wherein the olefin resin (β) is obtained by the method for producing the olefin resin (β), according to the item [7] or [8].

[12] A molded article obtainable from the propylene resin composition according to any one of the items [9] to [11].

Effect of the Invention

Since the olefin resin according to the present invention has a low content of byproducts or residual substrates which causes quality problems, and a high content of a graft polymer, it has a markedly high compatibility with a polypropylene resin and significantly improved mechanical properties as compared to the existing olefin elastomers, styrene elastomers, and the like.

Further, since it is possible to continuously produce the olefin resin according to the present invention, by using a specific catalyst, preferably one used in a high-temperature solution polymerization system, a resin having a desired structure can be produced economically.

Still further, since the propylene resin composition according to the present invention has a high rigidity, high impact resistance, and an excellent balance between the rigidity and the high impact resistance, it can be suitably used in various types of products, such as automobile parts, food containers, and medical containers.

BRIEF DESCRIPTION OF THE DRAWINGS

FIG. 1 is a transmission electron microscope image of the olefin resin (β-2) obtained in Example 2.

FIG. 2 is a transmission electron microscope image of the olefin resin (B-1) obtained in Comparative Example 3.

FIG. 3 is a transmission electron microscope image of the propylene resin composition obtained in Example 13.

FIG. 4 is a graph illustrating the correlation between the ratio P, the ratio E, and the value a.

FIG. 5 is a graph plotted with the ratio P against the ratio E of each of the Examples and Comparative Examples, and shown with a line representing the correlation between the ratio P and the ratio E when a=1.4.

MODE FOR CARRYING OUT THE INVENTION

The olefin resin [β], the method for producing the olefin resin, the propylene resin composition, and the molded article, according to the present invention, will now be described in detail.

<Olefin Resin [β]>

The olefin resin [β] according to the present invention may be composed of one type of olefin polymer alone, or two or more types of olefin polymers, but it is characterized in that the olefin resin [β] necessarily satisfies all of the following requirements (I) to (VI):

(I) the olefin resin (β) includes a grafted olefin polymer [R1] containing a main chain composed of an ethylene/α-olefin copolymer and a side chain composed of a propylene polymer;

(II) when the ratio of the amount of the propylene polymer contained in the olefin resin (β) is taken as P wt %, the value P is within the range of from 5 to 60;

(III) when the ratio of the amount of a component(s) having a peak temperature of a differential elution curve as measured by cross-fractionation chromatography (CFC)

using o-dichlorobenzene as a solvent of less than 65° C., to the amount of the olefin resin (β) is taken as E wt %, the value a represented by the following equation (Eq-1), in relation to the ratio E and the ratio P, is 1.4 or more;

$$a=(100-E)/P \quad \text{(Eq-1)}$$

(IV) the melting point (Tm) and the glass transition temperature (Tg), as measured by differential scanning calorimetry (DSC), are within the range of from 120 to 165° C. and within the range of from −80 to −30° C., respectively;

(V) the hot xylene-insoluble content is less than 3 wt %; and (VI) the limiting viscosity [η] as measured in decalin at 135° C. is within the range of from 0.5 to 5.0 dl/g.

These requirements (I) to (VI) will now be described specifically.

[Requirement (I)]

The olefin resin (β) includes the grafted olefin polymer [R1] as an essential component. The grafted olefin polymer [R1] is a graft copolymer containing a main chain composed of an ethylene/α-olefin copolymer and a side chain composed of a propylene polymer.

In the present invention, the term "graft copolymer" refers to a polymer in which one or more side chains are bound to a main chain.

Since the grafted olefin polymer [R1] has a structure in which side chains composed of a propylene polymer are chemically bound to a main chain composed of a non-crystalline or low-crystalline ethylene/α-olefin copolymer, the olefin resin (β) including the grafted olefin polymer [R1] exhibits a high compatibility as compared to an ethylene/α-olefin copolymer propylene resin having a straight chain structure. Therefore, the propylene resin composition including the olefin resin (β) and a propylene resin (α) to be described later is capable of exhibiting a markedly superior balance between physical properties.

Further, since the olefin resin (β) includes the grafted olefin polymer [R1] having the above mentioned structure, it is characterized by having a reduced stickiness, and an excellent handleability when formed into pellet products, as compared to common ethylene elastomers (such as ethylene/propylene copolymer, ethylene/butene copolymer and ethylene/octene copolymer).

The grafted olefin polymer [R1] is a graft copolymer having a main chain and one or more side chains, as described above. In the present invention, the main chain and the side chains of the grafted olefin polymer [R1] preferably satisfy the following requirements (i) to (iv):

(i) the main chain is composed of repeating units derived from ethylene and repeating units derived from at least one α-olefin selected from α-olefins having from 3 to 20 carbon atoms, wherein the ratio of the repeating units derived from the α-olefin with respect to the total repeating units contained in the main chain is within the range of from 10 to 50 mol %;

(ii) the main chain is derived from an ethylene/α-olefin copolymer having a weight average molecular weight of from 10,000 to 200,000;

(iii) the side chains are composed of repeating units substantially derived from propylene; and (iv) the side chains are derived from a propylene polymer having a weight average molecular weight of from 5,000 to 100,000.

These requirements (i) to (iv) will now be described specifically.

[Requirement (i)]

The main chain of the grafted olefin polymer [R1] is composed of an ethylene/α-olefin copolymer, and it serves as a moiety responsible for providing properties such as flexibility and low temperature properties required for a modifier, in the grafted olefin polymer [R1]. In order to secure such properties, the main chain of the grafted olefin polymer [R1] is composed of repeating units derived from ethylene and repeating units derived from at least one α-olefin selected from α-olefins having from 3 to 20 carbon atoms.

Specific examples of the α-olefin having from 3 to 20 carbon atoms, copolymerized with ethylene in the ethylene/α-olefin copolymer, include propylene, 1-butene, 2-methyl-1-propene, 2-methyl-1-butene, 3-methyl-1-butene, 1-hexene, 2-ethyl-1-butene, 2,3-dimethyl-1-butene, 2-methyl-1-pentene, 3-methyl-1-pentene, 4-methyl-1-pentene, 3,3-dimethyl-1-butene, 1-heptene, methyl-1-hexene, dimethyl-1-pentene, ethyl-1-pentene, trimethyl-1-butene, methylethyl-1-butene, 1-octene, methyl-1-pentene, ethyl-1-hexene, dimethyl-1-hexene, propyl-1-heptene, methylethyl-1-heptene, trimethyl-1-pentene, propyl-1-pentene, diethyl-1-butene, 1-nonene, 1-decene, 1-undecene, 1-dodecene, and the like.

More preferred is an α-olefin having from 3 to 10 carbon atoms, and still more preferred is an α-olefin having from 3 to 8 carbon atoms. Specific examples thereof include: linear olefins such as propylene, 1-butene, 1-pentene, 1-hexene, 1-octene, and 1-decene; and branched olefins such as 4-methyl-1-pentene, 3-methyl-1-pentene, and 3-methyl-1-butene. Among these, preferred is propylene, 1-butene, 1-pentene, 1-hexene, or 1-octene, and still more preferred is 1-butene, 1-pentene, 1-hexene, or 1-octene. When 1-butene, 1-pentene, 1-hexene, or 1-octene is used as the α-olefin having from 3 to 20 carbon atoms to be copolymerized with ethylene, a propylene resin composition having the best physical property balance between the rigidity and the impact resistance can be obtained.

The ratio of the repeating units derived from ethylene with respect to the total repeating units contained in the main chain of the grafted olefin polymer [R1] is within the range of from 50 to 90 mol %, and preferably from 60 to 90 mol %. Further, the ratio of the repeating units derived from the α-olefin with respect to the total repeating units contained in the main chain is within the range of from 10 to 50 mol %, and preferably from 10 to 40 mol %.

The relationship between the ratio of repeating units derived from ethylene and the repeating units derived from the α-olefin with the glass transition temperature (Tg) varies depending on the type of the α-olefin used. However, it is preferred that the ratio of the repeating units derived from ethylene and the repeating units derived from the α-olefin contained in the main chain of the grafted olefin polymer [R1] be within the above mentioned range, in order to achieve the glass transition temperature (Tg) within the range described in the requirement (IV).

When the ratio of the repeating units derived from ethylene and the repeating units derived from the α-olefin contained in the main chain is within the above mentioned range, the resulting olefin resin (β) will have an excellent flexibility and low temperature properties, and thus the propylene resin composition containing the olefin resin (β) will have an excellent impact resistance at low temperature. On the other hand, when the ratio of the repeating units derived from the α-olefin is less than 10 mol %, the resulting olefin resin will have a poor flexibility and low temperature properties, and thus the propylene resin composition containing the resin may have a poor impact resistance at low temperature.

The molar ratio of the repeating units derived from ethylene and the repeating units derived from the α-olefin contained in the main chain can be adjusted by controlling the ratio of the concentrations of ethylene and the α-olefin to be present in the polymerization reaction system in the step of producing the main chain.

The molar ratio (mol %) of the repeating units derived from the α-olefin contained in the main chain, namely, the α-olefin composition in the main chain, can be obtained, for example, by obtaining, in a conventional manner, the α-olefin composition in an ethylene/α-olefin copolymer obtained under conditions where a polypropylene having terminal unsaturation to be described later is not contained; or by deducting the influence of the polypropylene having terminal unsaturation or the side chains from the α-olefin composition of the olefin resin (β).

[Requirement (ii)]

The weight average molecular weight of the ethylene/α-olefin copolymer constituting the main chain of the grafted olefin polymer [R1] is within the range of from 50,000 to 200,000. The weight average molecular weight of the ethylene/α-olefin copolymer is preferably within the range of from 100,000 to 200,000, in order to improve the moldability (fluidity) of the resin while maintaining the mechanical strength in the polypropylene resin composition according to the present invention. The weight average molecular weight as described above is a weight average molecular weight in terms of polyethylene, as obtained by gel permeation chromatography (GPC).

When the weight average molecular weight of the ethylene/α-olefin copolymer constituting the main chain of the grafted olefin polymer [R1] is within the above mentioned range, the propylene resin composition containing the olefin resin (β) tends to have a better balance between the impact resistance, rigidity and toughness. On the other hand, a weight average molecular weight of less than 50,000 results in a decreased impact resistance or toughness, while a weight average molecular weight of greater than 200,000 causes a poor dispersion in the propylene resin, possibly failing to obtain a desired balance between physical properties.

The weight average molecular weight of the ethylene/α-olefin copolymer constituting the main chain of the grafted olefin polymer [R1] can be adjusted by controlling the ethylene concentration in the polymerization system in a production step to be described later. The concentration of ethylene can be controlled, for example, by adjusting the partial pressure of ethylene or adjusting the polymerization temperature. The adjustment of the weight average molecular weight of the ethylene/α-olefin copolymer constituting the main chain can also be achieved by supplying hydrogen into the polymerization system.

The weight average molecular weight of the ethylene/α-olefin copolymer constituting the main chain can be obtained, for example, by analyzing the ethylene/α-olefin copolymer produced under conditions where the polypropylene having terminal unsaturation to be described later is not contained; or by analyzing the olefin resin (β) and deducting the influence of the polypropylene having terminal unsaturation or the side chains from the analyzed result.

[Requirement (iii)]

The side chains of the grafted olefin polymer [R1] are composed substantially of repeating units derived from propylene. The side chains of the grafted olefin polymer [R1] are a propylene polymer composed substantially of repeating units derived from propylene and having an isotactic regularity.

The propylene polymer composed substantially of repeating units derived from propylene refers to a polymer in which the molar ratio of the repeating units derived from propylene with respect to the total repeating units contained in the propylene polymer is preferably from 99.5 to 100 mol %. In other words, a small amount of ethylene and an α-olefin(s) other than propylene may be copolymerized in the propylene polymer, to the extent that the functions and characteristics thereof are not impaired.

More preferably, the side chains of the grafted olefin polymer [R1] are a propylene polymer chain having an isotactic pentad fraction (mmmm) of 93% or more.

When the side chains of the grafted olefin polymer [R1] have the above mentioned characteristics, the side chains exhibit crystallinity and have a melting point. When the side chains of the grafted olefin polymer [R1] are an isotactic polypropylene polymer having a high melting point, they serve to increase the compatibility of the olefin resin (β) with the propylene resin. Therefore, the resulting propylene resin composition maintains a good rigidity and hardness, while exhibiting a good impact resistance.

The grafted olefin polymer [R1] can be obtained by copolymerizing the polypropylene having terminal unsaturation produced in step (A), ethylene, and the α-olefin, in the production step (B) of the olefin resin (β) to be described later. In other words, the composition and the stereoregularity of the polypropylene having terminal unsaturation correspond to the composition and the stereoregularity of the side chains of the grafted olefin polymer [R1]. Therefore, the composition and the stereoregularity of the polypropylene having terminal unsaturation to be produced in the step (A), calculated by a known method, can be defined as the composition and the stereoregularity of the side chains of the grafted olefin polymer [R1].

[Requirement (iv)]

The side chains are derived from a propylene polymer having a weight average molecular weight of from 5,000 to 100,000. In other words, the grafted olefin polymer [R1] has a structure in which chains of a macromonomer which is a propylene polymer having a weight average molecular weight of from 5,000 to 100,000 are bound to the ethylene/α-olefin copolymer, and the propylene polymer moiety of the grafted olefin polymer constitutes the side chains. The weight average molecular weight is preferably within the range of from 5,000 to 60,000, and more preferably, from 5,000 to 25,000.

When the weight average molecular weight of the propylene polymer constituting the side chains of the grafted olefin polymer [R1] is within the above mentioned range, the compatibility of the propylene polymer with the olefin resin (β) is increased, and the propylene resin composition containing the propylene resin and the olefin resin (β) will have a good impact resistance and elongation at break, as well as a good fluidity during injection molding.

When the weight average molecular weight of the propylene polymer constituting the side chains of the grafted olefin polymer [R1] is less than 5,000, the interface strength with the propylene resin is decreased, possibly resulting in a decrease in the elongation or the impact resistance of the propylene resin composition.

When the weight average molecular weight of the propylene polymer constituting the side chains of the grafted olefin polymer [R1] is greater than 100,000, the fluidity during molding of the resin composition containing the olefin resin (β) is impaired, possibly causing a deterioration in workability. Further, there are cases where the compatibility between the propylene resin and the olefin resin (β) is reduced to result in a decrease in the tensile elongation or the impact resistance of the propylene resin composition containing the propylene resin and the olefin resin (β), or in a decrease in the surface hardness of a molded article obtained from the propylene resin composition.

The weight average molecular weight of the propylene polymer constituting the side chains can be obtained by measuring the weight average molecular weight of the polypropylene having terminal unsaturation produced in the step (A) by a conventional method, in the same manner as described in the "Requirement (iii)" above. For example, the weight average molecular weight in terms of polypropylene of the polypropylene having terminal unsaturation as measured by gel permeation chromatography (GPC) can be used as the weight average molecular weight of the propylene polymer constituting the side chains.

The weight average molecular weight of the propylene polymer constituting the side chains can be adjusted by controlling the polymerization temperature or the polymerization pressure in the production step (A) to be described later.

[Requirement (II)]

When the ratio of the amount of the propylene polymer contained in the olefin resin (β) (hereinafter, also referred to as the ratio P) is taken as P wt %, the value P is within the range of from 5 to 60%. As used herein, the amount of the propylene polymer contained in the olefin resin (β) refers to the total sum of the amount of the polypropylene side chains incorporated into the main chain in the polymerization step (B) to be described later, and the amount of a straight-chain polypropylene polymer unincorporated into the main chain.

The ratio P is preferably from 8 to 50 wt %, and more preferably, from 8 to 40 wt %.

When the ratio P is within the above range, the compatibility of the propylene polymer with the olefin resin (β) is increased, and the propylene resin composition containing the propylene polymer and the olefin resin (β) will have a good impact resistance and elongation at break. When the ratio P is less than 5, the compatibility with the propylene polymer is reduced, and the resulting propylene resin composition may not have a good impact resistance or elongation at break. When the ratio P is greater than 60, the relative content of the ethylene/α-olefin copolymer is reduced, and the resulting propylene resin composition may not have a good impact resistance at low temperature or elongation at break.

The ratio P can be obtained, for example, from the ratio of the weight of the polypropylene having terminal unsaturation used in the polymerization step (B) to be described later, to the weight of the resulting olefin resin (β).

The polypropylene having terminal unsaturation refers to a polypropylene having unsaturated terminals represented by the following terminal structures (I) to (IV). The term "poly" in each of the terminal structures (I) to (IV) indicates the binding position of the terminal structure and a propylene polymer molecular chain other than the terminal structures.

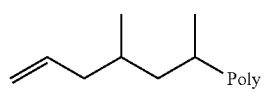

Terminal structure (I)

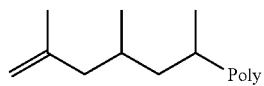

Terminal structure (II)

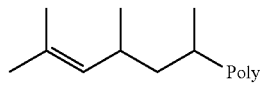

Terminal structure (III)

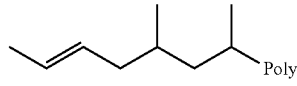

Terminal structure (IV)

The ratio of the number of the unsaturated terminals contained in the polypropylene having terminal unsaturation is usually from 0.1 to 10 per 1,000 carbon atoms, and more preferably 0.4 to 5.0. Further, the ratio of the number of the unsaturated terminal represented by the terminal structure (I), generally referred to as a terminal vinyl, is usually from 0.1 to 2.0, and preferably from 0.4 to 2.0 per 1,000 carbon atoms.

The quantification of the unsaturated terminals can be performed by determining the terminal structures of the polypropylene having terminal unsaturation by $^1$H-NMR measurement. The $^1$H-NMR measurement can be performed according to a conventional method. The assignment of the terminal structures can be performed according to the method described in Macromolecular Rapid Communications 2000, 1103, or the like.

In the case of the terminal structure (I), for example, when the integral value of δ 4.9 to 5.1 (2H) is taken as A, and the total integral value derived from the propylene polymer is taken as B, the ratio of the number of the terminal structure (I) per 1,000 carbon atoms can be obtained by the formula: 1,000×(A/2)/(B/2). In the case of other terminal structures, the ratio of each of the terminal structures can be obtained by replacing the integral value in the above formula with the integral value of the peak assigned to each of the structures, with careful attention to the ratio of hydrogen.

[Requirement (III)]

In the olefin resin (β), when the ratio (hereinafter, also referred to as the ratio E) of a component(s) having a peak temperature of a differential elution curve as measured by cross-fractionation chromatography (CFC) using o-dichlorobenzene as a solvent of less than 65° C., is taken as E wt %, the value of "a" (hereinafter, also referred to as "value a") represented by the following equation (Eq-1) is 1.4 or more, preferably 1.6 or more, and more preferably 2.2 or more.

$$a=(100-E)/P \quad \text{(Eq-1)}$$

The above mentioned differential elution curve is obtained by differentiating a cumulative elution curve obtained in the elution temperature range of from −20° C. to 140° C. Further, by separating the respective elution peaks observed in the differential elution curve into normal distribution curves, the ratio of the components corresponding to the respective elution peaks can be obtained. In the measurement, when the ratio of a component(s) soluble at less than −20° C. (the ratio of a component(s) which remain(s) uncoated on the beads inside the temperature rising elution fractionation (TREF) column in the cooling step of CFC measurement, even at −20° C.) is taken as E(<−20° C.) wt %; the sum of the ratios of eluted components having peaks within the range of −20° C. or more and less than 65° C. is taken as E(<65° C.) wt %; the sum of the ratios of eluted components having peaks within the range of 65° C. or more and 140° C. or less is taken as E(≥65° C.) wt %; the ratio of a component(s) insoluble at 140° C. is taken as E(>140° C.) wt %; and when E(<−20° C.)+E(<65° C.)+E(≥65° C.)+E (>140° C.)=100, it is defined that E= E(<−20° C.)+ E(<65° C.).

In general, the total amount of the olefin resin (β) is fully soluble in o-dichlorobenzene at 140° C., and it is possible to detect easily separable, clear peaks in the temperature range of 65° C. or more. Therefore, when E(>140° C.)=0, it is defined that E=100− E(≥65° C.). The detector to be used in the CFC measurement is preferably an infrared spectrophotometer (detection wavelength: 3.42 μm).

Regarding the ratio E and the ratio P with respect to the total amount of the above mentioned olefin resin (β), the "total amount" refers only to the total amount of the resin obtained through the polymerization step to be described later, and the amounts of the resins, additives and the like added thereto are not included in the above described total amount.

When the value a is within the above mentioned range, it indicates that the olefin resin (β) contains a significant amount of the grafted olefin polymer [R1], namely, the ethylene/α-olefin copolymer having the propylene polymer moiety as side chains.

FIG. 4 shows a graph illustrating the relationship between the ratio E (wt %), the ratio P (wt %) and the value a.

In FIG. 4, the dotted line indicating the relationship when a=1 illustrates the case where the grafted olefin polymer [R1] is not contained, in other words, in the case of a mixture of an ethylene/α-olefin copolymer and a propylene polymer. On the other hand, as the production efficiency of the grafted olefin polymer [R1] is increased, the value of the ratio E with respect to the ratio P is decreased. As shown in FIG. 4, a higher value of "a" indicates a higher production efficiency of the grafted olefin polymer [R1]. The olefin resin (β) according to the present invention is characterized by having a "value a" of 1.4 or more.

In general, a commercially available olefin elastomer, which is used as a polypropylene resin modifier or the like, is composed of an ethylene/α-olefin copolymer (such as ethylene/butene copolymer or ethylene/octene copolymer), and is a polymer in which the ethylene composition is adjusted to about from 90 mol % to 50 mol %. Accordingly, the ratio E of the soluble component(s) in a common ethylene/α-olefin copolymer is substantially 100%.

When an olefin elastomer composed of the ethylene/α-olefin copolymer is added to the propylene resin, the olefin elastomer is dispersed in the propylene resin and plays a role to provide an improved impact resistance. When the amount of the olefin elastomer added is increased, although the impact resistance is improved, the rigidity and the mechanical strength inherent to the propylene resin are decreased. Thus, the impact strength and the rigidity are usually conflicting physical properties in the polypropylene resin composition.

Since the olefin resin (β) includes a high content of the grafted olefin polymer [R1] in which the chains of the crystalline propylene polymer are chemically bound to the ethylene/α-olefin copolymer, the resin is characterized by having a low ratio E relative to the content of the ethylene/α-olefin copolymer.

The addition of the olefin resin (β) as described above to a propylene resin results in the formation of a phase-separated structure in which the ethylene/α-olefin copolymer is finely dispersed in the propylene resin, because the polypropylene side chains of the grafted olefin polymer [R1] have a good compatibility with the propylene resin. At this time, it is considered that the polypropylene side chains of the grafted olefin polymer [R1] get in between the crystals of the propylene resin, at the interface between the ethylene/α-olefin copolymer and the propylene resin, which are mutually incompatible, thereby exhibiting the effect of improving the strength at the interface. Accordingly, the propylene composition including the olefin resin (β) containing a high content of the grafted olefin polymer [R1] has an excellent impact resistance, a high rigidity and mechanical strength, an excellent elongation, and a high surface hardness when formed into a molded article, as well as a markedly improved balance between each of the physical properties.

[Requirement (IV)]

The olefin resin (β) has a melting point (Tm) and a glass transition temperature (Tg), as measured by differential scanning calorimetry (DSC), within the range of from 120 to 165° C. and within the range of from −80 to −30° C., respectively.

The melting point of the olefin resin (β) is preferably from 130 to 160° C., and more preferably from 140° C. to 160° C. In other words, the olefin resin (β) has a melting peak as measured by differential scanning calorimetry (DSC) within the range of from 120 to 165° C., preferably from 130 to 160° C., and more preferably from 140° C. to 160° C.

The temperature at which the above mentioned melting peak is observed, namely, the melting point (Tm), and the heat of fusion (ΔH) to be described later are obtained using DSC by: melting a sample through a first temperature-increasing step; then allowing the melted sample to crystallize through a cooling step to 30° C.; and subjecting the resultant to a second temperature-increasing step (at a temperature rise rate of 10° C./min) and analyzing the endothermic peak observed at this step.

The melting point (Tm) observed within the above mentioned range and the heat of fusion (ΔH) are mainly derived from the polypropylene side chains of the grafted olefin polymer [R1] constituting the olefin resin (β). By having a melting point (Tm) within the above mentioned range, and having a heat of fusion (ΔH) preferably within the range to be described later, the olefin resin (β) exhibits a good compatibility with the propylene resin, and as a result, the propylene resin composition containing the olefin resin (β) and the propylene polymer will have a good balance between the rigidity, heat resistance, and toughness. The melting point (Tm) can be adjusted within the above mentioned range, for example, by adjusting the polymerization temperature or the polymerization pressure in the production step (A) to be described later.

The glass transition temperature (Tg) of the olefin resin (β) is preferably from −80 to −40° C., and more preferably from −70° C. to −50° C.

The glass transition temperature (Tg) is mainly attributed to the properties of the ethylene/α-olefin copolymer, which is the main chain of the grafted olefin polymer [R1]. When the glass transition temperature (Tg) is within the range of from −80° C. to −30° C., the propylene resin composition containing the olefin resin (β) exhibits a good impact resistance.

The glass transition temperature (Tg) within the above mentioned range can be achieved by controlling the type and the composition of the α-olefin to be used for the ethylene/α-olefin copolymer.

[Requirement (V)]

The olefin resin (β) has a hot xylene-insoluble content of less than 3.0 wt %, preferably less than 2.5 wt %, and more preferably less than 2.0 wt %.

The hot xylene-insoluble content is a value calculated by the following method.

A sample is subjected to a heat pressing (heating at 180° C. for 5 minutes, and cooling for 1 minute) to be formed into a sheet having a thickness of 0.4 mm, followed by cutting into fine pieces. A quantity of about 100 mg of the resultant is weighed and wrapped with a screen of 325 mesh, and the screen is immersed in 30 ml of p-xylene in a well-closed container at 140° C. for 3 hours. Next, the screen is retrieved and dried at 80° C. for 2 hours or more, until the constant weight is reached. The hot xylene-insoluble content (wt %) is represented by the following equation:

Hot xylene-insoluble content (wt %)=100×($W3$−$W2$)/($W1$−$W2$)

W1: the total mass of the screen and the sample before the test; W2: the mass of the screen; and W3: total mass of the screen and the sample after the test Since the hot xylene-insoluble content in the olefin resin (β) is zero or very low, as described above, the olefin resin can be well dispersed in the propylene polymer, thereby exhibiting desired effects. On the other hand, when the hot xylene-insoluble content is 3 wt % or more, there are cases where a poor appearance referred to as a dimple could occur in the molded article obtained from the propylene resin composition.

As will be mentioned in the production method to be described later, it is possible to obtain the olefin resin (β) having a hot xylene-insoluble content within the above mentioned range, by using a method of directly producing the grafted olefin polymer in the polymerization step.

[Requirement (VI)]

The olefin resin (β) has a limiting viscosity [η] as measured in decalin at 135° C. within the range of from 0.5 to 5.0 dl/g. The limiting viscosity [η] is preferably from 1.0 to 4.0 dl/g, and more preferably from 1.0 to 3.0 dl/g. When the limiting viscosity [η] is within the above mentioned range, the propylene resin composition containing the olefin resin (β) has a good rigidity and mechanical strength in addition to the impact resistance, as well as a good molding processability.

It is preferred that the olefin resin (β) satisfy one or more of the following requirements (VII) to (XI), in addition to the above mentioned requirements (I) to (VI).

[Requirement (VII)]

The ratio of the repeating units derived from ethylene contained in the olefin resin (β) with respect to the total repeating units contained in the olefin resin (β) is preferably from 20 to 80 mol %, more preferably from 30 to 80 mol %, still more preferably from 40 to 80 mol %, and particularly preferably from 40 to 75 mol %. When the ratio of the repeating units derived from ethylene is within the above mentioned range, it indicates that the olefin resin (β) includes a higher amount of the ethylene/α-olefin copolymer, and thus the propylene resin composition containing the olefin resin (β) will have a good impact resistance and elongation at break.

[Requirement (VIII)]

The requirement (VIII) is that the olefin resin has an elastic modulus of 200 MPa or less. The elastic modulus is more preferably 100 MPa or less, and still more preferably 50 MPa or less.

Since the olefin resin (β) includes the grafted olefin polymer [R1], and thus contains a significant amount of the ethylene/α-olefin copolymer moiety constituting the main chain of the grafted olefin polymer, the olefin resin (β) has flexibility derived from the copolymer moiety. When the olefin resin (β) has an elastic modulus within the above mentioned range, the propylene resin composition containing the olefin resin (β) exhibits a good impact resistance. Note that, the elastic modulus as used herein is a tensile elastic modulus in accordance with ASTM D638.

[Requirement (IX)]

The requirement (IX) is that the olefin resin (β) has a phase-separated structure composed of a sea phase indicating a non-crystalline component and an island phase indicating a crystalline component, and wherein the particles of the island phase have an average diameter as observed in a transmission electron microscope image within the range of from 50 nm to 500 nm. The average diameter of the particles of the island phase is more preferably from 50 nm to 300 nm.

The observation for confirming whether the resin has the above mentioned phase structure or not is carried out as follows.

First, the olefin resin is introduced into a melt blending/molding evaluation apparatus and melt blended at 200° C. and at 60 rpm for 5 minutes. The resulting olefin resin is previously heated for 5 minutes using hydraulic hot press molding machine controlled at 170° C., and then molded for 1 minute under a pressure of 10 MPa. Then the resultant is cooled at 20° C. for 3 minutes under a pressure of 10 MPa to produce a pressed sheet having a predetermined thickness.

The thus obtained pressed sheet is formed into a small piece of 0.5 mm square, and stained with ruthenium acid ($RuO_4$). The resultant is then cut into an ultra-thin slice having a film thickness of 100 nm, using an ultramicrotome equipped with a diamond knife. Thereafter, carbon is deposited on the ultra-thin slice, and the resultant is observed by a transmission electron microscope (acceleration voltage: 100 kV). The average diameter of the particles of the island phase can be obtained as an average long diameter thereof, by performing an image processing and an image analysis of the image obtained by the observation, using commercially available image analysis software.

According to the observation method as described above, the propylene polymer component is observed with a higher contrast, because an inter-crystal non-crystalline moiety in a lamellar structure formed by the component is selectively stained with osmic acid.

In the phase-separated structure of the olefin resin (β), the sea phase is formed of the ethylene/α-olefin copolymer, which is non-crystalline or low-crystalline, and the island phase is formed of the propylene polymer, which is crystalline.

The fact that the ethylene/α-olefin copolymer forms the sea phase indicates that the polymer component is present as a major component. This allows for imparting the impact resistance to the propylene resin composition. Further, the fact that the olefin resin (β) forms an extremely fine micro-phase-separated structure as described above indicates that the olefin resin (β) contains a high amount of the grafted olefin polymer [R1] capable of improving the compatibility of the non-crystalline component or low-crystalline component with the crystalline component. This allows the propylene resin composition containing the olefin resin (β) to have a markedly improved balance between the physical properties.

On the other hand, in a resin which does not contain a sufficient amount of the ethylene/α-olefin copolymer as a major component, the phase derived from the crystalline component does not form a distinct island phase, possibly leading to the formation of a continuous phase. The use of such a resin results in a resin composition having a significantly poor impact resistance. In addition, in the case of a polymer blend obtained by simply blending the ethylene/α-olefin copolymer with the propylene polymer, or a resin which does not include a sufficient amount of the grafted olefin polymer [R1], a fine phase-separated structure as described above is not formed, and an island phase consisting of coarse particles is observed. When such a resin is used, the resulting propylene resin composition fails to exhibit a good balance between the physical properties.

[Requirement (X)]

The requirement (X) is that the olefin resin has a heat of fusion ΔH at the melting peak (Tm) measured by differential scanning calorimetry (DSC) within the range of from 5 to 50 J/g. The heat of fusion ΔH is preferably within the range of from 5 to 40 J/g, and more preferably from 10 to 30 J/g.

The melting peak (Tm) observed within the above mentioned range is derived from the side chains of the grafted olefin polymer [R1], which are composed of a propylene polymer, and from the propylene polymer having terminal unsaturation contained in the olefin resin (β), and the fact that the heat of fusion (ΔH) is observed within the above range indicates that a significant amount of the side chain moiety of the grafted olefin polymer [R1] is contained in the olefin resin (β). In the olefin resin (β) according to the present invention, the presence of the polypropylene side chains of the grafted olefin polymer [R1] allows for exhibiting a reduced stickiness and physical properties similar to those of a heat-resistant elastomer.

On the other hand, when the heat of fusion (ΔH) is lower than the above mentioned range, it indicates a low ratio of the polypropylene side chain, and the resulting resin does not have a heat resistance and has a high stickiness, as with a straight-chain olefin elastomer. Further, the above mentioned effect as a modifier of a propylene resin is not provided sufficiently. When the heat of fusion (ΔH) exceeds the above mentioned range, there are cases where properties derived from the ethylene/α-olefin copolymer, such as flexibility, low temperature properties and the like may be impaired.

[Requirement (XI)]

The requirement (XI) is that, in the olefin resin (β) according to the present invention, the ratio of a component(s) soluble in o-dichlorobenzene at 50° C. or less, as measured by cross-fractionation chromatography (CFC), is 50 wt % or less. The above mentioned ratio is preferably 40 wt % or less.

By satisfying the requirement (X) in addition to the above mentioned requirement (III), the above described effect due to including the grafted olefin polymer [R1] is further enhanced, and the olefin resin (β) has a reduced stickiness and an extremely good handleability. Further, it is assumed that the propylene composition including the olefin resin (β) also has an excellent impact resistance, a high rigidity and mechanical strength, an excellent elongation, and a high surface hardness when formed into a molded article, as well as a further improved balance between the physical properties.

It is further preferred that the olefin resin (β) do not contain any substances which cause coloration, foul odor, contamination of the finally resulting product and the like. Specific examples of the substances which cause coloration, foul odor, contamination of the finally resulting product and the like include hetero atom-containing compounds. The hetero atom-containing compound may be, for example, a compound containing a halogen atom such as a chlorine atom or a bromine atom; a compound containing a chalcogen atom such as an oxygen atom or a sulfur atom; a compound containing a pnictogen compound such as a nitrogen atom or a phosphorus atom; or the like. Specific examples of the compound containing an oxygen atom include maleic anhydride and maleic anhydride reactant.

Further, examples of the substances which cause coloration, foul odor, contamination of the finally resulting product and the like also include metal atom-containing compounds. Specifically, the metal atom-containing compound may be, for example, an alkali metal-containing compound such as one containing sodium or potassium; or an alkali earth metal-containing compound such as one containing magnesium or calcium.

The olefin resin (β) preferably contains the hetero atom-containing compound in an amount of 1,000 ppm or less, more preferably 100 ppm or less, and still more preferably 10 ppm or less. Further, the olefin resin (β) preferably contains the metal atom-containing compound in an amount of 1,000 ppm or less, more preferably 100 ppm or less, and still more preferably 10 ppm or less.

<Method for Producing Olefin Resin (β)>

The olefin resin (β) is produced, for example, by a method including each of the following steps (A) and (B):

(A) polymerizing propylene in the presence of an olefin polymerization catalyst containing a transition metal compound [A] of a transition metal of Group 4 in the periodic table, the compound containing a ligand having a dimethylsilylbisindenyl skeleton, to produce a polypropylene having terminal unsaturation; and (B) copolymerizing the polypropylene having terminal unsaturation produced in the step (A), ethylene, and at least one α-olefin selected from α-olefins having from 3 to 20 carbon atoms, in the presence of an olefin polymerization catalyst containing a bridged metallocene compound [B] represented by the following general formula [B]:

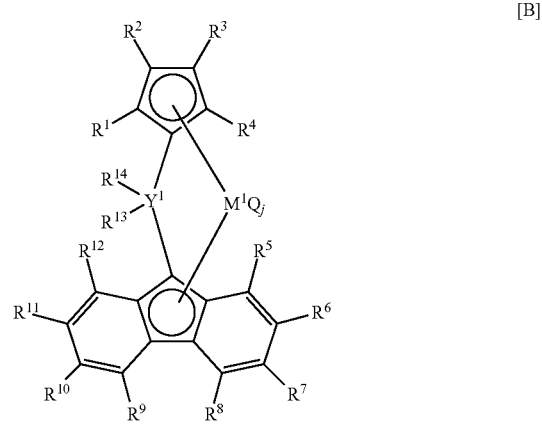

[B]

(wherein in the formula [B], $R^1$, $R^2$, $R^3$, $R^4$, $R^5$, $R^8$, $R^9$ and $R^{12}$ each independently represents a hydrogen atom, a hydrocarbon group, a silicon-containing group, or a hetero atom-containing group other than silicon-containing groups, and two mutually adjacent groups of the groups represented by $R^1$ to $R^4$ are optionally bound together to form a ring;

$R^6$ and $R^{11}$ are the same atom or the same group selected from hydrogen atom, hydrocarbon groups, silicon-containing groups, and hetero atom-containing groups other than the silicon-containing groups; $R^7$ and $R^{10}$ are the same atom or the same group selected from hydrogen atom, hydrocarbon groups, silicon-containing groups, and hetero atom-containing groups other than the silicon-containing groups; $R^6$ and $R^7$ are optionally bound together to form a ring; and $R^{10}$ and $R^{11}$ are optionally bound together to form a ring; with the proviso that all of $R^6$, $R^7$, $R^{10}$ and $R^{11}$ are not hydrogen atoms;

$R^{13}$ and $R^{14}$ each independently represents an aryl group;

$M^1$ represents a zirconium atom or a hafnium atom;

$Y^1$ represents a carbon atom or a silicon atom;

Q represents a halogen atom, a hydrocarbon group, a halogenated hydrocarbon group, a neutral conjugated or non-conjugated diene having from 4 to 10 carbon atoms, an anionic ligand, or a neutral ligand capable of being coordinated with a lone pair of electrons;

j represents an integer of from 1 to 4; and in cases where j is an integer of two or more, a plurality of Qs may be the same as or different from each other).

The steps (A) and (B) will now be described in order.

[Step (A)]

The step (A) is a step of producing a polypropylene having terminal unsaturation, which is a raw material of the polypropylene side chains of the grafted olefin polymer [R1].

This step is a step of polymerizing propylene in the presence of a transition metal compound [A] of a transition metal of Group 4 in the periodic table, the compound containing a ligand having a dimethylsilylbisindenyl skeleton, to produce the polypropylene having terminal unsaturation.

The unsaturated terminals in the polypropylene having terminal unsaturation refer to the above mentioned terminal structures (I) to (IV). The ratio of the number of the terminal structure (I) to the total number of the unsaturated terminals is usually 30% or more, preferably 50% or more, and more preferably 60% or more. Note that, the ratio of the number of the terminal structure (I) to the total number of the unsaturated terminals is the ratio, expressed in percentage, of the number of the terminal structure (I) present per 1,000 carbon atoms, with respect to the sum of the number of each of the terminal structures (I) to (IV) present per 1,000 carbon atoms contained in the polypropylene having terminal unsaturation.

The transition metal compound [A] functions as a polymerization catalyst for producing the polypropylene having terminal unsaturation, in combination with a compound [C] to be described later.

The olefin polymerization catalyst for producing the polypropylene having terminal unsaturation has long been known, as described in Resconi, L. JACS 1992, 114, 1025-1032, and the like. As the side chains of the olefin copolymer [R1], an isotactic or syndiotactic polypropylene having terminal unsaturation is preferred, and more preferred is an isotactic polypropylene having terminal unsaturation.

As the transition metal compound [A] to be included in the olefin polymerization catalyst used for the production of a polypropylene having a high stereoregularity and a high content of the polypropylene having terminal unsaturation having the terminal structure (I) as described above, compounds disclosed in JP H6-100579 A, JP 2001-525461 A, JP 2005-336091 A, JP 2009-299046 A, JP H11-130807 A, JP 2008-285443 A, and the like can be suitably used.

Specific preferred examples of the above mentioned transition metal compound [A] include compounds selected from the group consisting of bridged bis(indenyl)zirconocenes and -hafnocenes. The transition metal compound [A] is more preferably, dimethylsilyl-bridged bis(indenyl) zirconocene or -hafnocene. Still more preferably, the transition metal compound [A] is dimethylsilyl-bridged bis(indenyl) zirconocene. By selecting a zirconocene as the transition metal compound, the production of a long chain branched polymer, which is formed due to an insertion reaction of the polypropylene having terminal unsaturation, is inhibited, and the propylene resin composition containing the olefin resin (β) exhibits desired physical properties. On the other hand, in cases where a large amount of the long chain branched polymer is produced in the step (A), there is a potential risk that the physical properties, such as rigidity, of the propylene resin composition containing the olefin resin (β) may be impaired.

More specifically, dimethylsilylbis(2-methyl-4-phenylindenyl)zirconium dichloride or dimethylsilylbis(2-methyl-4-phenylindenyl)zirconium dimethyl can be suitably used.

The polymerization method to be carried out in the step (A) is not particularly limited, and any of gas phase polymerization, slurry polymerization, bulk polymerization, and solution (melt) polymerization methods can be used.

In cases where the step (A) is carried out using a solution polymerization method, examples of polymerization solvents include aliphatic hydrocarbons, aromatic hydrocarbons, and the like. Specific examples thereof include: aliphatic hydrocarbons such as propane, butane, pentane, hexane, heptane, octane, decane, dodecane, and kerosene; alicyclic hydrocarbons such as cyclopentane, cyclohexane, and methylcyclopentane; aromatic hydrocarbons such as benzene, toluene, and xylene; and halogenated hydrocarbons such as ethylene chloride, chlorobenzene, and dichloromethane. These can be used alone or in combination with two or more kinds. Among these, hexane is preferred in terms of reducing the load in the aftertreatment process.

The polymerization temperature in the step (A) is usually within the range of from 50° C. to 200° C., preferably from 80° C. to 150° C., and more preferably from 80° C. to 130° C. By properly controlling the polymerization temperature, it is possible to obtain a polypropylene having terminal unsaturation having a desired molecular weight and stereoregularity.

The polymerization in the step (A) is carried out usually at a polymerization pressure of from normal pressure to 10 MPa gauge pressure, preferably from normal pressure to 5 MPa gauge pressure, and the polymerization reaction can be carried out using any of a batch method, a semi-continuous method, and a continuous method. In the present invention, it is preferred to use a method in which the monomer is continuously supplied to the reactor to carry out the copolymerization, among the above mentioned methods.

The reaction time (average residence time, in cases where the copolymerization is performed by a continuous method) varies depending on the conditions such as catalyst concentration and polymerization temperature, but it is usually from 0.5 minutes to 5 hours, and preferably from 5 minutes to 3 hours.

The polymer concentration in the step (A) is from 5 to 50 wt %, and preferably from 10 to 40 wt %, during the steady state operation. The polymer concentration is preferably from 15 to 50 wt %, in terms of the viscosity limitation corresponding to the polymerization capability, load in the aftertreatment process (solvent removal), and productivity.

The weight average molecular weight of the polypropylene having terminal unsaturation to be produced in the step (A) is preferably within the range of from 5,000 to 100,000, more preferably from 5,000 to 60,000, and still more preferably from 5,000 to 25,000. When the weight average molecular weight of the polypropylene having terminal unsaturation is within the above mentioned range, the molar concentration of the polypropylene having terminal unsaturation relative to that of ethylene or the α-olefin can be increased in the step (B) to be described later, thereby increasing the efficiency of introducing the polypropylene into the main chain. On the other hand, when the weight average molecular weight exceeds the above mentioned range, the relative molar concentration of the polypropylene having terminal unsaturation is decreased, thereby decreasing the introduction efficiency into the main chain. Further, a weight average molecular weight exceeding the above mentioned range could cause practical problems such as a decrease in the melting point.

The molecular weight distribution (Mw/Mn) of the polypropylene having terminal unsaturation to be produced in the step (A) is from 1.5 to 3.0, and typically, from about 1.7 to 2.5. Depending on the case, a mixture of side chains varying in molecular weight may be used.

The ratio of the number of the unsaturated terminals in the polypropylene having terminal unsaturation produced in the step (A), as measured by $^1$H-NMR, is usually from 0.1 to 10, and more preferably 0.4 to 5.0 per 1,000 carbon atoms. Further, the ratio of the number of the unsaturated terminal represented by the terminal structure (I), a so-called terminal vinyl content, is usually from 0.1 to 2.0, and preferably from 0.4 to 2.0 per 1,000 carbon atoms. When the terminal vinyl content is low, the amount of the polypropylene having terminal unsaturation introduced into the main chain in the subsequent step (B) is reduced, which in turn decreases the amount of the grafted olefin polymer produced, possibly resulting in a failure to obtain desired effects.

As described above, the content of the unsaturated terminals and the ratio of each of the terminal structures, as determined by $^1$H-NMR measurement, can be calculated, for example, according to the method described in Macromolecular Rapid Communications 2000, 1103.

[Step (B)]

The step (B) is a step of copolymerizing the polypropylene having terminal unsaturation produced in the step (A), ethylene, and at least one α-olefin selected from α-olefins having from 3 to 20 carbon atoms, in the presence of an olefin polymerization catalyst containing a bridged metallocene compound [B] represented by the above formula [B].

In the step (B), it is important to select a catalyst which exhibits a sufficient activity at a high temperature and a high copolymerizability, and capable of producing a high molecular weight copolymer. Since a vinyl terminated polypropylene (the terminal structure (I)) has a methyl branch at the 4-position, and has a bulky steric structure, the polymerization of the vinyl terminated polypropylene is difficult compared to that of a straight-chain vinyl monomer. Further, the vinyl terminated polypropylene is not easily copolymerized under low-temperature conditions where the polymer begins to precipitate. Therefore, the catalyst is required to have a capability to exhibit a sufficient activity at a polymerization temperature of preferably 90° C. or more, and to increase the molecular weight of the main chain to a desired level.

In view of the above, the bridged metallocene compound [B] is suitably used in the step (B), in order to obtain the olefin resin (β) according to the present invention, having a high content of polypropylene.

The bridged metallocene compound [B] functions, in combination with the compound [C] to be described later, as an olefin polymerization catalyst for copolymerizing the polypropylene having terminal unsaturation produced in the step (A), ethylene, and at least one α-olefin selected from α-olefins having from 3 to 20 carbon atoms.

A description will now be given regarding the characteristics of the chemical structure of the bridged metallocene compound [B] to be used in the present invention.

The bridged metallocene compound [B] has the following structural characteristics [m1] and [m2].

[m1] One of two ligands is a cyclopentadienyl group optionally containing a substituent, and the other is a fluorenyl group containing a substituent (hereinafter, also referred to as a "substituted fluorenyl group").

[m2] The two ligands are bound by an aryl group-containing covalent bond cross-linking site (hereinafter, also referred to as "cross-linking site") comprising a carbon atom or a silicon atom having the aryl group.

The descriptions will now be given in order, regarding the cyclopentadienyl group optionally containing a substituent, the substituted fluorenyl group, and the cross-linking site, included in the bridged metallocene compound [B]; and other characteristics thereof.

(Cyclopentadienyl Group Optionally Containing Substituent)

In the formula [B], $R^1$, $R^2$, $R^3$ and $R^4$ each independently represents a hydrogen atom, a hydrocarbon group, a silicon-containing group or a hetero atom-containing group other than silicon-containing groups. As a structure for efficiently incorporating the vinyl terminated polypropylene, particularly preferred is a structure in which all of $R^1$, $R^2$, $R^3$ and $R^4$ are hydrogen atoms, or any one or more of $R^1$, $R^2$, $R^3$ and $R^4$ are each a methyl group.

(Substituted Fluorenyl Group)

In the formula [B], $R^5$, $R^8$, $R^9$ and $R^{12}$ each independently represents a hydrogen atom, a hydrocarbon group, a silicon-containing group or a hetero atom-containing group other than silicon-containing groups; and preferred is a hydrogen atom, a hydrocarbon group or a silicon-containing group. $R^6$ and $R^{11}$ are the same atom or the same group selected from hydrogen atom, hydrocarbon groups, silicon-containing groups, and hetero atom-containing groups other than the silicon-containing groups, and preferred is a hydrogen atom, a hydrocarbon group or a silicon-containing group; $R^7$ and $R^{10}$ are the same atom or the same group selected from hydrogen atom, hydrocarbon groups, silicon-containing groups, and hetero atom-containing groups other than the silicon-containing groups, and preferred is a hydrogen atom, a hydrocarbon group or a silicon-containing group; $R^6$ and $R^7$ are optionally bound together to form a ring; and $R^{10}$ and $R^{11}$ are optionally bound together to form a ring; with the proviso that "all of $R^6$, $R^7$, $R^{10}$ and $R^{11}$ are not hydrogen atoms".

From the viewpoint of the polymerization activity, preferably, neither $R^6$ nor $R^{11}$ is a hydrogen atom; more preferably, none of $R^6$, $R^7$, $R^{10}$ and $R^{11}$ is a hydrogen atom; and particularly preferably, $R^6$ and $R^{11}$ are the same group selected from hydrocarbon groups and silicon-containing groups, and $R^7$ and $R^{10}$ are the same group selected from hydrocarbon groups and silicon-containing groups. Further, it is also preferred that $R^6$ and $R^7$ be bound together to form an alicyclic or an aromatic ring, and that $R^{10}$ and $R^{11}$ be bound together to form an alicyclic or an aromatic ring.

Exemplary and preferred groups as the hydrocarbon groups for $R^5$ to $R^{12}$ include hydrocarbon groups (preferably, hydrocarbon groups having from 1 to 20 carbon atoms, hereinafter sometimes referred to as "hydrocarbon groups (f1)"); and silicon-containing groups (preferably silicon-containing groups having from 1 to 20 carbon atoms, hereinafter sometimes referred to as "silicon-containing groups (f2)"). In addition, examples of the substituent of the substituted cyclopentadienyl group include hetero atom-containing groups (excluding the silicon-containing groups (f2)) such as halogenated hydrocarbon groups, oxygen-containing groups, and nitrogen-containing groups). Specific examples of the hydrocarbon groups (f1) include straight-chain hydrocarbon groups such as methyl group, ethyl group, n-propyl group, n-butyl group, n-pentyl group, n-hexyl group, n-heptyl group, n-octyl group, n-nonyl group, n-decanyl group, and allyl group; branched hydrocarbon groups such as isopropyl group, isobutyl group, sec-butyl group, t-butyl group, amyl group, 3-methylpentyl group, neopentyl group, 1,1-diethylpropyl group, 1,1-dimethylbutyl group, 1-methyl-1-propylbutyl group, 1,1-propylbutyl group, 1,1-dimethyl-2-methylpropyl group, and 1-methyl-1-isopropyl-2-methylpropyl group; cyclic saturated hydrocarbon groups such as cyclopentyl group, cyclohexyl group, cycloheptyl group, cyclooctyl group, norbornyl group, and adamantyl group; cyclic unsaturated hydrocarbon groups such as phenyl group, naphthyl group, biphenyl group, phenanthryl group, and anthracenyl group, and nucleus alkyl-substituted forms of these groups; and saturated hydrocarbon groups in which at least one hydrogen atom is substituted with an aryl group, such as benzyl group and cumyl group. Preferred silicon-containing group (f2) for $R^5$ to $R^{12}$ are silicon-containing groups having from 1 to 20 carbon atoms, and examples thereof include silicon-containing groups in which a silicon atom is covalently bound directly to a ring carbon of a cyclopentadienyl group. Specific examples thereof include alkylsilyl groups (such as trimethylsilyl group), and arylsilyl groups (such as triphenylsilyl group).

Specific examples of the hetero atom-containing groups (excluding the silicon-containing groups (f2)) include methoxy group, ethoxy group, phenoxy group, N-methylamino group, trifluoromethyl group, tribromomethyl group, pentafluoroethyl group, and pentafluorophenyl group.

Among the hydrocarbon groups (f1), straight-chain or branched aliphatic hydrocarbon groups having from 1 to 20 carbon atoms are preferred, and specific examples thereof include methyl group, ethyl group, n-propyl group, isopropyl group, n-butyl group, isobutyl group, sec-butyl group, t-butyl group, neopentyl group, n-hexyl group, and the like.

Preferred examples of the substituted fluorenyl group in the case where $R^6$ and $R^7$ ($R^{10}$ and $R^{11}$) are bound together to from an alicyclic or an aromatic ring include groups derived from the compounds represented by the general formulae [III] to [VI] to be described later.

(Cross-Linking Site)

In the formula [B], $R^{13}$ and $R^{14}$ each independently represents an aryl group, and $Y^1$ represents a carbon atom or a silicon atom. An important point in the method for producing the olefin polymer is the fact that the bridging atom $Y^1$ in the cross-linking site includes $R^{13}$ and $R^{14}$, which are aryl groups which may be the same as or different from each other. In terms of ease of production, $R^{13}$ and $R^{14}$ are preferably the same.

Examples of the aryl groups include phenyl group, naphthyl group, anthracenyl group, and these groups in which one or more aromatic hydrogen atoms (sp2-type hydrogen atoms) contained therein are substituted with a substituent. Examples of the substituent include the above mentioned hydrocarbon groups (f1), the silicon-containing groups (f2), halogen atoms and halogenated hydrocarbon groups.

Specific examples of the aryl group include: unsubstituted aryl groups having from 6 to 14 carbon atoms, and preferably from 6 to 10 carbon atoms, such as phenyl group, naphthyl group, anthracenyl group, and biphenyl group; alkyl-substituted aryl groups such as tolyl group, isopropylphenyl group, n-butylphenyl group, t-butylphenyl group, and dimethylphenyl group; cycloalkyl-substituted aryl groups such as cyclohexylphenyl group; halogenated aryl groups such as chlorophenyl group, bromophenyl group, dichlorophenyl group, and dibromophenyl group; and halogenated alkyl-substituted aryl groups such as (trifluoromethyl)phenyl group and bis(trifluoromethyl)phenyl group. The substituents are preferably at the meta and/or the para positions. Among the above mentioned groups, preferred are substituted phenyl groups having substituents at the meta and/or the para positions.

(Other Characteristics of Bridged Metallocene Compound)

In the formula [B], Q represents a halogen atom, a hydrocarbon group, a halogenated hydrocarbon group, a neutral conjugated or non-conjugated diene having from 4 to 10 carbon atoms, an anionic ligand, or a neutral ligand capable of being coordinated with a lone pair of electrons; j represents an integer of from 1 to 4; and in cases where j is an integer of two or more, a plurality of Qs may be the same as or different from each other.

Examples of the hydrocarbon group for Q include straight-chain or branched aliphatic hydrocarbon groups having from 1 to 10 carbon atoms, and alicyclic hydrocarbon groups having from 3 to 10 carbon atoms. Examples of the aliphatic hydrocarbon group include methyl group, ethyl group, n-propyl group, isopropyl group, 2-methylpropyl group, 1,1-dimethylpropyl group, 2,2-dimethylpropyl group, 1,1-diethylpropyl group, 1-ethyl-1-methylpropyl group, 1,1,2,2-tetramethylpropyl group, sec-butyl group, tert-butyl group, 1,1-dimethylbutyl group, 1,1,3-trimethylbutyl group, and neopentyl group. Examples of the alicyclic hydrocarbon group include cyclohexyl group, cyclohexylmethyl group, and 1-methyl-1-cyclohexyl group.

Examples of the halogenated hydrocarbon group for Q include the above mentioned hydrocarbon groups for Q in which at least one hydrogen atom is substituted with a halogen atom.

In the formula [B], $M^1$ represents a zirconium atom or a hafnium atom. Preferred is a hafnium atom, since it allows for copolymerizing the polypropylene having terminal unsaturation at a high efficiency, and producing a copolymer having a high molecular weight. To secure a high productivity, it is important to use a catalyst capable of copolymerizing the polypropylene having terminal unsaturation at a high efficiency, and producing a polymer having a high molecular weight. The reason for this is because, although it is desirable to carry out the reaction under high-temperature conditions in order to secure a high productivity, the molecular weight of the resulting polymer tends to decrease under high-temperature conditions.

(Examples of Preferred Bridged Metallocene Compound [B])

Specific examples of the bridged metallocene compound [B] are represented by the formulae [II] to [VI] below. In the compounds to be exemplified below, octamethyloctahydrodibenzofluorenyl refers to a group derived from a compound having a structure represented by the formula [II], octamethyltetrahydrodicyclopentafluorenyl refers to a group derived from a compound having a structure represented by the formula [III], dibenzofluorenyl refers to a group derived from a compound having a structure represented by the formula [IV], 1,1',3,6,8,8'-hexamethyl-2,7-dihydrodicyclopentafluorenyl refers to a group derived from a compound having a structure represented by the formula [V], and 1,3,3',6,6',8-hexamethyl-2,7-dihydrodicyclopentafluorenyl refers to a group derived from a compound having a structure represented by the formula [VI].

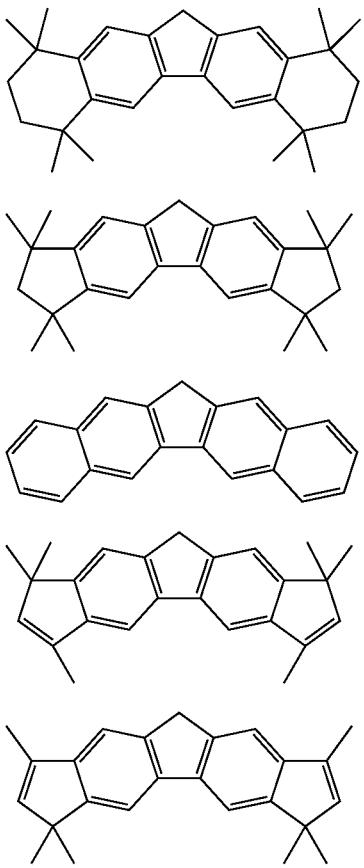

[II]

[III]

[IV]

[V]

[VI]

Examples of the bridged metallocene compound [B] include:
diphenylmethylene(cyclopentadienyl)(2,7-ditert-butylfluorenyl)hafnium dichloride,
diphenylmethylene(cyclopentadienyl)(3,6-ditert-butylfluorenyl) hafnium dichloride,
diphenylmethylene(cyclopentadienyl)(octamethyloctahydrodibenzofluorenyl)hafnium dichloride,
diphenylmethylene(cyclopentadienyl)(octamethyltetrahydrodicyclopentafluorenyl)hafnium dichloride,
diphenylmethylene(cyclopentadienyl)(dibenzofluorenyl)hafnium dichloride,
diphenylmethylene(cyclopentadienyl)(1,1',3,6,8,8'-hexamethyl-2,7-dihydrodicyclopentafluorenyl)hafnium dichloride,
diphenylmethylene(cyclopentadienyl)(1,3,3',6,6',8-hexamethyl-2,7-dihydrodicyclopentafluorenyl)hafnium dichloride,
diphenylmethylene(cyclopentadienyl)(2,7-diphenyl-3,6-ditert-butylfluorenyl)hafnium dichloride,
diphenylmethylene(cyclopentadienyl)(2,7-dimethyl-3,6-ditert-butylfluorenyl)hafnium dichloride,
diphenylmethylene(cyclopentadienyl)(2,7-(trimethylphenyl)-3,6-ditert-butylfluorenyl)hafnium dichloride,
diphenylmethylene(cyclopentadienyl)(2,7-(dimethylphenyl)-3,6-ditert-butylfluorenyl)hafnium dichloride,
diphenylmethylene(cyclopentadienyl)(2,3,6,7-tetratert-butylfluorenyl)hafnium dichloride,
di(p-tolyl)methylene(cyclopentadienyl)(2,7-ditert-butyl fluorenyl)hafnium dichloride,
di(p-tolyl)methylene(cyclopentadienyl)(3,6-ditert-butylfluorenyl)hafnium dichloride,
di(p-tolyl)methylene(cyclopentadienyl)(octamethyloctahydrodibenzofluorenyl)hafnium dichloride,
di(p-tolyl)methylene(cyclopentadienyl)(octamethyltetrahydrodicyclopentafluorenyl)hafnium dichloride,
di(p-tolyl)methylene(cyclopentadienyl)(dibenzofluorenyl)hafnium dichloride,
di(p-tolyl)methylene(cyclopentadienyl)(1,1',3,6,8,8'-hexamethyl-2,7-dihydrodicyclopentafluorenyl)hafnium dichloride,
di(p-tolyl)methylene(cyclopentadienyl)(1,3,3',6,6',8-hexamethyl-2,7-dihydrodicyclopentafluorenyl)hafnium dichloride,
di(p-tolyl)methylene(cyclopentadienyl)(2,7-diphenyl-3,6-ditert-butylfluorenyl)hafnium dichloride,
di(p-tolyl)methylene(cyclopentadienyl)(2,7-dimethyl-3,6-ditert-butylfluorenyl)hafnium dichloride,
di(p-tolyl)methylene(cyclopentadienyl)(2,7-(trimethylphenyl)-3,6-ditert-butylfluorenyl)hafnium dichloride,
di(p-tolyl)methylene(cyclopentadienyl)(2,7-(dimethylphenyl)-3,6-ditert-butylfluorenyl)hafnium dichloride,
di(p-tolyl)methylene(cyclopentadienyl)(2,3,6,7-tetramethylfluorenyl)hafnium dichloride,
di(p-tolyl)methylene(cyclopentadienyl)(2,3,6,7-tetratert-butylfluorenyl)hafnium dichloride,
di(p-chlorophenyl)methylene(cyclopentadienyl)(2,7-ditert-butylfluorenyl)hafnium dichloride,
di(p-chlorophenyl)methylene(cyclopentadienyl)(3,6-ditert-butylfluorenyl)hafnium dichloride,
di(p-chlorophenyl)methylene(cyclopentadienyl)(octamethyloctahydrodibenzofluorenyl)hafnium dichloride,
di(p-chlorophenyl)methylene(cyclopentadienyl)(octamethyltetrahydrodicyclopentafluorenyl)hafnium dichloride,
di(p-chlorophenyl)methylene(cyclopentadienyl)(dibenzofluorenyl)hafnium dichloride,
di(p-chlorophenyl)methylene(cyclopentadienyl)(1,1',3,6,8,8'-hexamethyl-2,7-dihydrodicyclopentafluorenyl)hafnium dichloride,
di(p-chlorophenyl)methylene(cyclopentadienyl)(1,3,3',6,6',8-hexamethyl-2,7-dihydrodicyclopentafluorenyl)hafnium dichloride,
di(p-chlorophenyl)methylene(cyclopentadienyl)(2,7-diphenyl-3,6-ditert-butylfluorenyl)hafnium dichloride,
di(p-chlorophenyl)methylene(cyclopentadienyl)(2,7-dimethyl-3,6-ditert-butylfluorenyl)hafnium dichloride,
di(p-chlorophenyl)methylene(cyclopentadienyl)(2,7-(trimethylphenyl)-3,6-ditert-butylfluorenyl)hafnium dichloride,
di(p-chlorophenyl)methylene(cyclopentadienyl)(2,7-(dimethylphenyl)-3,6-ditert-butylfluorenyl)hafnium dichloride,
di(p-chlorophenyl)methylene(cyclopentadienyl)(2,3,6,7-tetratert-butylfluorenyl)hafnium dichloride,
di(m-chlorophenyl)methylene(cyclopentadienyl)(2,7-ditert-butylfluorenyl)hafnium dichloride,
di(m-chlorophenyl)methylene(cyclopentadienyl)(3,6-ditert-butylfluorenyl)hafnium dichloride,
di(m-chlorophenyl)methylene(cyclopentadienyl)(octamethyloctahydrodibenzofluorenyl)hafnium dichloride,
di(m-chlorophenyl)methylene(cyclopentadienyl)(octamethyltetrahydrodicyclopentafluorenyl)hafnium dichloride,
di(m-chlorophenyl)methylene(cyclopentadienyl)(dibenzofluorenyl)hafnium dichloride,
di(m-chlorophenyl)methylene(cyclopentadienyl)(1,1',3,6,8,8'-hexamethyl-2,7-dihydrodicyclopentafluorenyl)hafnium dichloride, di(m-chlorophenyl)methylene(cyclopentadienyl)(1,3,3',6,6', 8-hexamethyl-2,7-dihydrodicyclopentafluorenyl)hafnium dichloride,
di(m-chlorophenyl)methylene(cyclopentadienyl)(2,7-diphenyl-3,6-ditert-butylfluorenyl)hafnium dichloride,
di(m-chlorophenyl)methylene(cyclopentadienyl)(2,7-dimethyl-3,6-ditert-butylfluorenyl)hafnium dichloride,
di(m-chlorophenyl)methylene(cyclopentadienyl)(2,7-(trimethylphenyl)-3,6-ditert-butylfluorenyl)hafnium dichloride,
di(m-chlorophenyl)methylene(cyclopentadienyl)(2,7-(dimethylphenyl)-3,6-ditert-butylfluorenyl)hafnium dichloride,
di(m-chlorophenyl)methylene(cyclopentadienyl)(2,3,6,7-tetratert-butylfluorenyl)hafnium dichloride,
di(p-bromophenyl)methylene(cyclopentadienyl)(2,7-ditert-butylfluorenyl)hafnium dichloride,
di(p-bromophenyl)methylene(cyclopentadienyl)(3,6-ditert-butyl fluorenyl)hafnium dichloride,
di(p-bromophenyl)methylene(cyclopentadienyl)(octamethyloctahydrodibenzofluorenyl)hafnium dichloride,
di(p-bromophenyl)methylene(cyclopentadienyl)(octamethyltetrahydrodicyclopentafluorenyl)hafnium dichloride,
di(p-bromophenyl)methylene(cyclopentadienyl)(dibenzofluorenyl) hafnium dichloride,
di(p-bromophenyl)methylene(cyclopentadienyl)(1,1',3,6,8, 8'-hexamethyl-2,7-dihydrodicyclopentafluorenyl)hafnium dichloride,
di(p-bromophenyl)methylene(cyclopentadienyl)(1,3,3',6,6', 8-hexamethyl-2,7-dihydrodicyclopentafluorenyl)hafnium dichloride,
di(p-bromophenyl)methylene(cyclopentadienyl)(2,7-diphenyl-3,6-ditert-butylfluorenyl)hafnium dichloride,
di(p-bromophenyl)methylene(cyclopentadienyl)(2,7-dimethyl-3,6-ditert-butylfluorenyl)hafnium dichloride,
di(p-bromophenyl)methylene(cyclopentadienyl)(2,7-(trimethylphenyl)-3,6-ditert-butylfluorenyl)hafnium dichloride,
di(p-bromophenyl)methylene(cyclopentadienyl)(2,7-(dimethylphenyl)-3,6-ditert-butylfluorenyl)hafnium dichloride,
di(p-bromophenyl)methylene(cyclopentadienyl)(2,3,6,7-tetratert-butylfluorenyl)hafnium dichloride,
di(m-trifluoromethyl-phenyl)methylene(cyclopentadienyl) (2,7-ditert-butylfluorenyl)hafnium dichloride,
di(m-trifluoromethyl-phenyl)methylene(cyclopentadienyl) (3,6-ditert-butylfluorenyl)hafnium dichloride,
di(m-trifluoromethyl-phenyl)methylene(cyclopentadienyl) (octamethyloctahydrodibenzofluorenyl)hafnium dichloride,
di(m-trifluoromethyl-phenyl)methylene(cyclopentadienyl) (octamethyltetrahydrodicyclopentafluorenyl)hafnium dichloride,
di(m-trifluoromethyl-phenyl)methylene(cyclopentadienyl) (dibenzofluorenyl)hafnium dichloride,
di(m-trifluoromethyl-phenyl)methylene(cyclopentadienyl) (1,1',3,6,8,8'-hexamethyl-2,7-dihydrodicyclopentafluorenyl)hafnium dichloride,
di(m-trifluoromethyl-phenyl)methylene(cyclopentadienyl) (1,3,3',6,6',8-hexamethyl-2,7-dihydrodicyclopentafluorenyl)hafnium dichloride,
di(m-trifluoromethyl-phenyl)methylene(cyclopentadienyl) (2,7-diphenyl-3,6-ditert-butylfluorenyl)hafnium dichloride,
di(m-trifluoromethyl-phenyl)methylene(cyclopentadienyl) (2,7-dimethyl-3,6-ditert-butylfluorenyl)hafnium dichloride,
di(m-trifluoromethyl-phenyl)methylene(cyclopentadienyl) (2,7-(trimethylphenyl)-3,6-ditert-butylfluorenyl)hafnium dichloride,
di(m-trifluoromethyl-phenyl)methylene(cyclopentadienyl) (2,7-(dimethylphenyl)-3,6-ditert-butylfluorenyl)hafnium dichloride,
di(m-trifluoromethyl-phenyl)methylene(cyclopentadienyl) (2,3,6,7-tetratert-butylfluorenyl)hafnium dichloride,
di(p-trifluoromethyl-phenyl)methylene(cyclopentadienyl) (2,7-ditert-butylfluorenyl)hafnium dichloride,
di(p-trifluoromethyl-phenyl)methylene(cyclopentadienyl) (3,6-ditert-butylfluorenyl)hafnium dichloride,
di(p-trifluoromethyl-phenyl)methylene(cyclopentadienyl) (octamethyloctahydrodibenzofluorenyl)hafnium dichloride,
di(p-trifluoromethyl-phenyl)methylene(cyclopentadienyl) (octamethyltetrahydrodicyclopentafluorenyl)hafnium dichloride,
di(p-trifluoromethyl-phenyl)methylene(cyclopentadienyl) (dibenzofluorenyl)hafnium dichloride,
di(p-trifluoromethyl-phenyl)methylene(cyclopentadienyl) (1,1',3,6,8,8'-hexamethyl-2,7-dihydrodicyclopentafluorenyl)hafnium dichloride,
di(p-trifluoromethyl-phenyl)methylene(cyclopentadienyl) (1,3,3',6,6',8-hexamethyl-2,7-dihydrodicyclopentafluorenyl)hafnium dichloride,
di(p-trifluoromethyl-phenyl)methylene(cyclopentadienyl) (2,7-diphenyl-3,6-ditert-butylfluorenyl)hafnium dichloride,
di(p-trifluoromethyl-phenyl)methylene(cyclopentadienyl) (2,7-dimethyl-3,6-ditert-butylfluorenyl)hafnium dichloride,
di(p-trifluoromethyl-phenyl)methylene(cyclopentadienyl) (2,7-(trimethylphenyl)-3,6-ditert-butylfluorenyl)hafnium dichloride,
di(p-trifluoromethyl-phenyl)methylene(cyclopentadienyl) (2,7-(dimethylphenyl)-3,6-ditert-butylfluorenyl)hafnium dichloride,
di(p-trifluoromethyl-phenyl)methylene(cyclopentadienyl) (2,3,6,7-tetratert-butylfluorenyl)hafnium dichloride,
di(p-tert-butyl-phenyl)methylene(cyclopentadienyl)(2,7-ditert-butylfluorenyl)hafnium dichloride,
di(p-tert-butyl-phenyl)methylene(cyclopentadienyl)(3,6-ditert-butylfluorenyl)hafnium dichloride,
di(p-tert-butyl-phenyl)methylene(cyclopentadienyl)(octamethyloctahydrodibenzofluorenyl)hafnium dichloride,
di(p-tert-butyl-phenyl)methylene(cyclopentadienyl)(octamethyltetrahydrodicyclopentafluorenyl)hafnium dichloride,
di(p-tert-butyl-phenyl)methylene(cyclopentadienyl)(dibenzofluorenyl)hafnium dichloride,
di(p-tert-butyl-phenyl)methylene(cyclopentadienyl)(1,1',3, 6,8,8'-hexamethyl-2,7-dihydrodicyclopentafluorenyl)hafnium dichloride,
di(p-tert-butyl-phenyl)methylene(cyclopentadienyl)(1,3,3', 6,6',8-hexamethyl-2,7-dihydrodicyclopentafluorenyl)hafnium dichloride,
di(p-tert-butyl-phenyl)methylene(cyclopentadienyl)(2,7-diphenyl-3,6-ditert-butylfluorenyl)hafnium dichloride,
di(p-tert-butyl-phenyl)methylene(cyclopentadienyl)(2,7-dimethyl-3,6-ditert-butylfluorenyl)hafnium dichloride,
di(p-tert-butyl-phenyl)methylene(cyclopentadienyl)(2,7-(trimethylphenyl)-3,6-ditert-butylfluorenyl)hafnium dichloride,
di(p-tert-butyl-phenyl)methylene(cyclopentadienyl)(2,7-(dimethylphenyl)-3,6-ditert-butylfluorenyl)hafnium dichloride, di(p-tert-butyl-phenyl)methylene(cyclopentadienyl)(2,3,6,7-tetratert-butylfluorenyl)hafnium dichloride,
di(p-n-butyl-phenyl)methylene(cyclopentadienyl)(2,7-ditert-butylfluorenyl)hafnium dichloride,
di(p-n-butyl-phenyl)methylene(cyclopentadienyl)(3,6-ditert-butylfluorenyl)hafnium dichloride,
di(p-n-butyl-phenyl)methylene(cyclopentadienyl)(octamethyloctahydrodibenzofluorenyl)hafnium dichloride,
di(p-n-butyl-phenyl)methylene(cyclopentadienyl)(octamethyltetrahydrodicyclopentafluorenyl)hafnium dichloride,
di(p-n-butyl-phenyl)methylene(cyclopentadienyl)(dibenzofluorenyl)hafnium dichloride,
di(p-n-butyl-phenyl)methylene(cyclopentadienyl)(1,1',3,6,8,8'-hexamethyl-2,7-dihydrodicyclopentafluorenyl)hafnium dichloride,
di(p-n-butyl-phenyl)methylene(cyclopentadienyl)(1,3,3',6,6',8-hexamethyl-2,7-dihydrodicyclopentafluorenyl)hafnium dichloride,
di(p-n-butyl-phenyl)methylene(cyclopentadienyl)(2,7-diphenyl-3,6-ditert-butylfluorenyl)hafnium dichloride,
di(p-n-butyl-phenyl)methylene(cyclopentadienyl)(2,7-dimethyl-3,6-ditert-butylfluorenyl)hafnium dichloride,
di(p-n-butyl-phenyl)methylene(cyclopentadienyl)(2,7-(trimethylphenyl)-3,6-ditert-butylfluorenyl)hafnium dichloride,
di(p-n-butyl-phenyl)methylene(cyclopentadienyl)(2,7-(dimethyl phenyl)-3,6-ditert-butylfluorenyl)hafnium dichloride,
di(p-n-butyl-phenyl)methylene(cyclopentadienyl)(2,3,6,7-tetra tert-butylfluorenyl)hafnium dichloride,
di(p-biphenyl)methylene(cyclopentadienyl)(2,7-ditert-butylfluorenyl)hafnium dichloride,
di(p-biphenyl)methylene(cyclopentadienyl)(3,6-ditert-butylfluorenyl)hafnium dichloride,
di(p-biphenyl)methylene(cyclopentadienyl)(octamethyloctahydrodibenzofluorenyl)hafnium dichloride,
di(p-biphenyl)methylene(cyclopentadienyl)(octamethyltetrahydrodicyclopentafluorenyl)hafnium dichloride,
di(p-biphenyl)methylene(cyclopentadienyl)(dibenzofluorenyl)hafnium dichloride,
di(p-biphenyl)methylene(cyclopentadienyl)(1,1',3,6,8,8'-hexamethyl-2,7-dihydrodicyclopentafluorenyl)hafnium dichloride,
di(p-biphenyl)methylene(cyclopentadienyl)(1,3,3',6,6',8-hexamethyl-2,7-dihydrodicyclopentafluorenyl)hafnium dichloride,
di(p-biphenyl)methylene(cyclopentadienyl)(2,7-diphenyl-3,6-ditert-butylfluorenyl)hafnium dichloride,
di(p-biphenyl)methylene(cyclopentadienyl)(2,7-dimethyl-3,6-di tert-butylfluorenyl)hafnium dichloride,
di(p-biphenyl)methylene(cyclopentadienyl)(2,7-(trimethylphenyl)-3,6-ditert-butylfluorenyl)hafnium dichloride,
di(p-biphenyl)methylene(cyclopentadienyl)(2,7-(dimethylphenyl)-3,6-ditert-butylfluorenyl)hafnium dichloride,
di(p-biphenyl)methylene(cyclopentadienyl)(2,3,6,7-tetratert-butylfluorenyl)hafnium dichloride,
di(1-naphthyl)methylene(cyclopentadienyl)(2,7-ditert-butylfluorenyl)hafnium dichloride,
di(1-naphthyl)methylene(cyclopentadienyl)(3,6-ditert-butylfluorenyl)hafnium dichloride,
di(1-naphthyl)methylene(cyclopentadienyl)(octamethyloctahydrodibenzofluorenyl)hafnium dichloride,
di(1-naphthyl)methylene(cyclopentadienyl)(octamethyltetrahydrodicyclopentafluorenyl)hafnium dichloride,
di(1-naphthyl)methylene(cyclopentadienyl)(dibenzofluorenyl)hafnium dichloride,
di(1-naphthyl)methylene(cyclopentadienyl)(1,1',3,6,8,8'-hexamethyl-2,7-dihydrodicyclopentafluorenyl)hafnium dichloride,
di(1-naphthyl)methylene(cyclopentadienyl)(1,3,3',6,6',8-hexamethyl-2,7-dihydrodicyclopentafluorenyl)hafnium dichloride,
di(1-naphthyl)methylene(cyclopentadienyl)(2,7-diphenyl-3,6-ditert-butylfluorenyl)hafnium dichloride,
di(1-naphthyl)methylene(cyclopentadienyl)(2,7-dimethyl-3,6-ditert-butylfluorenyl)hafnium dichloride,
di(1-naphthyl)methylene(cyclopentadienyl)(2,7-(trimethylphenyl)-3,6-ditert-butylfluorenyl)hafnium dichloride,
di(1-naphthyl)methylene(cyclopentadienyl)(2,7-(dimethylphenyl)-3,6-ditert-butylfluorenyl)hafnium dichloride,
di(1-naphthyl)methylene(cyclopentadienyl)(2,3,6,7-tetratert-butylfluorenyl)hafnium dichloride,
di(2-naphthyl)methylene(cyclopentadienyl)(2,7-ditert-butylfluorenyl)hafnium dichloride,
di(2-naphthyl)methylene(cyclopentadienyl)(3,6-ditert-butylfluorenyl)hafnium dichloride,
di(2-naphthyl)methylene(cyclopentadienyl)(octamethyloctahydrodibenzofluorenyl)hafnium dichloride,
di(2-naphthyl)methylene(cyclopentadienyl)(octamethyltetrahydrodicyclopentafluorenyl)hafnium dichloride,
di(2-naphthyl)methylene(cyclopentadienyl)(dibenzofluorenyl)hafnium dichloride,
di(2-naphthyl)methylene(cyclopentadienyl)(1,1',3,6,8,8'-hexamethyl-2,7-dihydrodicyclopentafluorenyl)hafnium dichloride,
di(2-naphthyl)methylene(cyclopentadienyl)(1,3,3',6,6',8-hexamethyl-2,7-dihydrodicyclopentafluorenyl)hafnium dichloride,
di(2-naphthyl)methylene(cyclopentadienyl)(2,7-diphenyl-3,6-ditert-butylfluorenyl)hafnium dichloride,
di(2-naphthyl)methylene(cyclopentadienyl)(2,7-dimethyl-3,6-ditert-butylfluorenyl)hafnium dichloride,
di(2-naphthyl)methylene(cyclopentadienyl)(2,7-(trimethylphenyl)-3,6-ditert-butylfluorenyl)hafnium dichloride,
di(2-naphthyl)methylene(cyclopentadienyl)(2,7-(dimethylphenyl)-3,6-ditert-butylfluorenyl)hafnium dichloride,
di(2-naphthyl)methylene(cyclopentadienyl)(2,3,6,7-tetra-butylfluorenyl)hafnium dichloride,
di(m-tolyl)methylene(cyclopentadienyl)(2,7-ditert-butyl fluorenyl)hafnium dichloride,
di(m-tolyl)methylene(cyclopentadienyl)(2,7-dimethylfluorenyl) hafnium dichloride,
di(m-tolyl)methylene(cyclopentadienyl)(3,6-ditert-butylfluorenyl)hafnium dichloride,
di(p-isopropylphenyl)methylene(cyclopentadienyl)(octamethyloctahydrodibenzofluorenyl)hafnium dichloride,
di(p-isopropylphenyl)methylene(cyclopentadienyl)(octamethyloctahydrodibenzofluorenyl)hafnium dichloride,
di(p-isopropylphenyl)methylene(cyclopentadienyl)(2,7-ditert-butylfluorenyl)hafnium dichloride,
di(p-isopropylphenyl)methylene(cyclopentadienyl)(3,6-ditert-butylfluorenyl)hafnium dichloride,
diphenylsilylene(cyclopentadienyl)(2,7-ditert-butylfluorenyl)hafnium dichloride,
diphenylsilylene(cyclopentadienyl)(3,6-ditert-butylfluorenyl) hafnium dichloride,
diphenylsilylene(cyclopentadienyl)(octamethyloctahydrodibenzofluorenyl)hafnium dichloride,
diphenylsilylene(cyclopentadienyl)(octamethyltetrahydrodicyclopentafluorenyl)hafnium dichloride,
diphenylsilylene(cyclopentadienyl)(dibenzofluorenyl)hafnium dichloride, diphenylsilylene(cyclopentadienyl)(1,1',3,6,8,8'-hexamethyl-2,7-dihydrodicyclopentafluorenyl)hafnium dichloride,
diphenylsilylene(cyclopentadienyl)(1,3,3',6,6',8-hexamethyl-2,7-dihydrodicyclopentafluorenyl)hafnium dichloride,
diphenylsilylene(cyclopentadienyl)(2,7-diphenyl-3,6-ditert-butylfluorenyl)hafnium dichloride,
diphenylsilylene(cyclopentadienyl)(2,7-dimethyl-3,6-ditert-butylfluorenyl)hafnium dichloride,
diphenylsilylene(cyclopentadienyl)(2,7-(trimethylphenyl)-3,6-ditert-butylfluorenyl)hafnium dichloride,
diphenylsilylene(cyclopentadienyl)(2,7-(dimethylphenyl)-3,6-ditert-butylfluorenyl)hafnium dichloride, and
diphenylsilylene(cyclopentadienyl)(2,3,6,7-tetratert-butylfluorenyl)hafnium dichloride.

Examples of the bridged metallocene compound [B] also include compounds obtained by replacing, in the above mentioned compounds, "dichloride" with "difluoride", "dibromide", "diiodide", "dimethyl", "methylethyl" or the like; and compounds obtained by replacing "cyclopentadienyl" with "3-tert-butyl-5-methyl-cyclopentadienyl", "3,5-dimethyl-cyclopentadienyl", "3-tert-butyl-cyclopentadienyl", "3-methyl-cyclopentadienyl" or the like.

The bridged metallocene compound as described above can be produced by a known method, and the production method thereof is not particularly limited. Examples of the known method include the methods described in WO 01/27124 A and WO 04/029062 A, filed by the present inventors.

The bridged metallocene compound [B] as described above is used alone or in combination with two or more kinds.

The step (B) can be carried out by a solution (melt) polymerization, and polymerization conditions are not particularly limited as long as a solution polymerization process for producing an olefin polymer is used, but it preferably includes a step of obtaining a polymerization reaction solution described below.

The step of obtaining a polymerization reaction solution is a step of obtaining a polymerization reaction solution of a copolymer of ethylene, an α-olefin(s) having from 3 to 20 carbon atoms, and the polypropylene having terminal unsaturation produced in the step (A), using an aliphatic hydrocarbon as a polymerization solvent, and in the presence of a metallocene catalyst containing the bridged metallocene compound [B], preferably, the bridged metallocene compound [B], wherein in the general formula [B], $R^{13}$ and $R^{14}$ bound to $Y^1$ are each a phenyl group or a substituted phenyl group substituted with an alkyl group or a halogen group, and $R^7$ and $R^{10}$ each contains a transition metal compound having an alkyl substituent.

In the step (B), the polypropylene having terminal unsaturation produced in the step (A) is fed to a reactor used in the step (B), in the form of a solution or slurry. The feeding method is not particularly limited, and the polymerization solution obtained in the step (A) may be continuously fed to the reactor in the step (B), or alternatively, the polymerization solution obtained in the step (A) may be stored in a buffer tank once, and then fed to the reactor in the step (B).

Examples of the polymerization solvent to be used in the step (B) include aliphatic hydrocarbons, aromatic hydrocarbons, and the like. Specific examples thereof include: aliphatic hydrocarbons such as propane, butane, pentane, hexane, heptane, octane, decane, dodecane, and kerosene; alicyclic hydrocarbons such as cyclopentane, cyclohexane, and methylcyclopentane; aromatic hydrocarbons such as benzene, toluene, and xylene; and halogenated hydrocarbons such as ethylene chloride, chlorobenzene, and dichloromethane. These can be used alone or in combination with two or more kinds. The polymerization solvent used in the step (B) may be the same as or different from the polymerization solvent used in the step (A). Among these, preferred are aliphatic hydrocarbons such as hexane and heptane, from the industrial point of view. Hexane is more preferred in terms of the separation from the olefin resin (β) and purification.

The polymerization temperature in the step (B) is preferably within the range of from 90° C. to 200° C., and more preferably, from 100° C. to 200° C. The temperature within the above range is preferred, because the temperature at which the polypropylene having terminal unsaturation is well dissolved in an aliphatic hydrocarbon, such as hexane or heptane, which is preferably used as a polymerization solvent in industrial settings, is 90° C. or more. The higher the temperature, the more preferred it is, in terms of increasing the amount of polypropylene side chains introduced. A higher temperature is preferred, also from the view point of improving the productivity.

The polymerization in the step (B) is carried out usually at a polymerization pressure of from normal pressure to 10 MPa gauge pressure, preferably from normal pressure to 5 MPa gauge pressure, and the polymerization reaction can be carried out using any of a batch method, a semi-continuous method, and a continuous method. It is also possible to carry out the polymerization in two or more stages varying in reaction conditions. In the present invention, it is preferred to use a method in which monomers are continuously supplied to the reactor to carry out the copolymerization, among the above mentioned methods.

The reaction time (average residence time, in cases where the copolymerization is performed by a continuous method) in the step (B) varies depending on the conditions such as catalyst concentration and polymerization temperature, but it is usually from 0.5 minutes to 5 hours, and preferably from 5 minutes to 3 hours.

The polymer concentration in the step (B) is from 5 to 50 wt %, and preferably from 10 to 40 wt %, during the steady state operation. The polymer concentration is preferably from 15 to 35 wt %, in terms of the viscosity limitation corresponding to the polymerization capability, load in the aftertreatment process (solvent removal), and productivity.

The molecular weight of the resulting copolymer can be adjusted by allowing hydrogen to exist in the polymerization system, or by changing the polymerization temperature. It is also possible to adjust the molecular weight by controlling the amount used of the compound [C1] to be described later. Specific examples thereof include triisobutylaluminum, methylaluminoxane, diethylzinc and the like. In the case of adding hydrogen, an adequate amount to be added is about 0.001 to 100 NL per 1 kg of olefin.

[Compound [C]]

In the method for producing the olefin resin (β) according to the present invention, it is preferred to use the compound [C] to be described later, along with the transition metal compound [A] and the bridged metallocene compound [B] used as the olefin polymerization catalysts in the above mentioned steps (A) and (B).

The compound [C] is a compound which reacts with the transition metal compound [A] and the bridged metallocene compound [B] to function as an olefin polymerization catalyst. Specifically, the compound [C] is a compound selected from an organometallic compound [C1], an organoaluminum oxy compound [C2], and a compound [C3] which reacts with the transition metal compound [A] or the bridged metallocene compound [B] to form an ion pair. The compounds [C1] to [C3] will now be described in order.

(Organometallic Compound [C1])

Specific examples of the organometallic compound [C1] to be used in the present invention include an organoaluminum compound represented by the following general formula (C1-a); an alkylated complex compound of a metal of Group 1 in the periodic table and aluminum, represented by the general formula (C1-b); and a dialkyl compound of a metal of Group 2 or Group 12 in the periodic table, represented by the general formula (C1-c). Note, however, that the organometallic compound [C1] does not include the organoaluminum oxy compound [C2] to be described later.

$$R^a_p Al(OR^b)_q H_r Y_s \quad (C1\text{-}a)$$

In the general formula (C-1a) above, $R^a$ and $R^b$, which may be the same or different, each represents a hydrocarbon group having from 1 to 15 carbon atoms, and preferably from 1 to 4 carbon atoms; Y represents a halogen atom; and p, q r, and s are numbers which satisfy the following relations: $0 < p \le 3$, $0 \le q < 3$, $0 \le r < 3$, $0 \le s < 3$, and $p+q+r+s=3$.)

$$M^3 AlR^c_4 \quad (C1\text{-}b)$$

In the general formula (C1-b) above, $M^3$ represents Li, Na or K; and $R^c$ represents a hydrocarbon group having from 1 to 15 carbon atoms, and preferably from 1 to 4 carbon atoms.)

$$R^d R^e M^4 \quad (C1\text{-}c)$$

In the general formula (C1-c) above, $R^d$ and $R^e$, which may be the same or different, each represents a hydrocarbon group having from 1 to 15 carbon atoms, and preferably from 1 to 4 carbon atoms; and $M^4$ represents Mg, Zn or Cd.

Examples of the organoaluminum compound represented by the general formula (C1-a) include compounds represented by the following general formulae (C-1a-1) to (C-1a-4):

an organoaluminum compound represented by:

$$R^a_p Al(OR^b)_{3-p} \quad (C\text{-}1a\text{-}1)$$

(wherein, $R^a$ and $R^b$, which may be the same or different, each represents a hydrocarbon group having from 1 to 15 carbon atoms, and preferably from 1 to 4 carbon atoms, and p is preferably a number satisfying $1.5 \le p \le 3$);

an organoaluminum compound represented by:

$$R^a_p AlY_{3-p} \quad (C\text{-}1a\text{-}2)$$

(wherein, $R^a$ represents a hydrocarbon group having from 1 to 15 carbon atoms, and preferably from 1 to 4 carbon atoms; Y represents a halogen atom; and p is preferably a number satisfying $0 < p < 3$);

an organoaluminum compound represented by:

$$R^a_p AlH_{3-p} \quad (C\text{-}1a\text{-}3)$$

(wherein, $R^a$ represents a hydrocarbon group having from 1 to 15 carbon atoms, and preferably from 1 to 4 carbon atoms; and p is preferably a number satisfying $2 \le p < 3$); and an organoaluminum compound represented by:

$$R^a_p Al(OR^b)_q Y_s \quad (C\text{-}1a\text{-}4)$$

(wherein, $R^a$ and $R^b$, which may be the same or different, each represents a hydrocarbon group having from 1 to 15 carbon atoms, and preferably from 1 to 4 carbon atoms; Y represents a halogen atom; and p, q, and s are numbers which satisfy the following relations: $0 < p \le 3$, $0 \le q < 3$, $0 \le s < 3$, and $p+q+s=3$).

Specific examples of the organoaluminum compound represented by the general formula (C1-a) include:

tri-n-alkylaluminums such as trimethylaluminum, triethylaluminum, tri-n-butylaluminum, tripropylaluminum, tripentylaluminum, trihexylaluminum, trioctylaluminum, and tridecyl aluminum;

tri-branched alkylaluminums such as triisopropylaluminum, triisobutylaluminum, tri-sec-butylaluminum, tri-tert-butylaluminum, tri-2-methylbutylaluminum, tri-3-methylbutylaluminum, tri-2-methylpentylaluminum, tri-3-methylpentylaluminum, tri-4-methylpentylaluminum, tri-2-methylhexylaluminum, tri-3-methyl hexyl aluminum, and tri-2-ethylhexylaluminum;

tricycloalkylaluminums such as tricyclohexylaluminum, and tricyclooctylaluminum;

triarylaluminums such as triphenylaluminum, and tritolylaluminum;

dialkylaluminum hydrides such as diisobutylaluminum hydride;

trialkenylaluminums such as triisoprenylaluminum represented, for example, by $(i\text{-}C_4H_9)_x Al_y (C_5H_{10})_z$ (wherein, x, y, and z are positive numbers, and $z \ge 2x$);

alkylaluminum alkoxides such as isobutylaluminum methoxide, isobutylaluminum ethoxide, and isobutylaluminum isopropoxide; dialkylaluminum alkoxides such as dimethylaluminum methoxide, diethylaluminum ethoxide, and dibutylaluminum butoxide;

alkylaluminum sesquialkoxides such as ethylaluminum sesquiethoxide, and butylaluminum sesquibutoxide;

partially alkoxylated alkylaluminums having an average composition represented by $R^a_{2.5} Al(OR^b)_{0.5}$ (wherein, $R^a$ and $R^b$ may be the same or different and each represents a hydrocarbon group having from 1 to 15 carbon atoms, and preferably from 1 to 4 carbon atoms);

dialkylaluminum aryloxides such as diethylaluminum phenoxide, diethylaluminum(2,6-di-t-butyl-4-methylphenoxide), ethylaluminumbis(2,6-di-t-butyl-4-methylphenoxide), diisobutylaluminum(2,6-di-t-butyl-4-methylphenoxide), and isobutylaluminumbis(2,6-di-t-butyl-4-methylphenoxide); dialkylaluminum halides such as dimethylaluminum chloride, diethylaluminum chloride, dibutylaluminum chloride, diethylaluminum bromide, and diisobutylaluminum chloride;

alkylaluminum sesquihalides such as ethylaluminum sesquichloride, butylaluminum sesquichloride, and ethylaluminum sesquibromide;

partially halogenated alkylaluminums such as alkylaluminum dihalides, for example, ethylaluminum dichloride, propylaluminum dichloride, and butylaluminum dibromide;

dialkylaluminum hydrides such as diethylaluminum hydride, and dibutylaluminum hydride;

other partially hydrogenated alkylaluminums such as alkylaluminum dihydrides, for example, ethylaluminum dihydride, and propylaluminum dihydride;

partially alkoxylated and halogenated alkylaluminums such as ethylaluminum ethoxychloride, butylaluminum butoxychloride, and ethylaluminum ethoxybromide; and the like.

Further, a compound similar to the compound represented by the formula (C1-a) can also be used in the present invention, and examples of such a compound include an organoaluminum compound in which two or more aluminum compounds are bound via a nitrogen atom. Specific examples thereof include $(C_2H_5)_2AlN(C_2H_5)Al(C_2H_5)_2$.

Examples of the compound represented by the general formula (C1-b) include LiAl(C$_2$H$_5$)$_4$, LiAl(C$_7$H$_{15}$)$_4$, and the like.

Examples of the compound represented by the general formula (C1-c) include dimethylmagnesium, diethylmagnesium, dibutylmagnesium, butylethylmagnesium, dimethylzinc, diethylzinc, diphenylzinc, di-n-propylzinc, diisopropylzinc, di-n-butylzinc, diisobutylzinc, bis(pentafluorophenyl) zinc, dimethylcadmium, diethylcadmium, and the like.

Further, other examples of the organometallic compound [C1] which can be used include methyllithium, ethyllithium, propyllithium, butyllithium, methylmagnesium bromide, methylmagnesium chloride, ethylmagnesium bromide, ethylmagnesium chloride, propylmagnesium bromide, propylmagnesium chloride, butylmagnesium bromide, butylmagnesium chloride, and the like.

Still further, it is also possible to use, as the organometallic compound [C1], a combination of compounds capable of forming the above mentioned organoaluminum compound in the polymerization system, for example, a combination of a halogenated aluminum and an alkyllithium, or a combination of a halogenated aluminum and an alkylmagnesium.

The organometallic compound [C1] as described above is used alone, or in combination of two or more kinds.

(Organoaluminum Oxy Compound [C2])

The organoaluminum oxy compound [C2] to be used in the present invention may be a conventionally known aluminoxane, or a benzene-insoluble organoaluminum oxy compound such as one exemplified in JP H2-78687 A. Specific examples of the organoaluminum oxy compound [C2] include methylaluminoxane, ethylaluminoxane, isobutylaluminoxane and the like.

A conventionally known aluminoxane can be produced, for example, by any of the following methods, and it is usually obtained as a solution in a hydrocarbon solvent.

(1) A method in which an organoaluminum compound such as a trialkylaluminum is added to a hydrocarbon medium suspension of a compound containing adsorbed water or a salt containing water of crystallization, such as, magnesium chloride hydrate, copper sulfate hydrate, aluminum sulfate hydrate, nickel sulfate hydrate or cerous chloride hydrate, to allow the adsorbed water or the water of crystallization to react with the organoaluminum compound.

(2) A method in which water, ice or water vapor is allowed to directly react with an organoaluminum compound such as a trialkylaluminum in a medium such as benzene, toluene, ethyl ether, or tetrahydrofuran.

(3) A method in which an organoaluminum compound such as a trialkylaluminum is reacted with an organic tin oxide such as dimethyltin oxide or dibutyltin oxide in a medium such as decane, benzene, or toluene.

The above mentioned aluminoxane may contain a small amount of an organometallic component. Further, after removing the solvent or unreacted organoaluminum compound from the recovered solution of the aluminoxane by distillation, the resulting aluminoxane may be redissolved in a solvent, or suspended in a poor solvent for aluminoxane.

Specific examples of the organoaluminum compound used in the production of aluminoxane include the same as those exemplified as the organoaluminum compounds represented by the general formula (C1-a).

Among these, preferred is a trialkylaluminum or a tricycloalkylaluminum, and particularly preferred is trimethylaluminum.

The organoaluminum compound as described above is used alone, or in combination of two or more kinds.

Examples of the solvent to be used in the production of aluminoxane include hydrocarbon solvents including: aromatic hydrocarbons such as benzene, toluene, xylene, cumene, and cymene; aliphatic hydrocarbons such as pentane, hexane, heptane, octane, decane, dodecane, hexadecane, and octadecane; alicyclic hydrocarbons such as cyclopentane, cyclohexane, cyclooctane, and methylcyclopentane; petroleum fractions such as gasoline, kerosene, and gas oil; and halides, particularly, chlorides and bromides, of the above mentioned aromatic hydrocarbons, aliphatic hydrocarbons, and alicyclic hydrocarbons. In addition, ethers such as ethyl ether and tetrahydrofuran can also be used. Of these solvents, particularly preferred is an aromatic hydrocarbon or an aliphatic hydrocarbon.

Further, it is preferred that the benzene-insoluble organoaluminum oxy compound to be used in the present invention contain an Al component soluble in benzene at 60° C. in an amount of usually 10% or less, preferably 5% or less, and particularly preferably 2% or less, in terms of Al atom. In other words, the benzene-insoluble organoaluminum oxy compound is preferably insoluble or poorly soluble in benzene.

The organoaluminum oxy compound [C2] to be used in the present invention may also be, for example, an organoaluminum oxy compound containing boron, represented by the following general formula (III):

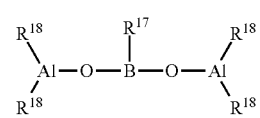

(III)

(wherein in the general formula (III), R$^{17}$ represents a hydrocarbon group having from 1 to 10 carbon atoms; and four R$^{18}$s, which may be the same or different, each represents a hydrogen atom, a halogen atom, or a hydrocarbon group having from 1 to 10 carbon atoms).

The organoaluminum oxy compound containing boron represented by the general formula (III) above can be produced by reacting an alkylboronic acid represented by the following general formula (IV) with an organoaluminum compound at a temperature of from −80° C. to room temperature for one minute to 24 hours in an inert solvent under an inert gas atmosphere:

(wherein in the general formula (IV), R$^{19}$ represents the same group as defined for R$^{17}$ in the general formula (III)).

Specific examples of the alkylboronic acid represented by the general formula (IV) include methylboronic acid, ethylboronic acid, isopropylboronic acid, n-propylboronic acid, n-butylboronic acid, isobutylboronic acid, n-hexylboronic acid, cyclohexylboronic acid, phenylboronic acid, 3,5-difluorophenylboronic acid, pentafluorophenylboronic acid, and 3,5-bis(trifluoromethyl)phenylboronic acid. Among these, preferred are methylboronic acid, n-butylboronic acid, isobutylboronic acid, 3,5-difluorophenylboronic acid, and pentafluorophenylboronic acid. These may be used alone or in combination of two or more kinds.

Specific examples of the organoaluminum compound to be reacted with the alkylboronic acid as described above include the same as those exemplified as the organoaluminum compounds represented by the general formula (C-1a) above.

The organoaluminum compound is preferably a trialkylaluminum or a tricycloalkylaluminum, and particularly preferably, trimethylaluminum, triethylaluminum, or triisobutylaluminum. These may be used alone or in combination of two or more kinds.

The organoaluminum oxy compound [C2] as described above is used alone, or in combination of two or more kinds.
(Compound [C3] which Reacts with Transition Metal Compound [A] or Bridged Metallocene Compound [B] to Form Ion Pair)

Examples of the compound [C3] (hereinafter, referred to as "ionized ionic compound") to be used in the present invention, which reacts with the transition metal compound [A] or the bridged metallocene compound [B] to form an ion pair, include Lewis acids, ionic compounds, borane compounds and carborane compounds described in JP H1-501950 A, JP H1-502036 A, JP H3-179005 A, JP H3-179006 A, JP H3-207703 A, JP H3-207704 A, U.S. Pat. No. 5,321,106 B; and the like. Further, the compound [C3] may also be, for example, a heteropoly compound or an isopoly compound.

Specific examples of the Lewis acid include compounds represented by $BR_3$ (wherein R represents a phenyl group which optionally contains a substituent such as fluorine, a methyl group, or a trifluoromethyl group; or fluorine), such as trifluoroboron, triphenylboron, tris(4-fluorophenyl)boron, tris(3,5-difluorophenyl)boron, tris(4-fluoromethylphenyl)boron, tris(pentafluorophenyl)boron, tris(3,5-dimethylphenyl)boron.

Examples of the ionic compound include compounds represented by the following general formula (V):

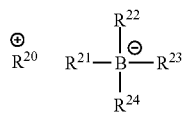

(V)

(wherein in the general formula (V), $R^{20}$ is $H^+$, a carbonium cation, an oxonium cation, an ammonium cation, a phosphonium cation, a cycloheptyltrienyl cation or a ferrocenium cation including a transition metal; and $R^{21}$ to $R^{24}$, which may be the same or different, each represents an organic group, preferably an aryl group or a substituted aryl group).

Specific examples of the carbonium cation include trisubstituted carbonium cations such as triphenylcarbonium cation, tri(methylphenyl)carbonium cation, tri(dimethylphenyl)carbonium cation; and the like.

Specific examples of the ammonium cation include trialkylammonium cations such as trimethylammonium cation, triethylammonium cation, tripropylammonium cation, tributylammonium cation, and tri(n-butyl)ammonium cation; N,N-dialkylanilinium cations such as N,N-dimethylanilinium cation, N,N-diethylanilinium cation, and N,N-2,4,6-pentamethylanilinium cation; dialkylammonium cations such as di(isopropyl)ammonium cation, and dicyclohexylammonium cation; and the like.

Specific examples of the phosphonium cation include triarylphosphonium cations such as triphenylphosphonium cation, tri(methylphenyl)phosphonium cation, tri(dimethylphenyl)phosphonium cation; and the like.

$R^{15}$ is preferably a carbonium cation or an ammonium cation, and particularly preferably, a triphenylcarbonium cation, an N,N-dimethylanilinium cation, or an N,N-diethylanilinium cation.

Examples of the ionic compound include trialkyl-substituted ammonium salts, N,N-dialkylanilinium salts, dialkylammonium salts, triarylphosphonium salts, and the like.

Specific examples of the trialkyl-substituted ammonium salt include triethylammonium tetra(phenyl)boron, tripropylammonium tetra(phenyl)boron, tri(n-butyl)ammonium tetra(phenyl)boron, trimethylammonium tetra(p-tolyl)boron, trimethylammonium tetra(o-tolyl)boron, tri(n-butyl)ammonium tetra(pentafluorophenyl)boron, tripropylammonium tetra(o,p-dimethylphenyl)boron, tri(n-butyl)ammonium tetra(m,m-dimethylphenyl)boron, tri(n-butyl)ammonium tetra(p-trifluoromethylphenyl)boron, tri(n-butyl)ammonium tetra(3,5-ditrifluoromethylphenyl)boron, tri(n-butyl)ammonium tetra(o-tolyl)boron, and the like.

Specific examples of the N, N-dialkylanilinium salt include N,N-dimethylanilinium tetra(phenyl)boron, N,N-diethylanilinium tetra(phenyl)boron, N,N,2,4,6-pentamethylanilinium tetra(phenyl)boron, and the like.

Specific examples of the dialkylammonium salt include di(1-propyl)ammonium tetra(pentafluorophenyl)boron, dicyclohexylammonium tetra(phenyl)boron, and the like.

Further, examples of the ionic compound include triphenylcarbenium tetrakis(pentafluorophenyl)borate, N,N-dimethylanilinium tetrakis(pentafluorophenyl)borate, ferrocenium tetra(pentafluorophenyl)borate, triphenylcarbeniumpentaphenylcyclopentadienyl complex, N,N-diethylaniliniumpentaphenylcyclopentadienyl complex, and boron compounds represented by the following formulae (VI) and (VII):

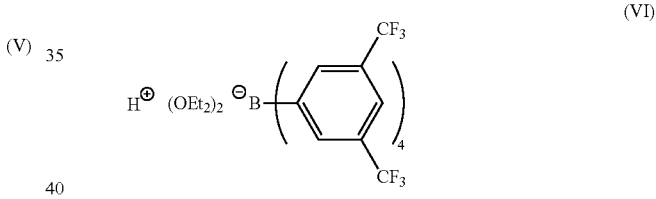

(wherein in the formula (VI), Et represents an ethyl group),

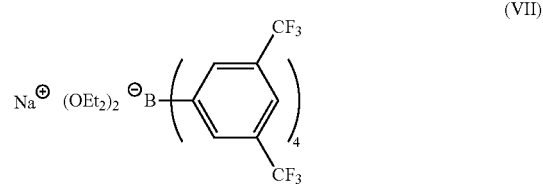

(wherein in the formula (VII), Et represents an ethyl group).

Specific examples of the borane compound as an example of the ionized ionic compound (compound [C3]) include:
decaborane; salts of anions such as bis[tri(n-butyl)ammonium]nonaborate,
bis[tri(n-butyl)ammonium]decaborate,
bis[tri(n-butyl)ammonium]undecaborate,
bis[tri(n-butyl)ammonium]dodecaborate,
bis[tri(n-butyl)ammonium]decachlorodecaborate, and
bis[tri(n-butyl)ammonium]dodecachlorododecaborate;
salts of metal borane anions such as tri(n-butyl)ammonium-
bis(dodecahydride dodecaborate)cobaltate and bis[tri(n-butyl)ammonium]bis(dodecahydride dodecaborate)nickelate (III); and the like.

Specific examples of the carborane compound as an example of the ionized ionic compound include: salts of anions such as 4-carbanonaborane, 1,3-dicarbanonaborane, 6,9-dicarbadecaborane, dodecahydride-1-phenyl-1,3-dicarbanonaborane, dodecahydride-1-methyl-1,3-dicarbanonaborane, undecahydride-1,3-dimethyl-1,3-dicarbanonaborane, 7,8-dicarbaundecaborane, 2,7-dicarbaundecaborane, undecahydride-7,8-dimethyl-7,8-dicarbaundecaborane, dodecahydride-11-methyl-2,7-dicarbaundecaborane, tri(n-butyl)ammonium 1-carbadecaborate, tri(n-butyl)ammonium 1-carbaundecaborate, tri(n-butyl)ammonium 1-carbadodecaborate, tri(n-butyl)ammonium 1-trimethylsilyl-1-carbadecaborate, tri(n-butyl)ammoniumbromo-1-carbadodecaborate, tri(n-butyl)ammonium 6-carbadecaborate, tri(n-butyl) ammonium 6-carbaundecaborate, tri(n-butyl)ammonium 7-carbaundecaborate, tri(n-butyl)ammonium 7,8-dicarbaundecaborate, tri(n-butyl)ammonium 2,9-dicarbaundecaborate, tri(n-butyl)ammoniumdodecahydride-8-methyl-7,9-dicarbaundecaborate, tri(n-butyl)ammoniumundecahydride-8-ethyl-7,9-dicarbaundecaborate, tri(n-butyl) ammoniumundecahydride-8-butyl-7,9-dicarbaundecaborate, tri(n-butyl)ammoniumundecahydride-8-allyl-7,9-dicarbaundecaborate, tri(n-butyl) ammoniumundecahydride-9-trimethylsilyl-7,8-dicarbaundecaborate, and tri(n-butyl) ammoniumundecahydride-4,6-dibromo-7-carbaundecaborate;
salts of metal carborane anions such as tri(n-butyl)ammoniumbis(nonahydride-1,3-dicarbanonaborate)cobaltate (III), tri(n-butyl)ammoniumbis(undecahydride-7,8-dicarbaundecaborate) ferrate (III), tri(n-butyl)ammoniumbis(undecahydride-7,8-dicarbaundecaborate) cobaltate (III), tri(n-butyl) ammoniumbis(undecahydride-7,8-dicarbaundecaborate) nickelate (III), tri(n-butyl)ammoniumbis(undecahydride-7,8-dicarbaundecaborate) cuprate (III), tri(n-butyl)ammoniumbis(undecahydride-7,8-dicarbaundecaborate)aurate (III), tri(n-butyl)ammoniumbis(nonahydride-7,8-dimethyl-7,8-dicarbaundecaborate)ferrate (III), tri(n-butyl)ammoniumbis (nonahydride-7,8-dimethyl-7,8-dicarbaundecaborate)chromate (III), tri(n-butyl)ammoniumbis(tribromooctahydride-7,8-dicarbaundecaborate)cobaltate (III), tris[tri(n-butyl)ammonium]bis(undecahydride-7-carbaundecaborate) chromate (III), bis[tri(n-butyl)ammonium]bis(undecahydride-7-carbaundecaborate)manganate (IV), bis [tri(n-butyl)ammonium]bis(undecahydride-7-carbaundecaborate)cobaltate (III), and bis[tri(n-butyl) ammonium]bis(undecahydride-7-carbaundecaborate) nickelate (IV); and the like.

The heteropoly compound as an example of the ionized ionic compound is a compound containing an atom selected from silicon, phosphorus, titanium, germanium, arsenic and tin, and one, or two or more kinds of atoms selected from vanadium, niobium, molybdenum and tungsten. Specific examples thereof include phosphovanadic acid, germanovanadic acid, arsenovanadic acid, phosphoniobic acid, germanoniobic acid, siliconomolybdic acid, phosphomolybdic acid, titanomolybdic acid, germanomolybdic acid, arsenomolybdic acid, stannomolybdic acid, phosphotungstic acid, germanotungstic acid, stannotungstic acid, phosphomolybdovanadic acid, phosphotungstovanadic acid, germanotaungstovanadic acid, phosphomolybdotungstovanadic acid, germanomolybdotungstovanadic acid, phosphomolybdotungstic acid, and phosphomolybdoniobic acid; and salts of these acids, but not limited thereto. Further, the above mentioned salts may be, for example, a salt of the above mentioned acid with, for example, a metal of Group 1 or 2 in the periodic table, specifically, a salt with lithium, sodium, potassium, rubidium, cesium, beryllium, magnesium, calcium, strontium, or barium; or an organic salt such as triphenylethyl salt.

The isopoly compound as an example of the ionized ionic compound is a compound composed of ions of one type of metal atom selected from vanadium, niobium, molybdenum and tungsten, and it can be considered as a molecular ion species of a metal oxide. Specific examples thereof include vanadic acid, niobic acid, molybdic acid, tungstic acid, and salts of these acids, but not limited thereto. Further, the above mentioned salts may be, for example, a salt of the above mentioned acid with, for example, a metal of Group 1 or 2 in the periodic table, specifically, a salt with lithium, sodium, potassium, rubidium, cesium, beryllium, magnesium, calcium, strontium, or barium; or an organic salt such as triphenylethyl salt.

The ionized ionic compound (the compound [C3] which reacts with the transition metal compound [A] or the bridged metallocene compound [B] to form an ion pair) as described above is used alone or in combination with two or more kinds.

When the organoaluminum oxy compound [C2], such as methylaluminoxane as a co-catalyst component, is used in combination, along with the transition metal compound [A] and the bridged metallocene compound [B], a very high polymerization activity for an olefin compound will be exhibited.

The ionized ionic compound [C3] as described above is used alone, or in combination of two or more kinds.

The organometallic compound [C1] is used in such an amount that the molar ratio (C1/M) of the organometallic compound [C1] to the transition metal atoms (M) in the transition metal compound [A], in the step (A); and the molar ratio (C1/M) of the organometallic compound [C1] to the transition metal atoms (M) in the bridged metallocene compound [B], in the step (B); are each usually from 0.01 to 100,000, and preferably from 0.05 to 50,000.

The organoaluminum oxy compound [C2] is used in such an amount that the molar ratio (C2/M) of the aluminum atoms in the organoaluminum oxy compound [C2] to the transition metal atoms (M) in the transition metal compound [A], in the step (A); and the molar ratio (C2/M) of the aluminum atoms in the organoaluminum oxy compound [C2] to the transition metal atoms (M) in the bridged metallocene compound [B], in the step (B); are each usually from 10 to 500,000, and preferably from 20 to 100,000.

The ionized ionic compound [C3] is used in such an amount that the molar ratio (C3/M) of the ionized ionic compound [C3] to the transition metal atoms (M) in the transition metal compound [A]; in the step (A); and the molar ratio (C2/M) of the ionized ionic compound [C3] to the transition metal atoms (M) (hafnium atoms) in the bridged hafnocene compound [B], in the step (B); are each usually from 1 to 10, and preferably from 1 to 5.

[Step (C)]

The method for producing the olefin resin (β) may include, as required, a step (C) of recovering the polymer produced in the step (B), in addition to the steps (A) and (B). The step (C) is a step in which the organic solvents used in steps (A) and (B) are separated to recover the resulting polymer, and the polymer is then shaped into the product form. The step (C) is not particularly limited as long as it is an existing process of producing a polyolefin resin, including concentrating the solvent, extrusion degassing, pelletizing and the like.

<Propylene Resin Composition>

The propylene resin composition according to the present invention is characterized by containing the propylene resin (α) and the olefin resin (β).

Since the olefin resin (β) has a good compatibility with the propylene resin (α) at an arbitrary blending ratio, the content ratio of the propylene resin (α) and the olefin resin (β) in the propylene resin composition according to the present invention is not particularly limited. However, in order to improve the impact resistance and toughness while favorably maintaining the physical properties inherent to the propylene resin, such as rigidity and hardness, the content ratio of the propylene resin (α) is preferably from 50 to 98 parts by weight, more preferably from 60 to 95 parts by weight, and still more preferably from 65 to 95 parts by weight. On the other hand, the content ratio of the olefin resin (β) is preferably from 2 to 50 parts by weight, more preferably from 5 to 40 parts by weight, and still more preferably from 5 to 35 parts by weight. Note that the total content of the propylene resin (α) and the olefin resin (β) in parts by weight is 100 parts by weight.

When the content ratio of the propylene resin (α) and the olefin resin (β) is within the above mentioned range, the propylene resin composition according to the present invention has an improved impact resistance and toughness, while favorably maintaining the physical properties inherent to the propylene resin, such as rigidity and hardness, and it can be suitably used in the production of various types of molded articles.

Next, the propylene resin (α) will be described.

The propylene polymer (α) is either a homopolymer of propylene, or a copolymer of propylene, ethylene and at least one α-olefin selected from α-olefins having from 4 to 20 carbon atoms. The copolymer may be a random copolymer or a block copolymer. Specific examples of the above mentioned α-olefin having from 4 to 20 carbon atoms include 1-butene, 2-methyl-1-propene, 2-methyl-1-butene, 3-methyl-1-butene, 1-hexene, 2-ethyl-1-butene, 2,3-dimethyl-1-butene, 2-methyl-1-pentene, 3-methyl-1-pentene, 4-methyl-1-pentene, 3,3-dimethyl-1-butene, 1-heptene, methyl-1-hexene, dimethyl-1-pentene, ethyl-1-pentene, trimethyl-1-butene, methylethyl-1-butene, 1-octene, methyl-1-pentene, ethyl-1-hexene, dimethyl-1-hexene, propyl-1-heptene, methylethyl-1-heptene, trimethyl-1-pentene, propyl-1-pentene, diethyl-1-butene, 1-nonene, 1-decene, 1-undecene, 1-dodecene, and the like. Among these, preferred is an α-olefin such as 1-butene, 1-pentene, 1-hexene, or 1-octene.

The propylene resin (α) may be composed of any single one of the above mentioned polymers, or may be composed of a plurality of these polymers. The above mentioned propylene resin (α) is polymerized using a Ziegler-Natta catalyst or the like.

Any commercially available propylene resin can be used as the propylene resin (α), without particular limitations. Examples of the commercially available propylene resin include so-called homo-polypropylene resins, random polypropylene resins, and block polypropylene resins.

The homo-polypropylene resin is a resin composed substantially of a propylene homopolymer. While it is cheap, easily manufactured, and excellent in rigidity and surface hardness, the homo-polypropylene resin has a poor impact resistance and toughness. When the homo-polypropylene resin is used as the propylene resin (α) in the propylene resin composition according to the present invention, the olefin resin (β) serves to markedly improve the impact resistance and toughness, while maintaining excellent characteristics of the homo-polypropylene resin, such as rigidity and the like.

The random polypropylene resin is a resin mainly composed of a propylene polymer including a small amount of comonomer(s), and has a higher impact resistance and transparency as compared to the homo-polypropylene resin. When the random polypropylene resin is used as the propylene resin (α) in the propylene resin composition according to the present invention, the olefin resin (β) serves to improve the impact resistance, toughness, and surface hardness, and to markedly improve the impact resistance at a low temperature in particular, while maintaining the rigidity of the random polypropylene resin.

As described in the section of BACKGROUND ART, the block polypropylene resin is a composition obtained through a two-stage polymerization of a propylene polymer and an ethylene propylene copolymer, and the term "block" in the block polypropylene resin does not mean that the block polypropylene resin is a "block copolymer". However, by containing the ethylene propylene copolymer, the block polypropylene resin has an improved balance between the rigidity and the impact resistance as compared to the homo-polypropylene resin. When the block polypropylene resin is used in the propylene resin composition according to the invention, the olefin resin (β) serves to improve the conflicting physical properties, such as rigidity and impact resistance, in a highly-balanced manner, and to a level unachievable by a common block polypropylene resin.

A preferred embodiment of the propylene resin (α) will now be described. The melt flow rate (MFR: ASTM D1238, 230° C., load: 2.16 kg) of the propylene resin (α) is from 0.1 to 500 g/10 min; the lower limit thereof is preferably 0.2 g/10 min, and more preferably 0.3 g/10 min; and the upper limit thereof is preferably 300 g/10 min, more preferably 100 g/10 min, and particularly preferably 50 g/10 min. When the MFR of the propylene resin (α) is less than 0.1 g/10 min, the dispersibility of the propylene resin (α) and the olefin resin (β) in the propylene resin composition is decreased, thereby resulting in a decrease in the mechanical strength of the resin composition. When the MFR of the propylene resin (α) is greater than 500 g/10 min, the strength of the propylene resin (α) itself is reduced, thereby resulting in a decrease in the mechanical strength of the resin composition.

The MFR can be used as an index of the molecular weight of the propylene resin (α). However, it is further preferred that the propylene resin (α) has a weight average molecular weight in terms of polypropylene, as measured by gel permeation chromatography (GPC), within the range of from 80,000 to 900,000, more preferably from 100,000 to 700,000, and particularly preferably from 150,000 to 700,000.

In addition, the propylene resin (α) preferably has a tensile elastic modulus of from 500 to 3,000 MPa, more preferably from 600 to 2,500 MPa, and still more preferably from 650 to 2,200 MPa. The tensile elastic modulus is a value obtained by measuring a pressed sheet of the resin having a thickness of 2 mm at 23° C. in accordance with JIS K7113-2. When the propylene polymer (α) has a tensile elastic modulus within the above mentioned range, the propylene resin composition containing the propylene polymer (α) has a high rigidity and hardness.

The propylene resin (α) is different from the propylene polymer contained in the olefin resin (β). The terminal structure of the propylene resin (α) is substantially a saturated hydrocarbon, and specifically, the ratio of the number of the unsaturated terminals contained in the propylene resin (α) is usually less than 0.1 per 1,000 carbon atoms.

The propylene resin composition according to the present invention can include other resins, rubbers, inorganic fillers, organic fillers, and/or the like. Further, the propylene resin composition can also include additives such as a weathering stabilizer, a heat stabilizer, an antistatic agent, an anti-slip agent, an anti-blocking agent, an antifogging agent, a lubricant, a pigment, a dye, a plasticizer, an anti-aging agent, a hydrochloric acid absorbent, an antioxidant and the like, and/or a crystal nucleating agent, to the extent that the object of the present invention is not impaired. In the propylene resin composition according to the present invention, the amounts to be added of the other resins, rubbers, inorganic fillers, additives and the like are not particularly limited as long as the object of the present invention is not impaired.

The method for producing the propylene resin composition according to the present invention is not particularly limited, and a melting method, a solution method or the like can be used. However, a melt blending method is preferred in terms of practicability. As the melt blending method, a melt blending method commonly used for the production of thermoplastic resins can be used. For example, the propylene resin composition can be prepared by uniformly mixing each of the components in the form of powder or granules, along with additives and the like described in the section of additional components, as required, using a Henschel mixer, a ribbon blender, a V-shaped blender or the like, followed by melt blending using a uniaxial or multiaxial kneading extruder, a mixing roll, a batch mixer, a kneader, a Banbury mixer or the like.

The melt blending temperature (the cylinder temperature, when using an extruder) of each of the components is usually from 170 to 250° C., and preferably from 180 to 230° C. Further, the order and method of melt blending each of the components are not particularly limited.

<Molded Article>

Since the propylene resin composition has an excellent balance between the rigidity and the impact resistance, due to being able to improve its impact resistance while maintaining its rigidity, it can be formed into various types of molded articles by a known molding method, such as injection molding, extrusion molding, inflation molding, blow molding, extrusion blow molding, injection blow molding, press molding, vacuum molding, calendar molding, or foaming molding. The molded articles can be used in a variety of applications such as automobile parts, containers for food applications and medical applications, and packaging materials for food applications and electronic materials.

The molded article made of the propylene resin composition can be used in various types of automobile parts, since it has an excellent balance between the rigidity and the impact resistance, a high surface hardness, and an excellent chemical resistance. For example, it can be used in automotive exterior parts such as bumpers, side moldings, and aerodynamic under covers; automotive interior parts such as instrument panels and interior trims; body parts such as fenders, door panels, and steps; engine peripheral parts such as engine covers, fans, and fan shrouds; and the like.

Examples of the containers for food applications and medical applications include: food containers, retort containers and bottle containers, such as table wares, retort food containers, frozen storage containers, retort pouches, microwave safe containers, frozen food containers, cups for chilled sweets, cups, and beverage bottles; blood transfusion sets, medical bottles, medical containers, medical hollow bottles, medical bags, infusion bags, blood storage bags, infusion bottles, chemical containers, detergent containers, cosmetic containers, perfume containers, toner containers; and the like.

Examples of the packaging materials include food packaging materials, meat packaging materials, processed fish packaging materials, vegetable packaging materials, fruit packaging materials, fermented food packaging materials, confectionery packaging materials, oxygen absorbent packaging materials, retort food packaging materials, freshness keeping films, pharmaceutical packaging materials, cell culture bags, films for testing cells, bulb packaging materials, seed packaging materials, films for growing vegetables and mushrooms, heat-resistant vacuum molded containers, containers for prepared foods, lids for prepared foods, wrapping films for professional use, wrapping films for household use, baking cartons, and the like.

Examples of films, sheets, and tapes include: protective films such as protective films for polarization plates, protective films for liquid crystal panels, protective films for optical components, protective films for lenses, protective films for electric components and electrical appliances, protective films for mobile phones, protective films for personal computers, masking films, capacitor films, reflective films, laminates (including glasses), radiation resistant films, gamma-ray resistant films, and porous films.

Examples of other applications include: housings for consumer electronics, hoses, tubes, wire coverings, insulators for high-voltage wires, spray tubes for cosmetics and perfume, medical tubes, infusion tubes, pipes, wire harnesses; interior materials for motor cycles, railroad vehicles aircrafts, marine vessel and the like; instrument panel skins, door trim skins, rear package trim skins, ceiling skins, rear pillar skins, sheet back garnishes, console boxes, arm rests, air bag case lids, shift knobs, assist grips, side step mats, reclining covers, trunk interior sheets, sheet belt buckles; moldings such as inner and outer moldings, roof moldings, and belt moldings; sealing materials for automobiles such as door seals, and body seals; automotive interior and exterior materials such as glass run channels, dust gurards, kicking plates, step mats, number plate housings, automotive hose members, air duct hoses, air duct covers, air intake pipes, air dam skirts, timing belt cover seals, bonnet cushions and door cushions; special tires such as vibration-damping tires, silent tires, car racing tires, and radio control tires; packings, automotive dust covers, lamp seals, automotive boots, rack and pinion boots, timing belts, wire harnesses grommets, emblems, air filter packings; skin materials for furniture, footwear, clothing, bags, building materials and the like; sealing materials for construction, waterproof sheets, sheets for construction, gaskets for construction, window films for construction, iron core protection members, gaskets, doors, door frames, window frames, cornices, baseboards, opening frames and the like; flooring materials, ceiling materials, wall papers, health-care products (for example: anti-slip mats and sheets, and anti-fall films, mats and sheets), health-care equipment members, shock absorption pads, protectors and protective gears (for example: helmets and guards), sporting goods (for example: sports grips and protectors), protective guards for sports, rackets, mouth guards, balls, golf balls, transportation goods (for example: shock absorption grips and shock absorption sheets for transportation); shock absorption materials such as vibration control pallets, shock absorption dampers, insulators, shock absorption materials for footwear, shock absorption foamed products, and shock absorption films; grip materials, miscellaneous goods, toys, soles, shoe soles, midsoles and inner soles of shoes, soles, sandals, suction cups, tooth brushes, flooring materials, gymnastic mats, electric tool members, agricultural equipment members, heat radiation materials, transparent substrates, sound proof materials, cushion materials, electric cables, shape memory material, medical gaskets, medical caps, medicine stoppers, gaskets; packing materials for use in high temperature treatments such as boiling treatment and high pressure steam sterilization carried out after filling baby foods, dairy products, pharmaceuticals, sterile water and the like into bottles; industrial sealing materials, industrial sewing machine tables, number plate housings, cap liners such as PET bottle cap liners; stationeries, office supplies; supporting members for precision instruments and OA equipment such as legs for OA printers, legs for facsimile machines, legs for sewing machines, supporting mats for motors, and vibration proof materials for audio equipment; heat resistant packings for OA equipment, animal cages; physiochemical laboratory equipment for physics and chemistry such as beakers and graduated cylinders; cells for optical measurement, clothing cases, clear files, clear sheets, desk mats; applications as fibers such as nonwoven fabrics, stretchable nonwoven fabrics, fibers, waterproof fabrics, breathable textiles and fabrics, paper diapers, sanitary products, hygiene products, filters, bag filters, dust collection filters, air cleaners, hollow fiber filters, water purification filters, gas separation membranes, and the like.

Among these, a molded article obtained from the above mentioned propylene resin composition can be suitably used, particularly, in interior and exterior materials for automobiles, such as bumpers and instrument panels, exterior wall materials, food containers, and beverage containers, since it has an excellent balance between the rigidity and the impact resistance, due to being able to improve its impact resistance while maintaining its rigidity.

EXAMPLES

The present invention will now be described specifically, with reference to Examples. However, the present invention is not restricted to these Examples as long as it is not beyond the gist thereof.

In the Examples below, the physical properties of the olefin resin (β), the propylene resin (α), and the propylene resin composition are measured according to the following methods.
(Methods for Measuring Physical Properties of Olefin Resin (β) and Polypropylene Having Terminal Unsaturation)
(1) Measurement of Melting Point (Tm) and Heat of Fusion ΔH The melting point (Tm) and the heat of fusion ΔH were measured by DSC under the following conditions.

Using a differential scanning calorimeter [RDC 220, manufactured by Seiko Instruments Inc.], about 10 mg of a sample was heated from 30° C. to 200° C. at a temperature rise rate of 50° C./min under a nitrogen atmosphere, and maintained at the temperature for 10 minutes. Further, the sample was cooled to 30° C. at a temperature decrease rate of 10° C./min, and maintained at the temperature for 5 minutes, followed by heating to 200° C. at a temperature rise rate of 10° C./min. An endothermic peak observed at the second temperature elevation was taken as the melting peak, and the temperature at which the melting peak was observed was obtained as the melting point (Tm). Further, the heat of fusion ΔH was obtained by calculating the surface area of the melting peak. When multiple melting peaks were observed, the heat of fusion was obtained by calculating the surface area of the entire area of the melting peaks.

(2) Measurement of Glass Transition Temperature (Tg)

The glass transition temperature (Tg) was measured by DSC under the following conditions.

Using a differential scanning calorimeter [RDC 220, manufactured by Seiko Instruments Inc.], about 10 mg of a sample was heated from 30° C. to 200° C. at a temperature rise rate of 50° C./min under a nitrogen atmosphere, and maintained at the temperature for 10 minutes. Then the sample was cooled to −100° C. at a temperature decrease rate of 10° C./min, and maintained at the temperature for 5 minutes, followed by heating to 200° C. at a temperature rise rate of 10° C./min. The glass transition temperature (Tg) is detected as a parallel shift of the baseline when the DSC curve is bent due to changes in specific heat at the second temperature elevation. A temperature observed at the intersection between the tangent line on the lower temperature side of the bend and the tangent line at a point having a maximum inclination in the bent portion was taken as the glass transition temperature (Tg).

(3) Hot Xylene-Insoluble Content

A sample was subjected to a heat pressing (heating at 180° C. for 5 minutes, and cooling for 1 minute) to be formed into a sheet having a thickness of 0.4 mm, followed by cutting into fine pieces. A quantity of about 100 mg of the resultant was weighed and wrapped with a screen of 325 mesh, and the screen was immersed in 30 ml of p-xylene in a well-closed container at 140° C. for 3 hours. Next, the screen was retrieved and dried at 80° C. for 2 hours or more, until the constant weight was reached. The hot xylene-insoluble content (wt %) is represented by the following equation:

$$\text{Hot xylene-insoluble content (wt \%)} = 100 \times (W3-W2)/(W1-W2)$$

W1: the total mass of the screen and the sample before the test; W2: the mass of the screen; and W3: the total mass of the screen and the sample after the test (4) Measurement of Ratio P of Propylene Polymer Contained in Olefin Resin with Respect to Olefin Resin (β)

As described above, the ratio P was calculated from the ratio of the weight of the polypropylene having terminal unsaturation used in the step (B) to the weight of the resulting olefin resin (β)

(5) Cross-Fractionation Chromatography (CFC) Measurement

The methods for calculating the ratio E of the amount of the component(s) having a peak value of a differential elution curve as measured by cross-fractionation chromatography (CFC) using o-dichlorobenzene as a solvent of less than 65° C., to the amount of the olefin resin, and the ratio (wt %) of the component(s) soluble in o-dichlorobenzene at 50° C. or less, were described in the sections of requirement (III) and requirement (XI). Specifically, in Examples and Comparative Examples, they were measured and calculated as follows.

Apparatus: cross-fractionation chromatograph, CFC2 (Polymer ChAR); Detector (built-in): infrared spectrophotometer IR[4] (Polymer ChAR); Detection wavelength: 3.42 μm (2,920 cm-1), fixed; Sample concentration: 120 mg/30 mL; Injection volume: 0.5 mL; Temperature decrease time: 1.0° C./min; Elution segment: 4.0° C. interval (−20° C. to 140° C.); GPC columns: Shodex HT-806M×3 columns (Showa Denko Co., Ltd.); GPC column temperature: 140° C.; GPC column calibration: monodisperse polystyrene (Tosoh Corporation); Molecular weight calibration method: universal calibration method (in terms of polystyrene); Mobile phase: o-dichlorobenzene (BHT added); and Flow rate: 1.0 mL/min.

The ratio E of the amount of the component(s) having a peak temperature of less than 65° C. to the amount of the olefin resin was calculated by: performing the peak separation of the differential elution curve obtained by the CFC measurement, using normal distribution curves; calculating the sum E(>65° C.) of the ratios (wt %) of the soluble components having a peak temperature of 65° C. or more; and calculating the ratio E based on the equation:

$$E=100-E(>65° C.).$$

The ratio of the component(s) soluble in o-dichlorobenzene at 50° C. or less (wt %) is a cumulative elution amount (including a component(s) soluble at −20° C.) at 50° C. in the cumulative elution curve obtained by the CFC measurement.

(6) Elastic Modulus (Tensile Elastic Modulus)

The tensile elastic modulus was measured in accordance with ASTM D638.

(7) Limiting Viscosity Measurement

The measurement of the limiting viscosity [η] was performed in decalin at 135° C.

Specifically, about 20 mg of a resin was dissolved in 25 ml of decalin, followed by measuring the specific viscosity ηsp in an oil bath controlled at 135° C., using an Ubbelohde viscometer. The resulting decalin solution was diluted by adding 5 ml of decalin, and specific viscosity ηsp of the resultant was measured in the same manner as described above. The dilution operation was repeated two more times, and the value ηsp/C when the concentration (C) was extrapolated to 0 was obtained as the limiting viscosity [η] (unit: dl/g) (see the following equation 1).

$$[\eta]=\lim(\eta sp/C)(C\to 0) \quad \text{Equation 1}$$

(8) $^{13}$C-NMR Measurement

The $^{13}$C-NMR measurement was performed under the following conditions, for the purpose of analyzing the composition ratio of ethylene and the α-olefin in the polymer, and confirming the stereoregularity of the polypropylene having terminal unsaturation. Apparatus: AVANCE III 500 CryoProbe Prodigy nuclear magnetic resonance apparatus, manufactured by Bruker BioSpin GmbH; Nucleus measured: $^{13}$C (125 MHz): Measurement mode: single pulse proton broadband decoupling; Pulse width: 45° (5.00 μsec), Number of points: 64 k; Measurement range: 250 ppm (−55 to 195 ppm), Repetition time: 5.5 sec, Number of scans: 512 times, Solvent for measurement: o-dichlorobenzene/benzene-$d_5$ (4/1 v/v); Sample concentration: ca. 60 mg/0.6 mL; Measurement temperature: 120° C., Window function: exponential (BF: 1.0 Hz); and Chemical shift reference: benzene-$d_6$ (128.0 ppm).

(9) $^1$H-NMR Measurement

The $^1$H-NMR measurement was performed, for the purpose of analyzing the terminal structure of the polypropylene having terminal unsaturation. Apparatus: Model ECX-400P nuclear magnetic resonance apparatus, manufactured by JEOL Ltd.; Nucleus measured: $^{13}$H (400 MHz); Measurement mode: single pulse; Pulse width: 45° (5.25 μsec); Number of points: 32 k; Measurement range: 20 ppm (−4 to 16 ppm); Repetition time: 5.5 sec; Number of scans: 64 times; Solvent for measurement: 1,1,2,2,-tetrachloroethane-d2; Sample concentration: ca. 60 mg/0.6 mL; Measurement temperature: 120° C.; Window function: exponential (BF: 0.12 Hz); and Chemical shift reference: 1,1,2,2,-tetrachloroethane (5.91 ppm).

(10) GPC Measurement

The GPC analysis was carried out under the following conditions, for the purpose of analyzing the molecular weight of the polymer. Apparatus: Alliance GPC model 2000, manufactured by Waters Corporation; Columns: TSK gel GMH6-HT×2 columns, TSK gel GMH6-HTL×2 columns (inner diameter: 7.5 mm×length: 30 cm; both manufactured by Tosoh Corporation); Column temperature: 140° C.; Mobile phase: o-dichlorobenzene (containing 0.025% dibutylhydroxytoluene); Detector: differential refractometer; Flow rate: 1.0 mL/min; Sample concentration: 0.15% (w/v); Injection volume: 0.5 mL; Sampling time interval: 1 sec; and Column calibration: monodisperse polystyrene (manufactured by Tosoh Corporation).

(11) Transmission Electron Microscope Observation

The observation of the phase structure of the olefin resin was carried out as follows, using a transmission electron microscope. A quantity of 40 g of the olefin resin and an antioxidant, Irganox (40 mg), were introduced into Labo Plastomill (manufactured by Toyo Seiki Co., Ltd.), and the resultant was melt blended at 200° C. and at 60 rpm for 5 minutes, and formed into a sheet by press working. The resulting molded article was formed into a small piece of 0.5 mm square, and stained with ruthenium acid ($RuO_4$). The resulting piece was then cut into an ultra-thin slice having a film thickness of 100 nm, using an ultramicrotome equipped with a diamond knife. Carbon was then deposited on the ultra-thin slice, and the phase structure of the resultant was observed using a transmission electron microscope (H-7650, manufactured by Hitachi, Ltd.). The average diameter of the particles of the island phase was obtained as an average long diameter thereof, by performing an image processing and an image analysis of the image obtained by the observation, using image analysis software, "macview".

(Methods for Measuring Physical Properties of Propylene Resin (α) and Propylene Resin Composition)

The methods for measuring the physical properties of the propylene polymer (a) and the propylene resin composition will be shown below.

(12) Melt Flow Rate (MFR: [g/10 Min])

The melt flow rate was measured at a load of 2.16 kg in accordance with ASTM D1238E. The measurement was performed at a temperature of 230° C.

(13) Melting Point

The melting point was measured in the same manner as described in the above (1).

(14) Isotactic Pentad Fraction (Mmmm: [%])

The pentad fraction (mmmm, %), which is one of the indices of the stereoregularity of a polymer and obtained by examining the microtacticity thereof, was calculated from the peak strength ratio of the 13C-NMR spectrum assigned based on Macromolecules 8,687 (1975), of the propylene resin (α). The 13C-NMR spectrum was measured by EX-400, an apparatus manufactured by JEOL Ltd., using TMS as reference, o-dichlorobenzene as a solvent, at a temperature of 130° C. The measurement of the isotactic pentad fraction was also carried out for polypropylenes having terminal unsaturation M-1 to M-3.

(15) Content of Skeletons Derived from Propylene and Ethylene

In order to measure the concentration of the skeleton derived from ethylene in the component(s) soluble in n-decane at room temperature (Dsol, details will be given later) of the propylene random copolymer and the propylene block copolymer, 20 to 30 mg of sample was dissolved in 0.6 ml of 1,2,4-trichlorobenzene/heavy benzene (mass ratio: 2/1) solution, followed by carbon nuclear magnetic resonance analysis (13C-NMR). The quantification of propylene and ethylene was performed by dyad sequence distribution. In the case of propylene-ethylene copolymer, calculation was performed according to the following equations, using: PP=Sαα, EP=Sαγ+Sαβ, and EE=½ (Sβδ+Sδδ)+¼ Sγδ.

Propylene (mol %)=(PP+½EP)×100/[(PP+½EP)+ (½EP+EE)]

Ethylene (mol %)=(½EP+EE)×100/[(PP+½EP)+ (½EP+EE)]

(16) Bending Elastic Modulus

The bending elastic modulus (FM: [MPa]) was measured in accordance with JIS K7171, under the following conditions.
<Measurement Conditions>
Test specimen: 10 mm (width)×4 mm (thickness)×80 mm (length)
Bending speed: 2 mm/min
Bending span: 64 mm
(17) Charpy Impact Test The Charpy impact test ([kJ/m2]) was carried out in accordance with JIS K7111 under the following conditions.
<Test Conditions>
Temperature: −30° C., 23° C.
Test specimen: 10 mm (width)×80 mm (length)×4 mm (thickness)
The notch was formed by machine processing.
(18) Tensile Elongation at Break The tensile test was carried out in accordance with JIS K7202 under the following conditions.
<Measurement Conditions>
Test specimen: JIS K7162-BA dumbbell 5 mm (width)×2 mm (thickness)×75 mm (length)

Tensile speed: 20 mm/min
Distance between spans: 58 mm
(19) Rockwell Hardness

The Rockwell hardness (R scale) was measured in accordance with JIS K7202 under the following conditions.
<Measurement Conditions>
Test specimen: width: 30 mm, length: 30 mm, thickness: 2 mm
Two test specimens stacked in layers were used for the measurement.
(20) Transmission Electron Microscope Observation The phase structure of the propylene resin composition was measured in the same manner as described in the above (11).
(Reagent Used)

Toluene to be used was purified using an organic solvent purification apparatus manufactured by Glass Contour. A 20 wt % methylaluminoxane/toluene solution manufactured by Nippon Aluminum Alkyls, Ltd. was used as a solution of aluminoxane in toluene. As triisobutylaluminum, one manufactured by Tosoh Finechem Corporation was diluted with toluene (1.0 M) and used.

Example 1

Step (A): Production of Polypropylene Having Terminal Unsaturation (M-1)

Dimethylsilylbis(2-methyl-4-phenylindenyl) zirconium dichloride used as a catalyst was synthesized according to the method disclosed in JP 3737134 B.

To a sufficiently nitrogen-substituted glass reactor with a capacity of 2 L, 1.5 L of toluene was introduced, followed by raising the temperature to 85° C. To the resultant, propylene was continuously supplied at 240 liter/hr, while stirring the interior of the polymerization reactor at 600 rpm, to saturate the liquid phase and the gas phase. While continuing to supply propylene, 5.0 mL (7.5 mmol) of a toluene solution (1.5 mol/L) of methylaluminoxane (also referred to as DMAO), and then 6.0 mL (0.012 mmol) of a toluene solution (0.0020 mol/L) of dimethylsilylbis(2-methyl-4-phenylindenyl) zirconium dichloride were added, and polymerization was performed at 85° C. for 30 minutes under normal pressure. The polymerization was terminated by adding a small amount of isobutanol. The resulting polymerization reaction solution was added to 5 L of methanol containing a small amount of hydrochloric acid to precipitate a polymer. The precipitates were washed with methanol, and then dried at 80° C. for 10 hours under reduced pressure, to obtain 63.4 g of a propylene polymer (polypropylene having terminal unsaturation (M-1)). The analysis results of the obtained polymer are shown in Table 1-2.

Step (B): Production of Olefin Resin (β-1)

A compound (1) represented by the following formula, used as a catalyst, was synthesized by a known method.

To a sufficiently nitrogen-substituted glass reactor with a capacity of 1 L, 5.0 g of the polypropylene having terminal unsaturation (M-1) and 500 ml of xylene were introduced, and then the temperature was increased to 97° C. to dissolve the polypropylene having terminal unsaturation (M-1). To the resultant, ethylene and 1-butene were continuously supplied at 120 liter/hr and 15 liter/hr, respectively, while stirring the interior of the polymerization reactor at 600 rpm, thereby saturating the liquid phase and the gas phase. While continuing to supply ethylene and 1-butene, 1.0 mL (1.00 mmol) of a decane solution (1.0 mol/L) of triisobutylaluminum (also referred to as iBu$_3$Al), 5.0 mL (0.01 mmol) of a toluene solution (0.0020 mol/L) of the compound (1), and then 6.25 mL (0.025 mmol) of a toluene solution (4.0 mmol/L) of triphenylcarbenium tetrakis(pentafluorophenyl) borate (also referred to as Ph$_3$CB(C$_6$F$_5$)$_4$) were added, and polymerization was performed at 97° C. for minutes under normal pressure. The polymerization was terminated by adding a small amount of isobutanol. The resulting polymerization reaction solution was added to 1.5 liter of methanol containing a small amount of hydrochloric acid to precipitate a polymer. The precipitates were washed with methanol, and then dried at 80° C. for 10 hours under reduced pressure, to obtain 29.3 g of an olefin resin (β-1). The analysis results of the olefin resin (β-1) are shown in Table 1-1.

In Comparative Example 1 to be described later, the polymerization was carried out in the same manner as in Example 1 except that the polypropylene having terminal unsaturation (M-1) was not added, to obtain a resin (β'-1). The resulting resin (β'-1) was analyzed according to the methods previously described, and the results are shown in Table 1-3. The resin (β'-1) was defined as a copolymer constituting the main chain of the olefin resin (β-1).

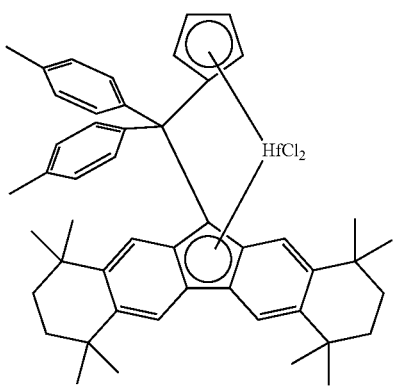

Compound (1)

Example 2

The same procedure as in Example 1 was carried out except that the charged amount of the polypropylene having terminal unsaturation (M-1) was changed to 10.0 g in the step (B), to produce an olefin resin. A quantity of 32.9 g of an olefin resin (β-2) was obtained.

The analysis results of the olefin resin (β-2) are shown in Table 1-1.

Further, after melt blending the resulting resin in Labo Plastomill, the phase structure of the resin was observed with a transmission electron microscope. As a result, it was found that the olefin resin (β-2) has a phase-separated structure composed of a sea phase constituted by a non-crystalline component and an island phase constituted by a crystalline component, and that the particles of the island phase have an average diameter of 250 nm. The obtained image (magnification of 4,000-fold) is shown in FIG. 1.

Example 3

Step (A): Production of Polypropylene Having Terminal Unsaturation (M-2)

To a sufficiently nitrogen-substituted stainless steel autoclave having a capacity of 1 L, 500 mL of toluene and 0.67 mL (1.0 mmol) of a toluene solution (1.5 mol/L) of methylaluminoxane (also referred to as PMAO) were introduced under flow of nitrogen. The autoclave was then sealed, and heated to 85° C. Subsequently, propylene partial pressure was increased to 0.3 MPa while stirring the interior of the polymerization reactor at 600 rpm, and the temperature was maintained at 85° C. To the resultant, 1.0 mL (0.001 mmol) of a toluene solution (0.0010 mol/L) of dimethylsilylbis(2-methyl-4-phenylindenyl) zirconium dichloride was injected under pressure to initiate polymerization. The pressure was maintained while continuously supplying propylene gas, and the polymerization was carried out at 85° C. for 20 minutes. Then the polymerization was terminated by injecting 5 mL of methanol under pressure. The resulting polymerization reaction solution was added to 1.5 liter of methanol containing a small amount of hydrochloric acid, to precipitate a polymer. The precipitates were washed with methanol and then dried under reduced pressure at 80° C. for 10 hours to obtain 14.9 g of a polypropylene having terminal unsaturation (M-2). The analysis results of the obtained polymer are shown in Table 1-2.

Step (B): Production of Olefin Resin (β-3)

The same procedure as in Example 2 was carried out except that the polypropylene having terminal unsaturation (M-2) was used instead of the polypropylene having terminal unsaturation (M-1) in the step (B), to produce an olefin resin. A quantity of 31.4 g of an olefin resin (β-3) was obtained.

The analysis results of the olefin resin (β-3) are shown in Table 1-1.

Example 4

Step (B): Production of Olefin Resin (β-4)

To a sufficiently nitrogen-substituted glass reactor with a capacity of 1 L, 10.0 g of the polypropylene having terminal unsaturation (M-2) and 500 ml of xylene were introduced, and then the temperature was raised to 93° C. to dissolve the polypropylene having terminal unsaturation (M-2). To the resultant, ethylene and 1-butene were continuously supplied at 120 liter/hr and 30 liter/hr, respectively, while stirring the interior of the polymerization reactor at 600 rpm, thereby saturating the liquid phase and the gas phase. While continuing to supply ethylene and 1-butene, 1.0 mL (1.00 mmol) of a decane solution (1.0 mol/L) of triisobutylaluminum (also referred to as iBu₃Al), 4.5 mL (0.009 mmol) of a toluene solution (0.0020 mol/L) of the compound (1), and then 6.25 mL (0.025 mmol) of a toluene solution (4.0 mmol/L) of triphenylcarbenium tetrakis (pentafluorophenyl) borate (also referred to as Ph₃CB(C₆F₅)₄) were added, and polymerization was performed at 93° C. for 40 minutes under normal pressure. The polymerization was terminated by adding a small amount of isobutanol. The resulting polymerization reaction solution was added to 1.5 liter of methanol containing a small amount of hydrochloric acid to precipitate a polymer. The precipitates were washed with methanol, and then dried at 80° C. for 10 hours under reduced pressure, to obtain 30.0 g of an olefin resin (β-4). The analysis results of the olefin resin (β-4) are shown in Table 1-1.

The polymerization was carried out in the same manner as in Example 4 except that the polypropylene having terminal unsaturation (M-2) was not added, to obtain a resin (β'-4). The resulting resin (β'-4) was analyzed according to the methods previously described, and the results are shown in Table 1-3. The resin (β'-4) was defined as a copolymer constituting the main chain of the olefin resin (β-4).

Example 5

Step (B): Production of Olefin Resin (β-5)

To a sufficiently nitrogen-substituted glass reactor with a capacity of 1 L, 8.0 g of the polypropylene having terminal unsaturation (M-2) and 500 ml of xylene were introduced, and then the temperature was increased to 90° C. to dissolve the polypropylene having terminal unsaturation (M-2). To the resultant, ethylene and propylene were continuously supplied at 100 liter/hr and 35 liter/hr, respectively, while stirring the interior of the polymerization reactor at 600 rpm, thereby saturating the liquid phase and the gas phase. While continuing to supply ethylene and propylene, 6.0 mL (6.00 mmol) of a decane solution (1.0 mol/L) of triisobutylaluminum (also referred to as iBu₃Al), 7.5 mL (0.015 mmol) of a toluene solution (0.0020 mol/L) of the compound (1), and then 15 mL (0.06 mmol) of a toluene solution (4.0 mmol/L) of triphenylcarbenium tetrakis(pentafluorophenyl)borate (also referred to as Ph₃CB(C₆F₅)₄) were added, and polymerization was performed at 90° C. for 40 minutes under normal pressure. The polymerization was terminated by adding a small amount of isobutanol. The resulting polymerization reaction solution was added to 1.5 liter of methanol containing a small amount of hydrochloric acid to precipitate a polymer. The precipitates were washed with methanol, and then dried at 80° C. for 10 hours under reduced pressure, to obtain 25.8 g of an olefin resin (β-5). The analysis results of the olefin resin (β-5) are shown in Table 1-1.

The polymerization was carried out in the same manner as in Example 5 except that the polypropylene having terminal unsaturation (M-2) was not added, to obtain a resin (β'-5). The resulting resin (β'-5) was analyzed according to the methods previously described, and the results are shown in Table 1-3. The resin (β'-5) was defined as a copolymer constituting the main chain of the olefin resin (β-5).

Example 6

Step (B): Production of Olefin Resin (β-6)

To a sufficiently nitrogen-substituted glass reactor with a capacity of 1 L, 10.0 g of the polypropylene having terminal unsaturation (M-2) and 500 ml of xylene were introduced, and then the temperature was raised to 95° C. to dissolve the polypropylene having terminal unsaturation. To the resultant, ethylene and propylene were continuously supplied at 100 liter/hr and 17 liter/hr, respectively, while stirring the interior of the polymerization reactor at 600 rpm, to saturate the liquid phase and the gas phase. While continuing to supply ethylene and propylene, 6.0 mL (6.00 mmol) of a decane solution (1.0 mol/L) of triisobutylaluminum (also referred to as iBu$_3$Al), 7.5 mL (0.015 mmol) of a toluene solution (0.0020 mol/L) of the compound (1), and then 15 mL (0.06 mmol) of a toluene solution (4.0 mmol/L) of triphenylcarbenium tetrakis (pentafluorophenyl)borate (also referred to as Ph$_3$CB(C$_6$F$_5$)$_4$) were added, and polymerization was performed at 95° C. for 30 minutes under normal pressure. The polymerization was terminated by adding a small amount of isobutanol. The resulting polymerization reaction solution was added to 1.5 liter of methanol containing a small amount of hydrochloric acid to precipitate a polymer. The precipitates were washed with methanol, and then dried at 80° C. for 10 hours under reduced pressure, to obtain 25.2 g of an olefin resin (β-6). The analysis results of the olefin resin (β-6) are shown in Table 1-1.

The polymerization was carried out in the same manner as in Example 6 except that the polypropylene having terminal unsaturation (M-2) was not added, to obtain a resin (β'-6). The resulting resin (β'-6) was analyzed according to the methods described above, and the results are shown in Table 1-3. The resin (β'-6) was defined as a copolymer constituting the main chain of the olefin resin (β-6).

Example 7

Step (B): Production of Olefin Resin (β-7)

To a sufficiently nitrogen-substituted glass reactor with a capacity of 1 L, 10.0 g of the polypropylene having terminal unsaturation (M-2) and 500 ml of xylene were introduced, and then the temperature was raised to 85° C. to dissolve the polypropylene having terminal unsaturation. To the resultant, ethylene and 1-butene were continuously supplied at 120 liter/hr and 18 liter/hr, respectively, while stirring the interior of the polymerization reactor at 600 rpm, to saturate the liquid phase and the gas phase. While continuing to supply ethylene and 1-butene, 1.0 mL (1.00 mmol) of a decane solution (1.0 mol/L) of triisobutylaluminum (also referred to as iBu$_3$Al), 3.5 mL (0.007 mmol) of a toluene solution (0.0020 mol/L) of the compound (1), and then 6.25 mL (0.025 mmol) of a toluene solution (4.0 mmol/L) of triphenylcarbenium tetrakis (pentafluorophenyl)borate (also referred to as Ph$_3$CB(C$_6$F$_5$)$_4$) were added, and polymerization was performed at 85° C. for 40 minutes under normal pressure. The polymerization was terminated by adding a small amount of isobutanol. The resulting polymerization reaction solution was added to 1.5 liter of methanol containing a small amount of hydrochloric acid to precipitate a polymer. The precipitates were washed with methanol, and then dried at 80° C. for 10 hours under reduced pressure, to obtain 29.5 g of an olefin resin (β-7). The analysis results of the olefin resin (β-7) are shown in Table 1-1.

The polymerization was carried out in the same manner except that the polypropylene having terminal unsaturation (M-2) was not added, to obtain a resin (β'-7). The resulting resin (β'-7) was analyzed according to the methods previously described, and the results are shown in Table 1-3. The resin (β'-7) was defined as a copolymer constituting the main chain of the olefin resin (β-7).

Example 8

Step (A): Production of Polypropylene Having Terminal Unsaturation (M-3)

To a sufficiently nitrogen-substituted stainless steel autoclave having a capacity of 1 L, 500 mL of toluene and 0.67 mL (1.0 mmol) of a toluene solution (1.5 mol/L) of methylaluminoxane (also referred to as PMAO) were introduced under flow of nitrogen. The autoclave was then sealed, and heated to 85° C. Subsequently, the propylene partial pressure was increased to 0.5 MPa while stirring the interior of the polymerization reactor at 600 rpm, and the temperature was maintained at 85° C. To the resultant, 0.5 mL (0.0005 mmol) of a toluene solution (0.0010 mol/L) of dimethylsilylbis(2-methyl-4-phenylindenyl)zirconium dichloride was injected under pressure to initiate polymerization. The pressure was maintained while continuously supplying propylene gas, and the polymerization was carried out at 85° C. for 8 minutes. Then the polymerization was terminated by injecting 5 mL of methanol under pressure. The resulting polymerization reaction solution was added to 1.5 liter of methanol containing a small amount of hydrochloric acid, to precipitate a polymer. The precipitated polymer was washed with methanol and then dried under reduced pressure at 80° C. for 10 hours to obtain 12.3 g of a propylene polymer. The analysis results of the obtained polymer are shown in Table 1-2.

Step (B): Production of Olefin Resin (β-8)

The same procedure as in Example 2 was carried out except that the polypropylene having terminal unsaturation (M-3) was used instead of the polypropylene having terminal unsaturation (M-1) in the step (B) and step (C). A quantity of 32.4 g of an olefin resin (β-8) was obtained.

The analysis results of the olefin resin (β-8) are shown in Table 1-1.

Example 9

The same procedure as in Example 3 was carried out except that the charged amount of the polypropylene having terminal unsaturation (M-2) was changed to 2.5 g in the step (B), to obtain an olefin resin. A quantity of 26.9 g of an olefin resin (β-9) was obtained.

The analysis results of the olefin resin (β-9) are shown in Table 1-1.

Comparative Example 1

The same procedure as in Example 1 was carried out except that the polymerization was performed without adding the polypropylene having terminal unsaturation (M-1) in the step (B), to produce an olefin resin. A quantity of 24.2 g of an olefin resin (β'-1) was obtained. The analysis results of the obtained olefin resin (β'-1) are shown in Tables 1-1 and 1-3.

Comparative Example 2

The same procedure as in Example 1 was carried out except that 1-butene was supplied at an amount of 16 liter/hr, the polymerization temperature was changed to 102° C., and the polymerization was performed without adding the polypropylene having terminal unsaturation (M-1) in the step (B), to produce an olefin resin. A quantity of 21.4 g of an olefin resin (β'-2) was obtained. The analysis results of the obtained olefin resin (β'-2) are shown in Tables 1-1 and 1-3.

Comparative Example 3

The resin (β'-1) and the polypropylene having terminal unsaturation (M-1) were melt blended according to the method previously described, such that the content of the polypropylene having terminal unsaturation was 30.4% by weight, to obtain a resin (B-1). The analysis results thereof are shown in Table 1-1.

Further, the phase structure of the resin was observed by a transmission electron microscope. The obtained image (magnification: 4,000-fold) is shown in FIG. 2. As can be seen from FIG. 2, although the phase-separated structure was observed in the resin (B-1), the particles of the island phase were coarse, and dispersed in μm-order.

Comparative Example 4

The resin (β'-1) and the polypropylene having terminal unsaturation (M-2) were melt blended according to the method previously described, such that the content of the polypropylene having terminal unsaturation was 31.9% by weight, to obtain a resin (B-2). The analysis results thereof are shown in Table 1-1.

Note that each of the olefin polymers of Comparative Examples 1 to 4, whose analysis results are shown in Table 1-1, is an ethylene/α-olefin copolymer or a propylene polymer mixed with an ethylene/α-olefin copolymer, and the resins obtained in these Comparative Examples do not include the grafted olefin polymer [R1].

Since the olefin resins (3) obtained in Examples 1 to 9 are produced solely by the polymerization steps, there is less concern for problems in terms of product quality, such as coloration or foul odor due to byproducts or residual substrates, contamination due to eluted components, and the like.

Comparative Example 5

The same procedure as in Example 2 was carried out except that 6.0 mL (0.012 mmol) of a toluene solution (0.0020 mol/L) of a compound (2) was used instead of 5.0 mL (0.01 mmol) of a toluene solution (0.0020 mol/L) of the compound (1), to produce an olefin resin. A quantity of 33.6 g of an olefin resin (D-1) was obtained. The analysis results of the obtained olefin resin (D-1) are shown in Table 1-1. The compound (2) was synthesized according to the method disclosed in JP 2006-52314 A.

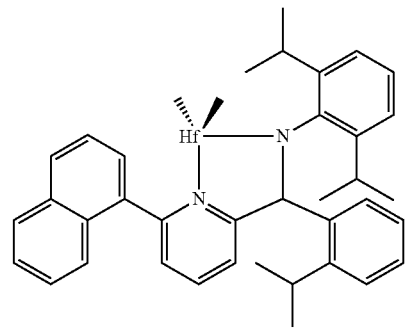

Compound (2)

Comparative Example 6

The same procedure as in Example 2 was carried out except that 3.0 mL (0.006 mmol) of a toluene solution (0.0020 mol/L) of the compound (2) was used instead of 5.0 mL (0.01 mmol) of a toluene solution (0.0020 mol/L) of the compound (1), to produce an olefin resin. A quantity of 21.1 g of an olefin resin (D-2) was obtained. The analysis results of the obtained olefin resin (D-2) are shown in Table 1-1.

The same procedure as in Comparative Example 1 was carried out except that the compound (2) was used instead of the compound (1), to produce an olefin resin. A quantity of 43.4 g of an olefin resin (D'-1) was obtained. The analysis results of the obtained olefin resin (D'-1) are shown in Table 1-3. The resin (D'-1) was defined as a copolymer constituting the main chain of the olefin resin (D-1) and of the olefin resin (D-2).

Comparative Example 7

The same procedure as in Example 2 was carried out except that [dimethyl(t-butylamide)(tetramethyl-η5-cyclopentadienyl)silane]titanium dichloride represented as a compound (3) was used instead of the compound (1), to produce an olefin resin. A quantity of 11.8 g of an olefin resin (D-3) was obtained. The analysis results of the obtained olefin resin (D-3) are shown in Table 1-1. The dimethyl(t-butylamide)(tetramethyl-η5-cyclopentadienyl)silane]titanium dichloride was synthesized by a known method.

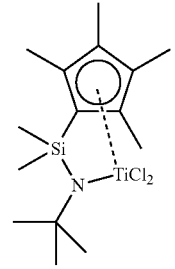

Compound (3)

The polymerization was carried out in the same manner except that the polypropylene having terminal unsaturation (M-1) was not added, to obtain a resin (D'-3). The resulting resin (D'-3) was analyzed according to the methods described above, and the results are shown in Table 1-3. The resin (D'-3) was defined as a copolymer constituting the main chain of the olefin resin (D-3). Comparative Example 8

The same procedure as in Example 2 was carried out except that rac-ethylenebis(indenyl)zirconium (IV) dichloride represented as a compound (4) was used instead of the compound (1), to produce an olefin resin. A quantity of 60.2 g of an olefin resin (D-4) was obtained. The analysis results of the obtained olefin resin (D-4) are shown in Table 1-1. As the rac-ethylenebis(indenyl)zirconium (IV) dichloride, one manufactured by STREM CHEMICHALS Inc. was used.

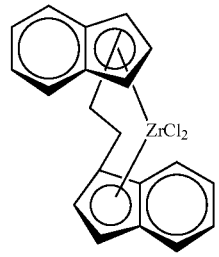

Compound (4)

The polymerization was carried out in the same manner except that polypropylene having terminal unsaturation (M-1) was not added, to obtain a resin (D'-4). The resulting resin (D'-4) was analyzed according to the methods previously described, and the results are shown in Table 1-3. The resin (D'-4) was defined as a copolymer constituting the main chain of the olefin resin (D-4).

FIG. 5 illustrates the relationship between the ratio E (wt %), ratio P (wt %), and the value a, of the resins produced in Examples and Comparative Examples.

TABLE 1-1

|  | Example 1 β-1 | Example 2 β-2 | Example 3 β-3 | Example 4 β-4 | Example 5 β-5 | Example 6 β-6 | Example 7 β-7 | Example 8 β-8 | Example 9 β-9 |
|---|---|---|---|---|---|---|---|---|---|
| α-olefin species | 1-butene | 1-butene | 1-butene | 1-butene | propylene | propylene | 1-butene | 1-butene | 1-butene |
| Copolymer constituting the main chain | β'-1 | β'-1 | β'-1 | β'-4 | β'-5 | β'-6 | β'-7 | β'-1 | β'-1 |
| Polypropylene having terminal unsaturation | M-1 | M-1 | M-2 | M-2 | M-2 | M-2 | M-2 | M-3 | M-2 |
| Ratio P (wt %) | 17.1 | 30.4 | 31.8 | 33.3 | 31.0 | 36.2 | 33.9 | 30.9 | 9.3 |
| Ratio E (wt %) | 35.0 | 19.5 | 39.4 | 41.9 | 47.3 | 35.0 | 28.8 | 44.5 | 79.8 |
| Value a | 3.8 | 2.6 | 1.9 | 1.7 | 1.7 | 1.8 | 2.1 | 1.8 | 2.2 |
| Melting peak observed at 120° C. or more Tm (° C.) | 131.0 | 130.6 | 146.5 | 145.2 | 146.2 | 148.1 | 146.7 | 149.4 | 146.7 |
| Heat of fusion ΔH (J/g) | 14.7 | 25.1 | 30.4 | 27.4 | 25.7 | 33.1 | 26.4 | 26.7 | 6.7 |
| Glass transition temperature Tg (° C.) | −69.3 | −68.0 | −67.9 | −72.7 | −60.6 | −54.2 | −70.4 | −68.2 | −68.0 |
| Hot xylene-insoluble content (wt %) | 1.7 | 1.9 | 1.5 | 1.7 | 1.8 | 1.8 | 1.9 | 1.6 | 1.5 |
| Limiting viscosity [η](dl/g) | 2.1 | 2.1 | 2.2 | 2.1 | 1.9 | 1.9 | 4.0 | 2.3 | 2.1 |
| Ratio of repeating units derived from ethylene (mol %) | 69.2 | 59.8 | 58.8 | 48.8 | 47.9 | 56.5 | 53.5 | 59.5 | 74.5 |
| Amount of component(s) soluble in o-dichlorobenzene at 50° C. or less (wt %) | 39.2 | 22.7 | 38.2 | 40.0 | 44.8 | 39.4 | 28.6 | 44.2 | 82.0 |
| Elastic modulus (MPa) | 15 | 21 | 29 | 16 | 21 | 40 | 31 | 27 | 11 |

|  | Comparative Example 1 β'-1 | Comparative Example 2 β'-2 | Comparative Example 3 B-1 | Comparative Example 4 B-2 | Comparative Example 5 D-1 | Comparative Example 6 D-2 | Comparative Example 7 D-3 | Comparative Example 8 D-4 |
|---|---|---|---|---|---|---|---|---|
| α-olefin species | 1-butene | 1-butene | 1-butene | 1-butene | 1-butene | 1-butene | 1-butene | 1-butene |
| Copolymer constituting the main chain | — | — | β'-1 | β'-1 | D'-1 | D'-1 | D'-3 | D'-4 |

TABLE 1-1-continued

| | | | | | | | | | |
|---|---|---|---|---|---|---|---|---|---|
| Polypropylene having terminal unsaturation | — | — | (M-1) | (M-2) | M-1 | M-1 | M-1 | M-1 |
| Ratio P (wt %) | 0 | 0 | 30.4 | 31.9 | 29.8 | 47.4 | 84.7 | 16.6 |
| Ratio E (wt %) | 100 | 100 | 72.5 | 72.9 | 66.6 | 52.5 | 10.4 | 81.8 |
| Value a | — | — | 0.90 | 0.85 | 1.1 | 1.0 | 1.1 | 1.1 |
| Melting peak observed at 120° C. or more Tm (° C.) | Not observed | Not observed | 135.2 | 148.4 | 137.9 | 136.6 | 135.2 | 136.0 |
| Heat of fusion ΔH (J/g) | Not observed | Not observed | 31.2 | 33.4 | 19.1 | 32.8 | 62.5 | 14.2 |
| Glass transition temperature Tg (° C.) | −69.5 | −67.7 | −68.2 | −67.5 | −63.0 | −62.6 | −65.2 | −56.0 |
| Hot xylene-insoluble content (wt %) | 1.6 | No data available | 1.5 | 1.5 | 1.6 | 1.5 | 1.9 | 1.7 |
| Limiting viscosity [η](dl/g) | 2.1 | 1.7 | No data available | No data available | 0.5 | 0.5 | >0.4 | >0.4 |
| Ratio of repeating units derived from ethylene (mol %) | 80.6 | 80.6 | 60.4 | 59.3 | 65.4 | 51.3 | 15.6 | 78.1 |
| Amount of component(s) soluble in o-dichlorobenzene at 50° C. or less (wt %) | 97.1 | 97.3 | 71.8 | 71.8 | 55.1 | 43.2 | 7.8 | 62.2 |
| Elastic modulus (MPa) | No data available | No data available | 26 | No data available | No data available | No data available | No data available | No data available |

TABLE 1-2

| Polypropylene having terminal unsaturation | M-1 | M-2 | M-3 |
|---|---|---|---|
| Unsaturated terminal content (terminals/1,000 C) | 0.88 | 0.43 | 0.29 |
| Terminal vinyl content (terminals/1,000 C) | 0.69 | 0.27 | 0.12 |
| mmmm (%) | 94 | 94 | 94.0 |
| Weight average molecular weight (g/mol) | 22,000 | 55,300 | 84,200 |

A detailed description regarding the comparison of the above mentioned Examples with Comparative Examples will be given below.

Comparison of Examples 1 to 9 with Comparative Examples 1 to 8

The resins β-1 to β-9 produced in Examples 1 to 9 have a value of 1.4 or more, indicating a high content of the grafted olefin polymer [R1]. Accordingly, the resins β-1 to β-9 obtained in Examples 1 to 9 have a heat resistance and a low stickiness. On the other hand, the resins obtained in Comparative Examples 1 to 8 have a value of less than 1.4,

TABLE 1-3

| Olefin resin | β'-1 | β'-4 | β'-5 | β'-6 | β'-7 | β'-2 | D'-1 | D'-3 | D'-4 |
|---|---|---|---|---|---|---|---|---|---|
| α-olefin species | 1-butene | 1-butene | propylene | propylene | 1-butene | 1-butene | 1-butene | 1-butene | 1-butene |
| Ratio of α-olefin (mol %) | 19.4 | 30.1 | 35.3 | 20.0 | 23.8 | 19.4 | 15 | 17.0 | 10.4 |
| Weight average molecular weight (g/mol) | 140,000 | 135,000 | 120,000 | 125,000 | 250,000 | 115,000 | 40,000 | 24,000 | 20,000 |
| Limiting viscosity [η] (dl/g) | 2.2 | 2.0 | 1.8 | 1.9 | 4.3 | 1.7 | 0.6 | >0.4 | >0.4 | indicating that they do not contain a large amount of the grafted olefin polymer. Therefore, the resins have a poor heat resistance and a high stickiness.

(Comparison of Phase Structure of Example 2 with Comparative Example 3)

Although each of the resin β-2 obtained in Example 2 and the resin B-1 obtained in Comparative Example 3 contains an equivalent amount of the same ethylene/α-olefin copolymer and an equivalent amount of the same propylene polymer, the resin β-2 contains a large amount of the grafted olefin polymer [R1] in which the ethylene/α-olefin copolymer and the propylene are bound, as evident from the value a. Accordingly, in the phase structure of the resin β-2, the particles of the island phase indicating the crystalline propylene component are more finely dispersed. This is a manifestation of the effect of increased compatibility due to containing the grafted olefin polymer, and it is assumed that the resin β-2 has a higher compatibility as compared to the resin B-1.

Production Example 1 Production of Propylene Homopolymer Resin (α-h-1)

(1) Preparation of Solid Titanium Catalyst Component

A quantity of 95.2 g of anhydrous magnesium chloride, 442 ml of decane, and 390.6 g of 2-ethylhexyl alcohol were subjected to heat reaction at 130° C. for 2 hours to prepare a homogeneous solution. To the solution, 21.3 g of phthalic anhydride was added, and the resultant was mixed and stirred at 130° C. for 1 hour to dissolve the phthalic anhydride.

The thus obtained homogeneous solution was cooled to room temperature, and then 75 ml of the homogeneous solution was dropped into 200 ml of titanium tetrachloride maintained at −20° C. over a period of 1 hour. After the completion of dropping, the temperature of the resulting mixed solution was raised to 110° C. over a period of 4 hours, and 5.22 g of diisobutyl phthalate (DIBP) was added thereto when the temperature reached 110° C., followed by stirring for 2 hours at the same temperature.

After the completion of the 2 hour-reaction, the solid portion of the solution was collected by hot filtration, and the collected solid portion was re-suspended in 275 ml of titanium tetrachloride, followed by heating again at 110° C. for 2 hours. After the completion of the reaction, the solid portion of the solution was collected by hot filtration again, and the resultant was washed sufficiently with decane and hexane maintained at 110° C., until no free titanium compound was detected.

The detection of the free titanium compound was carried out by the following method. A quantity of 10 ml of the washing liquid of the above mentioned solid catalyst component was collected with a syringe, and introduced into a 100 ml Schlenk flask with a side-arm which had been substituted with nitrogen in advance. Then hexane was dried off with nitrogen gas stream, followed by drying for another 30 minutes under vacuum. To the resultant, 40 ml of ion exchanged water, and 10 ml of (1+1) sulfuric acid were added, followed by stirring for 30 minutes. The resulting aqueous solution was transferred to a 100 ml measuring flask through a paper filter, and then 1 ml of concentrated $H_3PO_4$ as a masking agent for iron (II) ions and 5 ml of 3% $H_2O_2$ as a coloring reagent for titanium were added to the filtered solution, followed by diluting with ion exchanged water to a total of 100 ml. The measuring flask was then shaken to mix the content, and 20 minutes later, the absorbance at 420 nm was measured using a UV meter. Washing to remove the free titanium was carried out until the absorbance at 420 nm was no longer observed.

The solid titanium catalyst component (A) prepared as described above was stored as a decane slurry, and a portion of the slurry was dried for the purpose of analyzing the composition of the catalyst. The composition of the thus obtained solid titanium catalyst component (A) was as follows: titanium: 2.3% by weight, chlorine: 61% by weight, magnesium: 19% by weight, and DIBP: 12.5% by weight.

(2) Preparation of Pre-Polymerization Catalyst

A quantity of 100 g of the solid catalyst component, 39.3 mL of triethylaluminum, and 100 L of heptane were introduced into an autoclave equipped with an agitator having a capacity of 200 L. While maintaining the internal temperature of the autoclave at 15 to 20° C., 600 g of propylene was added thereto, and the resultant was allowed to react for 60 minutes while stirring, to obtain a catalyst slurry.

(3) Main Polymerization

To a tubular circulation-type polymerization reactor equipped with a jacket, having a capacity of 58 L, there were continuously supplied propylene at 43 kg/hr, hydrogen at 177 NL/hr, the catalyst slurry produced in the above (2) as a solid catalyst component at 0.58 g/hr, triethylaluminum at 3.1 ml/hr, and dicyclopentyldimethoxysilane at 3.3 ml/hr, and polymerization was performed at a state where the reactor was fully filled with fluid, with no gas phase present. The temperature of the tubular polymerization reactor was 70° C. and the pressure was 3.53 MPa/G.

The resulting slurry was transferred to a vessel reactor equipped with an agitator having a capacity of 100 L, and further polymerized. To the polymerization reactor, propylene was supplied at 45 kg/hr, and hydrogen was supplied such that the hydrogen concentration in the gas phase was 3.2 mol %. The polymerization was carried out at a polymerization temperature of 70° C. and at a pressure of 3.28 MPa/G.

The resulting propylene homopolymer resin (α-h-1) was vacuum dried at 80° C. The physical properties of the propylene homopolymer resin (α-h-1) were measured, and the resin had a melt flow rate (MFR) of 30 g/10 min, and an isotactic pentad fraction (mmmm) of 97.8%.

Production Example 2 Production of Propylene Random Copolymer Resin (α-r-1)

(1) Preparation of Magnesium Compound

To a reaction tank equipped with an agitator (capacity: 500 liter) and sufficiently substituted with nitrogen gas, 97.2 kg of ethanol, 640 g of iodine, and 6.4 kg of metal magnesium were introduced, and the resultant was allowed to react while stirring under reflux until no emission of hydrogen gas from the system was observed, to obtain a solid reaction product. A reaction solution containing the resulting solid reaction product was dried under reduced pressure to obtain a magnesium compound (carrier of the solid catalyst) of interest.

(2) Preparation of Solid Catalyst Component

To a reaction tank (capacity: 500 liter) equipped with an agitator and sufficiently substituted with nitrogen gas, 30 kg of the above obtained magnesium compound (not ground), 150 liter of purified heptane (n-heptane), 4.5 liter of silicon tetrachloride, and 5.4 liter of di-n-butyl phthalate were added. While maintaining the system at 90° C., 144 liter of titanium tetrachloride was added while stirring, and the resultant was allowed to react for 2 hours at 110° C. Then the solid component was separated and washed with purified heptane maintained at 80° C. Further, 228 liter of titanium tetrachloride was added, and the resultant was allowed to react at 110° C. for 2 hours, followed by sufficiently washing with purified heptane, to obtain a solid catalyst component.
(3) Pretreatment To a reaction tank equipped with an agitator and having a capacity of 500 liter, 230 liter of purified heptane was introduced, followed by supplying thereto 25 kg of the above obtained solid catalyst component, and triethylaluminum and dicyclopentyldimethoxysilane at a ratio of 1.0 mol/mol and 1.8 mol/mol, respectively, with respect to titanium atoms in the solid catalyst component. Subsequently, propylene was introduced until a propylene partial pressure of 0.03 MPa-G was reached, followed by reacting at 25° C. for 4 hours. After the completion of the reaction, the solid catalyst component was washed with purified heptane for several times, followed by further supplying carbon dioxide, and then stirring for 24 hours.
(4) Polymerization To a polymerization reactor equipped with an agitator and having a capacity of 200 liter, there were supplied the above treated solid catalyst component at 3 mmol/hr, 2.5 mmol/kg-PP of triethylaluminum, and 0.25 mmol/kg-PP of dicyclopentyldimethoxysilane, in terms of titanium atoms in the component. To the resultant, propylene, ethylene, and 1-butene were continuously supplied at 46.0 kg/hr, 2.0 kg/hr, and 2.4 kg/hr, respectively, at a polymerization temperature of 82° C. and a polymerization pressure of 2.8 MPa-G, to allow a reaction to proceed. At this time, the ethylene concentration, the 1-butene concentration, and the hydrogen concentration in the polymerization system were 2.4 mol %, 1.8 mol %, and 8.2 mol %, respectively.

As a result, a propylene random copolymer resin (α-r-1) having a content of structural units derived from ethylene of 3.6 wt %, a content of structural units derived from 1-butene of 2.4 wt %, a MFR of 7.0 g/10 min, and a melting point (Tm) of 138° C., was obtained.

Production Example 3 Production of Propylene Block Polymer Resin (α-b-1)

(1) Preparation of Solid Titanium Catalyst Component

A quantity of 95.2 g of anhydrous magnesium chloride, 442 ml of decane and 390.6 g of 2-ethylhexyl alcohol were subjected to heat reaction at 130° C. for 2 hours to prepare a homogeneous solution. To the solution, 21.3 g of phthalic anhydride was added, and the resultant was mixed and stirred at 130° C. for 1 hour to dissolve the phthalic anhydride.

The thus obtained homogeneous solution was cooled to room temperature, and then 75 ml of the homogeneous solution was dropped into 200 ml of titanium tetrachloride maintained at −20° C. over a period of 1 hour. After the completion of dropping, the temperature of the resulting mixed solution was raised to 110° C. over a period of 4 hours, and 5.22 g of diisobutyl phthalate (DIBP) was added thereto when the temperature reached 110° C., followed by stirring for 2 hours at the same temperature.

After the completion of the 2 hour-reaction, the solid portion of the solution was collected by hot filtration, and the collected solid portion was re-suspended in 275 ml of titanium tetrachloride, followed by heating again at 110° C. for 2 hours. After the completion of the reaction, the solid portion of the solution was collected by hot filtration again, and the resultant was washed sufficiently with decane and hexane maintained at 110° C., until no free titanium compound was detected.

The detection of the free titanium compound was carried out by the following method. A quantity of 10 ml of the washing liquid of the above mentioned solid catalyst component was collected with a syringe, and introduced into a 100 ml Schlenk flask with a side-arm which had been substituted with nitrogen in advance. Then hexane was dried off with nitrogen gas stream, followed by drying for another 30 minutes under vacuum. To the resultant, 40 ml of ion exchanged water, and 10 ml of (1+1) sulfuric acid were added, followed by stirring for 30 minutes. The resulting aqueous solution was transferred to a 100 ml measuring flask through a paper filter, and then 1 ml of concentrated $H_3PO_4$ as a masking agent for iron (II) ions and 5 ml of 3% $H_2O_2$ as a coloring reagent for titanium were added to the filtered solution, followed by diluting with ion exchanged water to a total of 100 ml. The measuring flask was then shaken to mix the content, and 20 minutes later, the absorbance at 420 nm was measured using a UV meter. Washing to remove the free titanium was carried out until the absorbance at 420 nm was no longer observed.

The solid titanium catalyst component (A) prepared as described above was stored as a decane slurry, and a portion of the slurry was dried for the purpose of analyzing the composition of the catalyst. The composition of the thus obtained solid titanium catalyst component (A) was as follows: titanium: 2.3% by weight, chlorine: 61% by weight, magnesium: 19% by weight, and DIBP: 12.5% by weight.

(2) Preparation of Pre-Polymerization Catalyst

A quantity of 100 g of the solid catalyst component, 39.3 mL of triethylaluminum, and 100 L of heptane were introduced into an autoclave equipped with an agitator having a capacity of 200 L. While maintaining the internal temperature of the autoclave at 15 to 20° C., 600 g of propylene was added thereto, and the resultant was allowed to react for 60 minutes while stirring, to obtain a catalyst slurry.

(3) Main Polymerization

To a tubular circulation-type polymerization reactor equipped with a jacket, having a capacity of 58 L, there were continuously supplied propylene at 43 kg/hr, hydrogen at 197 NL/hr, the catalyst slurry produced in the above (2) as a solid catalyst component at 0.59 g/hr, triethylaluminum at 3.1 ml/hr, and dicyclopentyldimethoxysilane at 3.3 ml/hr, and polymerization was performed at a state where the reactor was fully filled with fluid, with no gas phase present. The temperature of the tubular polymerization reactor was 70° C. and the pressure was 3.60 MPa/G.

The resulting slurry was transferred to a vessel reactor equipped with an agitator having a capacity of 100 L, and further polymerized. To the polymerization reactor, propylene was supplied at 45 kg/hr, and hydrogen was supplied such that the hydrogen concentration in the gas phase was 6.0 mol %. The polymerization was carried out at a polymerization temperature of 70° C. and at a pressure of 3.35 MPa/G.

The resulting slurry was transferred to a liquid transfer pipe having a capacity of 2.4 L, and the slurry was gasified to carry out gas-solid separation. Thereafter, the resulting homopolymer powder of polypropylene was transferred to a gas phase polymerization reactor having a capacity of 480 L, to carry out an ethylene/propylene block copolymerization. Propylene, ethylene, and hydrogen were continuously supplied so that the gas composition in the gas phase polymerization reactor satisfies: ethylene/(ethylene+propylene)=0.23 (molar ratio), and hydrogen/ethylene=0.031 (molar ratio). The polymerization was carried out at a polymerization temperature of 70° C. and at a pressure of 1.0 MPa/G.

The resulting propylene block copolymer resin (α-b-1) was vacuum dried at 80° C. The physical properties of the propylene block polymer resin (α-b-1) were measured, and it had a melt flow rate (MFR) of 20 g/10 min. Further, the polypropylene homopolymer powder obtained in the main polymerization step, namely, the homo-polypropylene portion of the block copolymer, had a melt flow rate (MFR) of 35 g/10 min, and an isotactic pentad fraction (mmmm) of 97.7.

To a measurement container made of glass, about 3 g of the propylene block polymer resin (α-b-1), (measured to the unit of $10^{-4}$ g; the measured weight was represented as b (g) in the following equation), 500 mL of n-decane, and a small amount of a decane-soluble heat stabilizer were introduced, and the temperature thereof was raised to 150° C. over a period of 2 hours while stirring with a stirrer under a nitrogen atmosphere, to dissolve the propylene block copolymer. Then the resultant was maintained at 150° C. for 2 hours, and then allowed to cool to 23° C. over a period of 8 hours. The resulting liquid containing the precipitates of the propylene block copolymer was filtered under reduced pressure using a 25G-4 standard glass filter manufactured by Iwata Glass Co., Ltd. A quantity of 100 mL of the filtrate was collected and dried under reduced pressure to obtain a portion of a component(s) soluble in n-decane at room temperature, and the weight thereof was measured to the unit of $10^{-4}$ g (this weight was represented as "a" (g) in the following equation). The amount of the component(s) soluble in n-decane at room temperature (also referred to as Dsol) was determined by the following equation.

Dsol content (wt %)=100×(500×$a$)/(100×$b$)

The Dsol content was 12.0 wt %, the content of the structural units derived from ethylene in Dsol was 42% by mole, and the limiting viscosity [η] in decalin at 135° C. was 3.4 dl/g. The [η] was measured in the same manner as in the above mentioned "(7) Limiting viscosity measurement".

Example 10

A quantity of 25 parts by weight of the olefin resin (β-2) produced in Example 2, 75 parts by weight of the propylene homopolymer resin (α-h-1) produced in Production Example 1, 0.1 parts by weight of a heat stabilizer, IRGANOX 1010 (Ciba-Geigy Limited, trademark), 0.1 parts by weight of a heat stabilizer, IRGAFOS 168 (Ciba-Geigy Limited, trademark), and 0.1 parts by weight of calcium stearate were mixed in a tumble mixer, and then the mixture was melt blended using a twin-screw extruder under the following conditions to prepare a propylene resin composition in the form of pellets. The pellets were then formed into a test specimen using an injection molding machine under the following conditions. The physical properties of the resulting propylene resin composition are shown in Table 2. Note that all the numerical values shown in the section of "Composition" in Tables 2 and 3 are indicated in parts by weight.

<Melt Blending Conditions>
Same direction twin screw kneader: Model KZW-15, manufactured by Technovel Corporation
Melt blending temperature: 190° C.
Screw rotational speed: 500 rpm
Feeder rotational speed: 40 rpm <JIS Small Test Specimen/Injection Molding Conditions>
Injection molding machine: Model EC40, manufactured by Toshiba Machine Co., Ltd.
Cylinder temperature: 190° C.
Mold temperature: 40° C.
Injection time—pressure retention time: 13 sec (first loading time: 1 sec)
Cooling time: 15 sec Comparative Example 9

The same procedure as in Example 10 was carried out except that 25 parts by weight of the olefin resin (β'-2) produced in Comparative Example 2 was used instead of 25 parts by weight of the olefin resin (β-2) produced in Example 2, to prepare a propylene resin composition. The physical properties of the resulting propylene resin composition are shown in Table 2.

Example 11

A quantity of 25 parts by weight of the olefin resin (β-2) produced in Example 2, 75 parts by weight of the propylene random copolymer resin (α-r-1) produced in Production Example 2, 0.1 parts by weight of a heat stabilizer, IRGANOX 1010 (Ciba-Geigy Limited, trademark), 0.1 parts by weight of a heat stabilizer, IRGAFOS 168 (Ciba-Geigy Limited, trademark), and 0.1 parts by weight of calcium stearate were mixed in a tumble mixer, and then the mixture was melt blended using a twin-screw extruder in the same manner as in Example 10, to prepare a propylene resin composition in the form of pellets. The pellets were then formed into a test specimen using an injection molding machine. The physical properties of the resulting propylene resin composition are shown in Table 2.

Comparative Example 10

The same procedure as in Example 11 was carried out except that 25 parts by weight of the olefin resin (β'-2) produced in Comparative Example 2 was used instead of 25 parts by weight of the olefin resin (β-2) produced in Example 2, to prepare a propylene resin composition. The physical properties of the resulting propylene resin composition are shown in Table 2.

TABLE 2

|  |  |  | Example 10 | Comparative Example 9 | Example 11 | Comparative Example 10 |
|---|---|---|---|---|---|---|
| Composition | Olefin resin (β) | β-2 | 25 |  | 25 |  |
|  |  | β'-2 |  | 25 |  | 25 |
|  | Propylene polymer (α) | α-h-1 | 75 | 75 |  |  |
|  |  | α-r-1 |  |  | 75 | 75 |
|  |  | α-b-1 |  |  |  |  |
| Mechanical properties | MFR (g/10 min) |  | 15 | 19 | 5 | 6 |
|  | Elongation (%) |  | 670 | 510 | 640 | 420 |
|  | FM (Mpa) |  | 1110 | 1110 | 640 | 620 |

TABLE 2-continued

|  | Example 10 | Comparative Example 9 | Example 11 | Comparative Example 10 |
|---|---|---|---|---|
| Charpy impact strength at 23° C. (kJ/m$^2$) | 13.9 | 4.8 | 62.6 | 56.6 |
| Charpy impact strength at −30° C. (kJ/m$^2$) | 3.2 | 2.6 | 4.6 | 2.4 |
| Rockwell hardness (R) | 73 | 54 | 46 | 14 |

Example 12

A quantity of 20 parts by weight of the olefin resin (β-1) produced in Example 1, 60 parts by weight of the propylene homopolymer resin (α-h-1) produced in Production Example 1, 20 parts by weight of talc (JM-209 (trademark), manufactured by Asada Seifun Co., Ltd.), 0.1 parts by weight of a heat stabilizer, IRGANOX 1010 (Ciba-Geigy Limited, trademark), 0.1 parts by weight of a heat stabilizer, IRGAFOS 168 (Ciba-Geigy Limited, trademark), and 0.1 parts by weight of calcium stearate were mixed in a tumble mixer, and then the mixture was melt blended using a twin-screw extruder under the following conditions to prepare a propylene resin composition in the form of pellets. The pellets were then formed into a test specimen using an injection molding machine under the following conditions. The physical properties of the resulting propylene resin composition are shown in Table 3.
<Melt Blending Conditions>
Same direction twin screw kneader: Model KZW-15, manufactured by Technovel Corporation
Melt blending temperature: 190° C.
Screw rotational speed: 500 rpm
Feeder rotational speed: 40 rpm
<JIS Small Test Specimen/Injection Molding Conditions>
Injection molding machine: Model EC40, manufactured by
Toshiba Machine Co., Ltd.
Cylinder temperature: 190° C.
Mold temperature: 40° C.
Injection time—pressure retention time: 13 sec (first loading time: 1 sec)
Cooling time: 15 sec Example 13

The same procedure as in Example 12 was carried out except that 20 parts by weight of the olefin resin (β-2) produced in Example 2 was used instead of 20 parts by weight of the olefin resin (β-1) produced in Example 1, to prepare a propylene resin composition. The physical properties of the resulting propylene resin composition are shown in Table 3. The phase structure of the propylene composition obtained in Example 13 was observed with a transmission electron microscope, and the result thereof is shown in FIG. 3.

Example 14

The same procedure as in Example 12 was carried out except that 20 parts by weight of the olefin resin (β-3) produced in Example 3 was used instead of 20 parts by weight of the olefin resin (β-1) produced in Example 1, to prepare a propylene resin composition. The physical properties of the resulting propylene resin composition are shown in Table 3.

Example 15

The same procedure as in Example 12 was carried out except that 20 parts by weight of the olefin resin (β-4) produced in Example 4 was used instead of 20 parts by weight of the olefin resin (β-1) produced in Example 1, to prepare a propylene resin composition. The physical properties of the resulting propylene resin composition are shown in Table 3.

Example 16

The same procedure as in Example 12 was carried out except that 20 parts by weight of the olefin resin (β-5) produced in Example 5 was used instead of 20 parts by weight of the olefin resin (β-1) produced in Example 1, to prepare a propylene resin composition. The physical properties of the resulting propylene resin composition are shown in Table 3.

Comparative Example 11

A quantity of 20 parts by weight of the olefin resin (β'-1) produced in Comparative Example 1, 60 parts by weight of the propylene homopolymer resin (α-h-1) produced in Production Example 1, 20 parts by weight of talc (JM-209 (trademark), manufactured by Asada Seifun Co., Ltd.), 0.1 parts by weight of a heat stabilizer, IRGANOX 1010 (Ciba-Geigy Limited, trademark), 0.1 parts by weight of a heat stabilizer, IRGAFOS 168 (Ciba-Geigy Limited, trademark), and 0.1 parts by weight of calcium stearate were mixed in a tumble mixer, and then the mixture was melt blended using a twin-screw extruder, in the same manner as in Example 12, to prepare a propylene resin composition in the form of pellets. The pellets were then formed into a test specimen using an injection molding machine. The physical properties of the resulting propylene resin composition are shown in Table 3.

Comparative Example 12

The same procedure as in Comparative Example 10 was carried out except that the amount used of the olefin resin (β'-1) produced in Comparative Example 1 was changed to 22 parts by weight, and the amount used of the propylene homopolymer resin (α-h-1) produced in Production Example 1 was changed to 58 parts by weight, to prepare a propylene resin composition. The physical properties of the resulting propylene resin composition are shown in Table 3.

Comparative Example 13

A quantity of 10 parts by weight of the olefin resin (β'-1) produced in Comparative Example 1, 70 parts by weight of the propylene block copolymer resin (α-b-1) produced in Production Example 3, 20 parts by weight of talc (JM-209 (trademark), manufactured by Asada Seifun Co., Ltd.), 0.1 parts by weight of a heat stabilizer, IRGANOX 1010 (Ciba-Geigy Limited, trademark), 0.1 parts by weight of a heat stabilizer, IRGAFOS 168 (Ciba-Geigy Limited, trademark), and 0.1 parts by weight of calcium stearate were mixed in a tumble mixer, and then the mixture was melt blended using a twin-screw extruder in the same manner as in Example 12 to prepare a propylene resin composition in the form of pellets. The pellets were then formed into a test specimen using an injection molding machine. The physical properties of the resulting propylene resin composition are shown in Table 3.

Comparative Example 14

The same procedure as in Comparative Example 12 was carried out except that the amount used of the olefin resin (β'-1) produced in Comparative Example 1 was changed to 15 parts by weight, and the amount used of the propylene block copolymer resin (α-b-1) produced in Production Example 3 was changed to 65 parts by weight, to prepare a propylene resin composition. The physical properties of the resulting propylene resin composition are shown in Table 3.

Comparative Example 15

The same procedure as in Comparative Example 12 was carried out except that 23 parts by weight of the olefin resin (D-2) produced in Comparative Example 6 was used instead of the olefin resin (β'-1) produced in Comparative Example 1, and the amount used of the propylene homo-copolymer (α-h-1) produced in Production Example 3 was changed to 57 parts by weight, to prepare a propylene resin composition. The physical properties of the resulting propylene resin composition are shown in Table 3.

Example 17

A quantity of 8 parts by weight of the olefin resin (β-2) produced in Example 2, 12 parts by weight of the olefin resin (β'-1) produced in Comparative Example 1, 60 parts by weight of the propylene homopolymer resin (α-h-1) produced in Production Example 1, 20 parts by weight of talc (JM-209 (trademark), manufactured by Asada Seifun Co., Ltd.), 0.1 parts by weight of a heat stabilizer, IRGANOX 1010 (Ciba-Geigy Limited, trademark), 0.1 parts by weight of a heat stabilizer, IRGAFOS 168 (Ciba-Geigy Limited, trademark), and 0.1 parts by weight of calcium stearate were mixed in a tumble mixer, and then the mixture was melt blended using a twin-screw extruder under the following conditions, to prepare a propylene resin composition in the form of pellets. The pellets were then formed into a test specimen using an injection molding machine under the following conditions. The physical properties of the resulting propylene resin composition are shown in Table 3.

<Melt Blending Conditions>
Same direction twin screw kneader: Model KZW-15, manufactured by Technovel Corporation
Melt blending temperature: 190° C.
Screw rotational speed: 500 rpm
Feeder rotational speed: 40 rpm <JIS Small Test Specimen/Injection Molding Conditions>
Injection molding machine: Model EC40, manufactured by Toshiba Machine Co., Ltd.
Cylinder temperature: 190° C.
Mold temperature: 40° C.
Injection time—pressure retention time: 13 sec (first loading time: 1 sec)
Cooling time: 15 sec Example 18

A quantity of 5 parts by weight of the olefin resin (β-3) produced in Example 3, 18 parts by weight of the olefin resin (β'-1) produced in Comparative Example 1, 57 parts by weight of the propylene homopolymer resin (α-h-1) produced in Production Example 1, 20 parts by weight of talc (JM-209 (trademark), manufactured by Asada Seifun Co., Ltd.), 0.1 parts by weight of a heat stabilizer, IRGANOX 1010 (Ciba-Geigy Limited, trademark), 0.1 parts by weight of a heat stabilizer, IRGAFOS 168 (Ciba-Geigy Limited, trademark), and 0.1 parts by weight of calcium stearate were mixed in a tumble mixer, and then a propylene resin composition was prepared in the same manner as in Example 17. The physical properties of the resulting propylene resin composition are shown in Table 3.

Example 19

The same procedure as in Example 18 was carried out except that 5 parts by weight of the olefin resin (β-6) produced in Example 6 was used instead of 5 parts by weight of the olefin resin (β-3) produced in Example 3, to prepare a propylene resin composition. The physical properties of the resulting propylene resin composition are shown in Table 3.

TABLE 3

| | | | Example 12 | Example 13 | Example 14 | Example 15 | Example 16 | Example 17 | Example 18 | Example 19 |
|---|---|---|---|---|---|---|---|---|---|---|
| Composition | Olefin resin (β) | β-1 | 20 | | | | | | | |
| | | β-2 | | 20 | | | | 8 | | |
| | | β-3 | | | 20 | 5 | | | | |
| | | β-4 | | | | 20 | | | | |
| | | β-5 | | | | | 20 | | | |
| | | β-6 | | | | | | | | 5 |
| | | β'-1 | | | | | | 12 | 18 | 18 |
| | | D-2 | | | | | | | | |
| | Propylene polymer (α) | α-h-1 | 60 | 60 | 60 | 60 | 60 | 60 | 57 | 57 |
| | | α-r-1 | | | | | | | | |
| | | α-b-1 | | | | | | | | |
| | Talc | | 20 | 20 | 20 | 20 | 20 | 20 | 20 | 20 |
| Mechanical properties | MFR (g/10 min) | | 13 | 15 | 17 | 19 | 18 | 13 | 14 | 16 |
| | Elongation (%) | | 420 | 470 | 460 | 370 | 170 | 120 | 250 | 290 |
| | FM (Mpa) | | 2,510 | 2,630 | 2,550 | 2,430 | 2,540 | 2,620 | 2,430 | 2,480 |
| | Charpy impact strength | | 3.6 | 2.8 | 2.7 | 3.0 | 3.1 | 3.0 | 3.7 | 3.1 |

TABLE 3-continued

|  |  |  | Comparative Example 10 | Comparative Example 12 | Comparative Example 13 | Comparative Example 14 | Comparative Example 15 |
|---|---|---|---|---|---|---|---|
| Composition | Olefin resin (β) | β-1 |  |  |  |  |  |
|  |  | β-2 |  |  |  |  |  |
|  |  | β-3 |  |  |  |  |  |
|  |  | β-4 |  |  |  |  |  |
|  |  | β-5 |  |  |  |  |  |
|  |  | β-6 |  |  |  |  |  |
|  |  | β'-1 | 20 | 22 | 10 | 15 |  |
|  |  | D-2 |  |  |  |  | 23 |
|  | Propylene polymer (α) | α-h-1 | 60 | 58 |  |  | 57 |
|  |  | α-r-1 |  |  |  |  |  |
|  |  | α-b-1 |  |  | 70 | 65 |  |
|  | Talc |  | 20 | 20 | 20 | 20 | 20 |
| Mechanical properties | MFR (g/10 min) |  | 17 | 16 | 11 | 17 | 85 |
|  | Elongation (%) |  | 90 | 180 | 380 | 380 | 10 |
|  | FM (Mpa) |  | 2,520 | 2,390 | 2,350 | 2,080 | 2,390 |
|  | Charpy impact strength [−30° C.] (kJ/m$^2$) |  | 2.6 | 2.9 | 2.8 | 3.9 | 1.3 |

Comparison of Examples 10 to 19 with Comparative Examples 9 to 15

Since the propylene resin compositions obtained in Examples 10 to 19 contain the olefin resin (β), they have a better physical property balance between the elongation, rigidity, impact strength and strength, as compared to the resin compositions obtained in Comparative Examples.

The invention claimed is:

1. An olefin resin (β) satisfying the following requirements (I) to (VI):
   (I) the olefin resin (β) comprises a grafted olefin polymer [R1] comprising a main chain composed of an ethylene/α-olefin copolymer and a side chain composed of a propylene polymer;
   (II) when the ratio of the amount of the propylene polymer contained in the olefin resin (β) is taken as P wt %, the value P is within the range of from 5 to 60;
   (III) when the ratio of the amount of a component(s) having a peak value of a differential elution curve as measured by cross-fractionation chromatography (CFC) using o-dichlorobenzene as a solvent of less than 65° C., to the amount of the olefin resin (β) is taken as E wt %, the value a represented by the following equation (Eq-1) is 1.4 or more;

$$a=(100-E)/P \qquad \text{(Eq-1)}$$

(IV) the melting point (Tm) and the glass transition temperature (Tg), as measured by differential scanning calorimetry (DSC), are within the range of from 120 to 165° C. and within the range of from −80 to −30° C., respectively;
   (V) the hot xylene-insoluble content is less than 3 wt %; and
   (VI) the limiting viscosity [η] as measured in decalin at 135° C. is within the range of from 0.5 to 5.0 dl/g.

2. The olefin resin (β) according to claim 1, wherein the ratio of repeating units derived from ethylene with respect to the total repeating units is within the range of from 20 to 80 mol %.

3. The olefin resin (β) according to claim 1, wherein the propylene polymer constituting the side chain(s) of the grafted olefin polymer [R1] has an isotactic pentad fraction (mmmm) of 93% or more.

4. The olefin resin (β) according to claim 1, wherein the propylene polymer constituting the side chain(s) of the grafted olefin polymer [R1] has a weight average molecular weight within the range of from 5,000 to 100,000.

5. The olefin resin (β) according to claim 1 wherein the ethylene/α-olefin copolymer constituting the main chain of the grafted olefin polymer [R1] has a weight average molecular weight within the range of from 50,000 to 200,000.

6. The olefin resin (β) according to claim 1, wherein the olefin resin (β) has a phase-separated structure composed of a sea phase constituted by a non-crystalline component and an island phase constituted by a crystalline component, and wherein the particles of the island phase have an average diameter as observed in a transmission electron microscope image within the range of from 50 nm to 500 nm.

7. A method for producing the olefin resin (β) according to claim 1, the method comprising the following steps (A) and (B):

(A) polymerizing propylene in the presence of an olefin polymerization catalyst comprising a transition metal compound [A] of a transition metal of Group 4 in the periodic table, the compound comprising a ligand having a dimethylsilylbisindenyl skeleton, to produce a polypropylene having terminal unsaturation; and (B) copolymerizing the polypropylene having terminal unsaturation produced in the step (A), ethylene, and at least one α-olefin selected from α-olefins having from 3 to 20 carbon atoms, in the presence of an olefin polymerization catalyst comprising a bridged metallocene compound represented by the following general formula [B]:

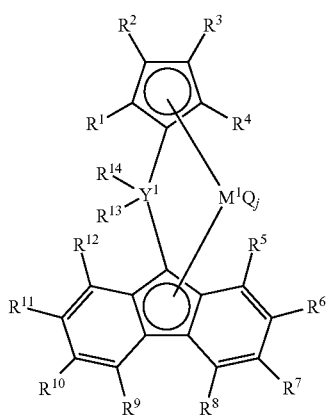

[B]

(wherein in the formula [B], $R^1$, $R^2$, $R^3$, $R^4$, $R^5$, $R^8$, $R^9$ and $R^{12}$ each independently represents a hydrogen atom, a hydrocarbon group, a silicon-containing group, or a hetero atom-containing group other than silicon-containing groups, and two mutually adjacent groups of the groups represented by $R^1$ to $R^4$ are optionally bound together to form a ring;

$R^6$ and $R^{11}$ are the same atom or the same group selected from hydrogen atom, hydrocarbon groups, silicon-containing groups, and hetero atom-containing groups other than the silicon-containing groups; $R^7$ and $R^{10}$ are the same atom or the same group selected from hydrogen atom, hydrocarbon groups, silicon-containing groups, and hetero atom-containing groups other than the silicon-containing groups; $R^6$ and $R^7$ are optionally bound together to form a ring; and $R^{10}$ and $R^{11}$ are optionally bound together to form a ring; with the proviso that all of $R^6$, $R^7$, $R^{10}$ and $R^{11}$ are not hydrogen atoms;

$R^{13}$ and $R^{14}$ each independently represents an aryl group;

$Y^1$ represents a carbon atom or a silicon atom;

$M^1$ represents a zirconium atom or a hafnium atom;

Q represents a halogen atom, a hydrocarbon group, a halogenated hydrocarbon group, a neutral conjugated or non-conjugated diene having from 4 to 10 carbon atoms, an anionic ligand, or a neutral ligand capable of being coordinated with a lone pair of electrons;

j represents an integer of from 1 to 4; and in cases where j is an integer of two or more, a plurality of Qs may be the same as or different from each other).

8. The method for producing the olefin resin (β), according to claim 7, wherein the step (B) is a solution polymerization process carried out at a polymerization temperature of 90° C. or more.

9. A propylene resin composition comprising a propylene resin (α) and the olefin resin (β) according to claim 1.

10. The propylene resin composition according to claim 9, comprising 50 to 98 parts by weight of the propylene resin (α) and 2 to 50 parts by weight of the olefin resin (β) (wherein the total amount of the propylene resin (α) and olefin resin (β) is 100 parts by weight).

11. The propylene resin composition according to claim 9, wherein the olefin resin (β) is obtained by the method for producing the olefin resin (β), the method comprising the following steps (A) and (B):

(A) polymerizing propylene in the presence of an olefin polymerization catalyst comprising a transition metal compound [A] of a transition metal of Group 4 in the periodic table, the compound comprising a ligand having a dimethylsilylbisindenyl skeleton, to produce a polypropylene having terminal unsaturation; and (B) copolymerizing the polypropylene having terminal unsaturation produced in the step (A), ethylene, and at least one α-olefin selected from α-olefins having from 3 to 20 carbon atoms, in the presence of an olefin polymerization catalyst comprising a bridged metallocene compound represented by the following general formula [B]:

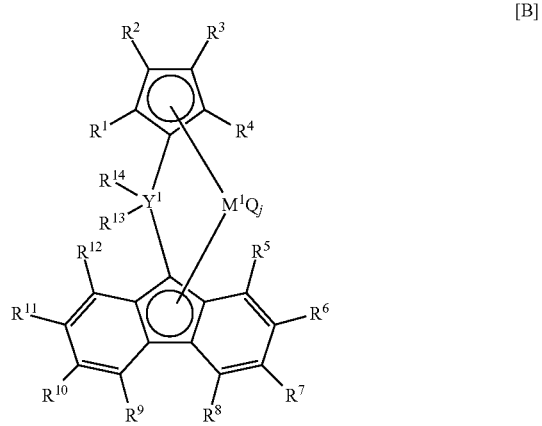

[B]

(wherein in the formula [B], $R^1$, $R^2$, $R^3$, $R^4$, $R^5$, $R^8$, $R^9$ and $R^{12}$ each independently represents a hydrogen atom, a hydrocarbon group, a silicon-containing group, or a hetero atom-containing group other than silicon-containing groups, and two mutually adjacent groups of the groups represented by $R^1$ to $R^4$ are optionally bound together to form a ring;

$R^6$ and $R^{11}$ are the same atom or the same group selected from hydrogen atom, hydrocarbon groups, silicon-containing groups, and hetero atom-containing groups other than the silicon-containing groups; $R^7$ and $R^{10}$ are the same atom or the same group selected from hydrogen atom, hydrocarbon groups, silicon-containing groups, and hetero atom-containing groups other than the silicon-containing groups; $R^6$ and $R^7$ are optionally bound together to form a ring; and $R^{10}$ and $R^{11}$ are optionally bound together to form a ring; with the proviso that all of $R^6$, $R^7$, $R^{10}$ and $R^{11}$ are not hydrogen atoms;

$R^{13}$ and $R^{14}$ each independently represents an aryl group;

$Y^1$ represents a carbon atom or a silicon atom;

$M^1$ represents a zirconium atom or a hafnium atom;

Q represents a halogen atom, a hydrocarbon group, a halogenated hydrocarbon group, a neutral conjugated or non-conjugated diene having from 4 to 10 carbon atoms, an anionic ligand, or a neutral ligand capable of being coordinated with a lone pair of electrons;

j represents an integer of from 1 to 4; and in cases where j is an integer of two or more, a plurality of Qs may be the same as or different from each other).

12. A molded article obtainable from the propylene resin composition according to claim 9.

* * * * *